(12) United States Patent
Greenberg et al.

(10) Patent No.: US 9,418,056 B2
(45) Date of Patent: *Aug. 16, 2016

(54) AUTHORING TOOL FOR THE AUTHORING OF WRAP PACKAGES OF CARDS

(71) Applicant: Wrap Media, LLC, San Francisco, CA (US)

(72) Inventors: Eric H. Greenberg, Ross, CA (US); John M. Garris, San Francisco, CA (US); Ian McFarland, San Francisco, CA (US); Jared L. Ficklin, Austin, TX (US); Mark E. Rolston, Austin, TX (US); Matthew J. Santone, Austin, TX (US); Jon Stevens, San Francisco, CA (US); Eric J. Wicks, Austin, TX (US)

(73) Assignee: Wrap Media, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/993,487

(22) Filed: Jan. 12, 2016

(65) Prior Publication Data

US 2016/0124935 A1 May 5, 2016

Related U.S. Application Data

(63) Continuation of application No. PCT/US2015/050478, filed on Sep. 16, 2015, and a continuation of application No. 14/851,362, filed on Sep. 11, 2015, application No. 14/993,487, which is a (Continued)

(51) Int. Cl.
*G06F 17/21* (2006.01)
*G06F 17/24* (2006.01)
(Continued)

(52) U.S. Cl.
CPC ............ *G06F 17/248* (2013.01); *G06F 3/0482* (2013.01); *G06F 3/04842* (2013.01);
(Continued)

(58) Field of Classification Search
CPC ...... G06F 17/24; G06F 17/212; G06F 17/248; G06F 17/211; G06F 17/3001
USPC ........................................................ 715/202
See application file for complete search history.

(56) References Cited

U.S. PATENT DOCUMENTS

| 5,228,123 | A | | 7/1993 | Heckel |
| 5,659,793 | A | * | 8/1997 | Escobar ............ G06F 17/30017 |
| | | | | 345/629 |

(Continued)

FOREIGN PATENT DOCUMENTS

WO   WO2014/115147   7/2014

OTHER PUBLICATIONS

International Search Report dated Dec. 18, 2015 from International Application No. PCT/US15/50478.

(Continued)

*Primary Examiner* — Scott Baderman
*Assistant Examiner* — Hassan Mrabi
(74) *Attorney, Agent, or Firm* — Beyer Law Group LLP

(57) ABSTRACT

An authoring tool for authoring wrap packages of cards. The authoring tool includes a set of tools that enable an author to create a new card of a wrap selected from a variety of card templates. In various embodiments, the card templates include textual, video, image/photo, document, gallery, chat, widgets, global components, location/GPS, transact, appointment, and end-of-wrap card templates. When a particular card template is selected, the template is then duplicated to create the new card. Thereafter, the author may author the card to include various components, content, attributes, layouts, styles triggers and/or behaviors. As the cards of the wrap are created, the authoring tool provides the author with the ability to order the sequence of the cards. The authoring tool thus enables authors to selectively create wrap packages that include media that conveys a narrative story and application functionality.

29 Claims, 65 Drawing Sheets

Related U.S. Application Data continuation-in-part of application No. 14/852,138, filed on Sep. 11, 2015.

(60) Provisional application No. 62/062,056, filed on Oct. 9, 2014, provisional application No. 62/062,061, filed on Oct. 9, 2014, provisional application No. 62/084,171, filed on Nov. 25, 2014, provisional application No. 62/091,866, filed on Dec. 15, 2014, provisional application No. 62/114,675, filed on Feb. 11, 2015, provisional application No. 62/133,574, filed on Mar. 16, 2015, provisional application No. 62/195,642, filed on Jul. 22, 2015, provisional application No. 62/210,585, filed on Aug. 27, 2015, provisional application No. 62/144,139, filed on Apr. 7, 2015, provisional application No. 62/170,438, filed on Jun. 3, 2015.

(51) Int. Cl.
| | | |
|---|---|---|
| G06F 3/0482 | (2013.01) | |
| G06F 3/0484 | (2013.01) | |
| G06Q 30/02 | (2012.01) | |
| G06Q 10/02 | (2012.01) | |
| G06Q 30/06 | (2012.01) | |
| G06F 17/22 | (2006.01) | |

(52) U.S. Cl.
CPC .......... *G06F3/04845* (2013.01); *G06F 17/212* (2013.01); *G06F 17/214* (2013.01); *G06F 17/2247* (2013.01); *G06Q 10/02* (2013.01); *G06Q 30/0276* (2013.01); *G06Q 30/0641* (2013.01); *G06Q 30/0643* (2013.01)

(56) References Cited

U.S. PATENT DOCUMENTS

| | | | |
|---|---|---|---|
| 5,880,740 A | 3/1999 | Halliday et al. | |
| 6,021,417 A * | 2/2000 | Massarksy | G06T 11/001 345/441 |
| 6,157,935 A * | 12/2000 | Tran | G06F 3/1454 382/187 |
| 6,216,112 B1 | 4/2001 | Fuller et al. | |
| 6,321,244 B1 | 11/2001 | Liu et al. | |
| 6,507,865 B1 | 1/2003 | Hanson et al. | |
| 6,553,403 B1 | 4/2003 | Jarriel et al. | |
| 6,738,079 B1 | 5/2004 | Kellerman et al. | |
| 7,030,872 B2 * | 4/2006 | Tazaki | G11B 27/034 345/418 |
| 7,941,739 B1 * | 5/2011 | Mohammed | G06F 9/5038 715/202 |
| 8,255,293 B1 * | 8/2012 | Davies | G06Q 30/0207 705/14.49 |
| 8,291,312 B1 | 10/2012 | Zhou | |
| 8,341,525 B1 * | 12/2012 | Achour | G06Q 10/101 715/201 |
| 8,402,356 B2 * | 3/2013 | Martinez | G06F 17/30035 705/14.36 |
| 8,412,675 B2 * | 4/2013 | Alvarado | G06Q 10/109 707/616 |
| 8,468,126 B2 * | 6/2013 | van Gent | G06F 17/3089 707/610 |
| 8,812,528 B1 * | 8/2014 | Pedregal | G06Q 50/01 707/758 |
| 8,825,083 B1 * | 9/2014 | Pedregal | G06Q 30/0269 455/456.3 |
| 8,832,062 B1 * | 9/2014 | Pedregal | G06F 17/30038 707/706 |
| 8,832,127 B1 * | 9/2014 | Pedregal | G06Q 50/01 707/706 |
| 8,832,191 B1 * | 9/2014 | Lebeau | H04L 51/10 382/209 |
| 8,903,852 B1 * | 12/2014 | Pedregal | G06F 17/30864 707/707 |
| 8,990,672 B1 * | 3/2015 | Grosz | H04N 1/00 715/202 |
| 9,110,903 B2 * | 8/2015 | Martinez | G06F 17/30035 |
| 9,275,403 B2 * | 3/2016 | Pedregal | G06Q 30/0282 |
| 2001/0034746 A1 | 10/2001 | Tsakiris et al. | |
| 2003/0009694 A1 * | 1/2003 | Wenocur | G06Q 10/107 726/4 |
| 2003/0041110 A1 * | 2/2003 | Wenocur | G06Q 10/107 709/206 |
| 2003/0093572 A1 | 5/2003 | Laux et al. | |
| 2003/0101092 A1 | 5/2003 | Fuller et al. | |
| 2003/0169282 A1 | 9/2003 | Herigstad et al. | |
| 2003/0191816 A1 * | 10/2003 | Landress | G06Q 30/02 709/219 |
| 2004/0111673 A1 | 6/2004 | Bowman et al. | |
| 2004/0177327 A1 | 9/2004 | Kieffer | |
| 2004/0226048 A1 * | 11/2004 | Alpert | H04N 7/17318 725/109 |
| 2005/0022116 A1 | 1/2005 | Bowman et al. | |
| 2005/0027820 A1 | 2/2005 | O'Laughlen et al. | |
| 2005/0066279 A1 * | 3/2005 | LeBarton | G06T 13/00 715/723 |
| 2005/0210416 A1 | 9/2005 | MacLaurin et al. | |
| 2006/0048076 A1 | 3/2006 | Vronay et al. | |
| 2006/0156219 A1 * | 7/2006 | Haot | G06F 17/30017 715/202 |
| 2006/0230337 A1 * | 10/2006 | Lamont | G06F 17/30241 715/202 |
| 2006/0259462 A1 | 11/2006 | Timmons et al. | |
| 2007/0028166 A1 | 2/2007 | Hundhausen et al. | |
| 2007/0118801 A1 * | 5/2007 | Harshbarger | G11B 27/031 715/730 |
| 2007/0208704 A1 | 9/2007 | Ives | |
| 2007/0232399 A1 | 10/2007 | Kathman et al. | |
| 2008/0077852 A1 | 3/2008 | Fleishman et al. | |
| 2008/0165081 A1 * | 7/2008 | Lawther | G06F 3/1423 345/1.2 |
| 2009/0119615 A1 | 5/2009 | Huang | |
| 2009/0158182 A1 | 6/2009 | McCurdy et al. | |
| 2009/0192928 A1 | 7/2009 | Abifaker | |
| 2009/0300511 A1 | 12/2009 | Behar et al. | |
| 2010/0070876 A1 | 3/2010 | Jain et al. | |
| 2011/0060993 A1 | 3/2011 | Cotter et al. | |
| 2011/0214075 A1 | 9/2011 | Vongphouthone et al. | |
| 2012/0054589 A1 | 3/2012 | Berger et al. | |
| 2012/0096357 A1 * | 4/2012 | Folgner | G11B 27/34 715/726 |
| 2012/0150605 A1 | 6/2012 | Isaacson et al. | |
| 2012/0150729 A1 | 6/2012 | Isaacson et al. | |
| 2012/0150730 A1 | 6/2012 | Isaacson et al. | |
| 2012/0150731 A1 | 6/2012 | Isaacson et al. | |
| 2012/0150732 A1 | 6/2012 | Isaacson et al. | |
| 2012/0150743 A1 | 6/2012 | Isaacson et al. | |
| 2012/0209902 A1 * | 8/2012 | Outerbridge | G06Q 10/101 709/201 |
| 2012/0210200 A1 * | 8/2012 | Berger | G06F 3/04845 715/202 |
| 2012/0236201 A1 * | 9/2012 | Larsen | H04N 21/235 348/468 |
| 2012/0278704 A1 | 11/2012 | Ying et al. | |
| 2012/0313876 A1 | 12/2012 | Smith | |
| 2013/0021377 A1 | 1/2013 | Doll | |
| 2013/0024757 A1 | 1/2013 | Doll et al. | |
| 2013/0046781 A1 | 2/2013 | Frankel et al. | |
| 2013/0061160 A1 | 3/2013 | Tseng | |
| 2013/0073387 A1 * | 3/2013 | Heath | G06Q 50/01 705/14.53 |
| 2013/0073388 A1 | 3/2013 | Heath | |
| 2013/0073389 A1 * | 3/2013 | Heath | G06Q 50/01 705/14.54 |
| 2013/0073400 A1 * | 3/2013 | Heath | G06Q 30/02 705/14.73 |
| 2013/0073473 A1 * | 3/2013 | Heath | G06Q 30/02 705/319 |
| 2013/0097186 A1 | 4/2013 | Van Hoff | |
| 2013/0099447 A1 | 4/2013 | Patton | |
| 2013/0111395 A1 | 5/2013 | Ying et al. | |

(56) References Cited

U.S. PATENT DOCUMENTS

| | | | |
|---|---|---|---|
| 2013/0144707 A1 | 6/2013 | Isaacson et al. | |
| 2013/0151959 A1 | 6/2013 | Flynn, III et al. | |
| 2013/0166445 A1 | 6/2013 | Isaacson et al. | |
| 2013/0179761 A1* | 7/2013 | Cho | G06F 17/21 715/202 |
| 2013/0219255 A1 | 8/2013 | Van Hoff et al. | |
| 2013/0223819 A1* | 8/2013 | Sims | G06F 17/30017 386/282 |
| 2013/0246261 A1* | 9/2013 | Purves | G06Q 20/105 705/41 |
| 2013/0254063 A1 | 9/2013 | Stone et al. | |
| 2013/0254705 A1 | 9/2013 | Mooring et al. | |
| 2013/0268372 A1 | 10/2013 | Jalili | |
| 2013/0282605 A1 | 10/2013 | Noelting | |
| 2013/0283194 A1 | 10/2013 | Kopp | |
| 2013/0290887 A1 | 10/2013 | Sun et al. | |
| 2013/0305218 A1* | 11/2013 | Hirsch | G06F 8/36 717/106 |
| 2013/0311870 A1 | 11/2013 | Worsley et al. | |
| 2013/0316773 A1* | 11/2013 | Boyd | G11B 27/031 463/9 |
| 2013/0319209 A1* | 12/2013 | Good | G09B 15/04 84/483.2 |
| 2013/0325671 A1 | 12/2013 | Glass et al. | |
| 2013/0339830 A1 | 12/2013 | Yuan et al. | |
| 2013/0346302 A1* | 12/2013 | Purves | G06Q 20/102 705/40 |
| 2014/0032525 A1 | 1/2014 | Merriman et al. | |
| 2014/0033047 A1 | 1/2014 | Poling et al. | |
| 2014/0047413 A1* | 2/2014 | Sheive | H04L 65/403 717/110 |
| 2014/0068665 A1* | 3/2014 | Evans | H04N 21/4781 725/37 |
| 2014/0074624 A1 | 3/2014 | Ying et al. | |
| 2014/0074863 A1 | 3/2014 | Walkingshaw et al. | |
| 2014/0074934 A1 | 3/2014 | Van Hoff et al. | |
| 2014/0075275 A1 | 3/2014 | Aleksandrovsky et al. | |
| 2014/0075289 A1 | 3/2014 | Brant | |
| 2014/0075339 A1 | 3/2014 | Weskamp et al. | |
| 2014/0087780 A1 | 3/2014 | Abhyanker et al. | |
| 2014/0089789 A1 | 3/2014 | Schowtka et al. | |
| 2014/0089804 A1* | 3/2014 | Gazit | G06F 3/0484 715/723 |
| 2014/0096014 A1 | 4/2014 | Johnson et al. | |
| 2014/0101539 A1 | 4/2014 | Ma et al. | |
| 2014/0108289 A1 | 4/2014 | Eitan et al. | |
| 2014/0109046 A1* | 4/2014 | Hirsch | G06F 9/44 717/120 |
| 2014/0114866 A1 | 4/2014 | Abhyanker | |
| 2014/0129942 A1* | 5/2014 | Rathod | H04N 21/44222 715/720 |
| 2014/0164507 A1* | 6/2014 | Tesch | H04L 51/10 709/204 |
| 2014/0165091 A1 | 6/2014 | Abhyanker | |
| 2014/0173417 A1 | 6/2014 | He | |
| 2014/0198127 A1 | 7/2014 | Ying | |
| 2014/0210843 A1 | 7/2014 | VanCuren, Jr. et al. | |
| 2014/0245128 A9 | 8/2014 | Brant | |
| 2014/0245369 A1* | 8/2014 | Green | H04N 21/2368 725/116 |
| 2014/0250001 A1 | 9/2014 | Isaacson et al. | |
| 2014/0250002 A1 | 9/2014 | Isaacson et al. | |
| 2014/0280852 A1 | 9/2014 | Griffiths et al. | |
| 2014/0287779 A1* | 9/2014 | O'Keefe | H04W 4/02 455/456.3 |
| 2014/0320535 A1 | 10/2014 | Ying | |
| 2014/0344294 A1* | 11/2014 | Skeen | H04L 65/4084 707/754 |
| 2014/0351268 A1 | 11/2014 | Weskamp et al. | |
| 2015/0020170 A1* | 1/2015 | Talley | H04L 63/08 726/4 |
| 2015/0033102 A1* | 1/2015 | Losvik | G06F 17/21 715/202 |
| 2015/0058709 A1* | 2/2015 | Zaletel | G06F 3/14 715/202 |
| 2015/0066743 A1 | 3/2015 | Gerard et al. | |
| 2015/0072330 A1 | 3/2015 | Rosenberg | |
| 2015/0088655 A1 | 3/2015 | Taylor | |
| 2015/0100587 A1 | 4/2015 | Walkingshaw et al. | |
| 2015/0106225 A1 | 4/2015 | Glass et al. | |
| 2015/0106368 A1 | 4/2015 | Sohn et al. | |
| 2015/0120767 A1* | 4/2015 | Skeen | G06F 17/30752 707/754 |
| 2015/0131973 A1* | 5/2015 | Rav-Acha | G11B 27/02 386/285 |
| 2015/0134687 A1 | 5/2015 | Sohn et al. | |
| 2015/0149353 A1 | 5/2015 | Linden et al. | |
| 2015/0172778 A1* | 6/2015 | Soon-Shiong | H04N 21/4826 725/56 |
| 2015/0193857 A1 | 7/2015 | Reed et al. | |
| 2015/0213001 A1* | 7/2015 | Levy | G06F 17/3005 715/202 |
| 2015/0262036 A1* | 9/2015 | Song | G06F 17/30 382/159 |
| 2015/0296033 A1* | 10/2015 | Jung | H04L 67/22 709/217 |
| 2015/0356649 A1 | 12/2015 | Glass et al. | |
| 2016/0034437 A1* | 2/2016 | Yong | G06Q 30/0241 715/202 |
| 2016/0062955 A1 | 3/2016 | Maertens et al. | |
| 2016/0063486 A1* | 3/2016 | Purves | G06Q 20/363 705/35 |
| 2016/0063580 A1* | 3/2016 | Greenberg | G06Q 30/0282 705/347 |
| 2016/0086218 A1 | 3/2016 | Li | |

OTHER PUBLICATIONS

Written Opinion dated Dec. 18, 2015 from International Application No. PCT/US15/50478.

Jacqueline Thomas, A Serious Look At Card Based Design, [retrieved on Nov. 17, 2015]. Retrieved from the internet: http://webdesignledger.com/card-based-design.Jun. 12, 2014.

U.S. Appl. No. 14/669,395, filed Mar. 26, 2015.
U.S. Appl. No. 14/678,316, filed Apr. 3, 2015.
U.S. Appl. No. 14/678,330, filed Apr. 3, 2015.
U.S. Appl. No. 14/678,337, filed Apr. 3, 2015.
U.S. Appl. No. 14/678,308, filed Apr. 3, 2015.
U.S. Appl. No. 14/740,539, filed Jun. 16, 2015.
U.S. Appl. No. 14/740,533, filed Jun. 16, 2015.
U.S. Appl. No. 14/740,617, filed Jun. 16, 2015.
U.S. Appl. No. 14/740,839, filed Jun. 16, 2015.
U.S. Appl. No. 14/851,362, filed Sep. 11, 2015.

Sarah Sluis, "Harper's Bazaar Pursues Shoppable Ads With Streamwize", http://adexchanger.com/publishers/harpers-bazaar-pursues-shoppable-ads-with-streamwize/, Jul. 24, 2014, downloaded on May 22, 2015.

Paul Adams, "The End of Apps as We Know Them", https://blog.intercom.io/the-end-of-apps-as-we-know-them/, published around Nov. 2014, downloaded on May 22, 2015.

Paul Adams, "Why Cards are the Future of the Web", https://blog.intercom.io/why-cards-are-the-future-of-the-web/, published around Sep. 2013, downloaded on May 22, 2015.

Allison Schiff, "Sharethrough Brings Its Version of Twitter Cards to the Masses", http://adexchanger.com/native-advertising-2/sharethrough-brings-its-version-of-twitter-cards-to-the-masses/, Dec. 17, 2014, downloaded on May 26, 2015.

Sarah Perez, "Storytelling App Steller Becomes More of a Social Network", http://techcrunch.com/2014/08/21/storytelling-app-steller-becomes-more-of-a-social-network/, Aug. 21, 2014, downloaded on May 26, 2015.

Kaylene Hong, "Steller is a Beautiful Visual Storytelling App, Similar to Storehouse, but for Your iPhone Instead", http://thenextweb.com/apps/2014/03/13/steller-is-a-beautiful-visual-storytelling-app-similar-to-storehouse-but-for-your-iphone-instead/, Mar. 13, 2014, downloaded on May 27, 2015.

Jayanth Prathipati, "Why Do All Mobile Roads Lead Back to the Palm Pre?", http://thetechblock.com/mobile-roads-lead-back-palm-pre/, published on Jun. 11, 2014, downloaded on May 27, 2015.

(56) References Cited

OTHER PUBLICATIONS

Pictela, "Introduction to Pictela", http://www.pictela.com/docs/getting-started/introduction-to-pictela, from Wayback Machine indicating Wayback retrieval date of Mar. 18, 2015, downloaded on Jun. 5, 2015. (Pictela_Intro).
Pictela, https://web.archive.org/web/20130908132533/http://www.pictela.com/formats, from Wayback Machine indicating Wayback retrieval date of Sep. 8, 2013, downloaded on Jun. 5, 2015. (Pictela_Formats).
Twitter, https://web.archive.org/web/20150324121730/https://dev.twitter.com/cards/getting-started, from Wayback Machine indicating Wayback retrieval date of Mar. 24, 2015, downloaded on Jun. 5, 2015. (Twitter_Getting_Started).
Twitter, https://web.archive.org/web/20140929154946/https://dev.twitter.com/cards/overview, from Wayback Machine indicating Wayback retrieval date of Sep. 29, 2014, downloaded on Jun. 5, 2015. (Twitter_Overview).
Max Bulger, "Why Cards?", http://blog.trywildcard.com/post/93983166893/why-cards, published on Aug. 6, 2014, downloaded on May 26, 2015.
Streamwize, http://www.streamwize.com, downloaded on May 22, 2015. (Streamwise).
Streamwize, https://web.archive.org/web/20141222085204/http://www.streamwize.com/#introduction, from Wayback Machine indicating Wayback retrieval date of Dec. 22, 2014, downloaded on Jun. 5, 2015. (Streamwize V2).
Steller, "Everyone has a story to tell. Tell yours with photos, videos and texts", https://steller.co, from Wayback Machine indicating Wayback retrieval date of Apr. 5, 2014, downloaded on Jun. 5, 2015.
Max Bulger, "Introducing the Wildcard iOS SDK", http://blog.trywildcard.com/, Feb. 23, 2015, downloaded on May 26, 2015.
Wildcard, http://www.trywildcard.com/, from Wayback Machine indicating Wayback retrieval date of Feb. 8, 2014, downloaded on Jun. 5, 2015. (WC_homepage).
Wildcard, https://web.archive.org/web/20141115090135/http://www.trywildcard.com/docs/intro, from Wayback Machine indicating Wayback retrieval date of Nov. 15, 2014, downloaded on Jun. 5, 2015. (intro V1).
Wildcard, https://web.archive.org/web/20150321155952/http://www.trywildcard.com/docs/intro, from Wayback Machine indicating Wayback retrieval date of Mar. 21, 2015, downloaded on Jun. 5, 2015. (intro V2).
Wildcard, https://web.archive.org/web/20141115171158/http://www.trywildcard.com/docs/overview, from Wayback Machine indicating Wayback retrieval date of Nov. 15, 2014, downloaded on Jun. 5, 2015. (arch Overview V1).
Wildcard, https://web.archive.org/web/20150321162417/http://www.trywildcard.com/docs/overview, from Wayback Machine indicating Wayback retrieval date of Mar. 21, 2015, downloaded on Jun. 5, 2015. (arch overview V2).
Wildcard, https://web.archive.org/web/20150520042344/http://www.trywildcard.com/docs/overview/, from Wayback Machine indicating Wayback retrieval date of May 20, 2015, downloaded on Jun. 5, 2015. (arch overview V3).
Wildcard, https://web.archive.org/web/20141115090625/http://www.trywildcard.com/docs/sdk/quickstart_sdk, from Wayback Machine indicating Wayback retrieval date of Nov. 15, 2014, downloaded on Jun. 5, 2015. (SDK_QS_V1).
Wildcard, https://web.archive.org/web/20150321172000/http://www.trywildcard.com/docs/sdk/quickstart_sdk, from Wayback Machine indicating Wayback retrieval date of Mar. 21, 2015, downloaded on Jun. 5, 2015. (SDK_QS_V2).
Wildcard, https://web.archive.org/web/20141115090143/http://www.trywildcard.com/docs/sdk/java_sdk, from Wayback Machine indicating Wayback retrieval date of Nov. 15, 2014, downloaded on Jun. 5, 2015. (WC_Java_V1).
Wildcard, https://web.archive.org/web/20150321184716/http://www.trywildcard.com/docs/sdk/java_sdk, from Wayback Machine indicating Wayback retrieval date of Mar. 21, 2015, downloaded on Jun. 5, 2015. (WC_Java_V2).
Wildcard, https://web.archive.org/web/20141115090150/http://www.trywildcard.com/docs/sdk/ruby_sdk, from Wayback Machine indicating Wayback retrieval date of Nov. 15, 2014, downloaded on Jun. 5, 2015. (WC_Ruby_V2).
Wildcard, https://web.archive.org/web/20150321180400/http://www.trywildcard.com/docs/sdk/ruby_sdk, from Wayback Machine indicating Wayback retrieval date of Mar. 21, 2015, downloaded on Jun. 5, 2015. (WC_Ruby).
Wildcard, https://web.archive.org/web/20141115090647/http://www.trywildcard.com/partners, from Wayback Machine indicating Wayback retrieval date of Nov. 15, 2014, downloaded on Jun. 5, 2015. (WC_Partners_V1).
Wildcard, https://web.archive.org/web/20150315070647/http://www.trywildcard.com/partners, from Wayback Machine indicating Wayback retrieval date of Mar. 15, 2015, downloaded on Jun. 5, 2015. (WC_Partners_V2).
Wildcard, https://web.archive.org/web/20141126020058/http://www.trywildcard.com/docs/faq/, from Wayback Machine indicating Wayback retrieval date of Nov. 26, 2014, downloaded on Jun. 5, 2015. (FAQ_V1).
Wildcard, https://web.archive.org/web/20150512091432/http://www.trywildcard.com/docs/ios-sdk/tutorials, from Wayback Machine indicating Wayback retrieval date of May 12, 2015, downloaded on Jun. 5, 2015. (WC_IOS_Tutorials_V1).
Wildcard, https://web.archive.org/web/20150512091432/http://www.trywildcard.com/docs/ios-sdk/tutorials, from Wayback Machine indicating Wayback retrieval date of May 12, 2015, downloaded on Jun. 5, 2015. (WC_IOS_Sample_Projects_V1).
Wildcard, https://web.archive.org/web/20141115171308/http://www.trywildcard.com/docs/schema, from Wayback Machine indicating Wayback retrieval date of Nov. 15, 2014, downloaded on Jun. 5, 2015. (WC_Card_Schema_V1).
Wildcard, https://web.archive.org/web/20150518060819/http://www.trywildcard.com/docs/schema, from Wayback Machine indicating Wayback retrieval date of May 18, 2015, downloaded on Jun. 5, 2015. (WC_Card_Schema_V2).
Wildcard, http://www.trywildcard.com/docs/faq#shopify, not available on Wayback Machine, downloaded on Jun. 5, 2015. (WC_FAQ_V2).
U.S. Office Action dated Jul. 31, 2015 from U.S. Appl. No. 14/678,330.
Friendly Bit, "Rendering a Web Page—Step by Step", published on Jan. 11, 2010.
Hegaret et al., "What is the Document Object Model", published on Nov. 7, 2003.
GitHub, "Reading & Writing JSON", published on Oct. 6, 2013.
U.S. Office Action dated Aug. 13, 2015 from U.S. Appl. No. 14/678,337.
U.S. Office Action dated Aug. 14, 2015 from U.S. Appl. No. 14/678,308.
U.S. Office Action dated Sep. 16, 2015 from U.S. Appl. No. 14/678,316.
U.S. Final Office Action dated Dec. 1, 2015 from U.S. Appl. No. 14/678,330.
Notice of Allowance dated Feb. 1, 2016 from U.S. Appl. No. 14/678,316.
Wikipedia, HyperCard, https://en.wikipedia.org/wiki/HyperCard, downloaded on Feb. 3, 2016.
International Search Report dated Feb. 2, 2016 from International Application No. PCT/US2015/54599.
Written Opinion dated Feb. 2, 2016 from International Application No. PCT/US2015/54599.
U.S. Final Office Action dated Feb. 25, 2016 from U.S. Appl. No. 14/678,308.
U.S. Final Office Action dated Mar. 10, 2016 from U.S. Appl. No. 14/678,337.
Notice of Allowance dated Mar. 17, 2016 from U.S. Appl. No. 14/678,330.

(56) References Cited

OTHER PUBLICATIONS

Stackoverflow, Aug. 15, 2009.
Web Monkey Internet Publication, Feb. 15, 2010.
MSDN, Introduction to DHTML Behaviors, [retrieved on Apr. 4, 2016].Retrieved from the internet: https://msdn.microsoft.com/en-us/library/ms531079(v=vs.85).aspx .Jun. 12, 2014. (Intro_to_DHTML_Behaviors).
U.S Office Action dated Mar. 28, 2016 from U.S. Appl. No. 14/993,264.
U.S. Office Action dated Mar. 24, 2016 from U.S. Appl. No. 14/993,385.
U.S. Office Action dated May 20, 2016 from U.S. Appl. No. 14/851,362.
U.S. Office Action dated May 5, 2016 from U.S. Appl. No. 14/993,829.
Hypercard.org, http://web.archive.org/web/20121114055910/http://hypercard.org/hypercard_file_format.php, from Wayback Machine indicating Wayback retrieval date of Nov. 14, 2012, downloaded on Jun. 13, 2016.
Wikipedia, http://web.archive.org/web/20040309172512/http://en.wikipedia.org/wiki/HyperCard, from Wayback Machine indicating Wayback retrieval date of Mar. 9, 2004, downloaded from the internet on Jun. 21, 2016.

* cited by examiner

| CARD | | |
|---|---|---|
| DESIGN QUALITY | TEMPLATE BASED AUTHORING | AUTHORING TOOL THAT ENABLES THE CREATION OF BEAUTIFUL CARDS |
| | BEAUTIFUL, WELL DESIGNED TEMPLATES | |
| FUNCTION | A DIVERSE COMPONENT LIBRARY | AUTHORING OBJECTS THAT EXPOSE DEEP FUNCTIONALITY IN EASILY USABLE MODULES |
| | POWERFUL AND EXTENSIBLE MODULES | |
| INTEGRATION | STRUCTURED DATA INTEGRATORS | CONNECTORS THAT INPUT AND OUTPUT DATA TO AND FROM OTHER SYSTEMS |
| | UNSTRUCTURED DATA GATHERERS | |

FIG. 2

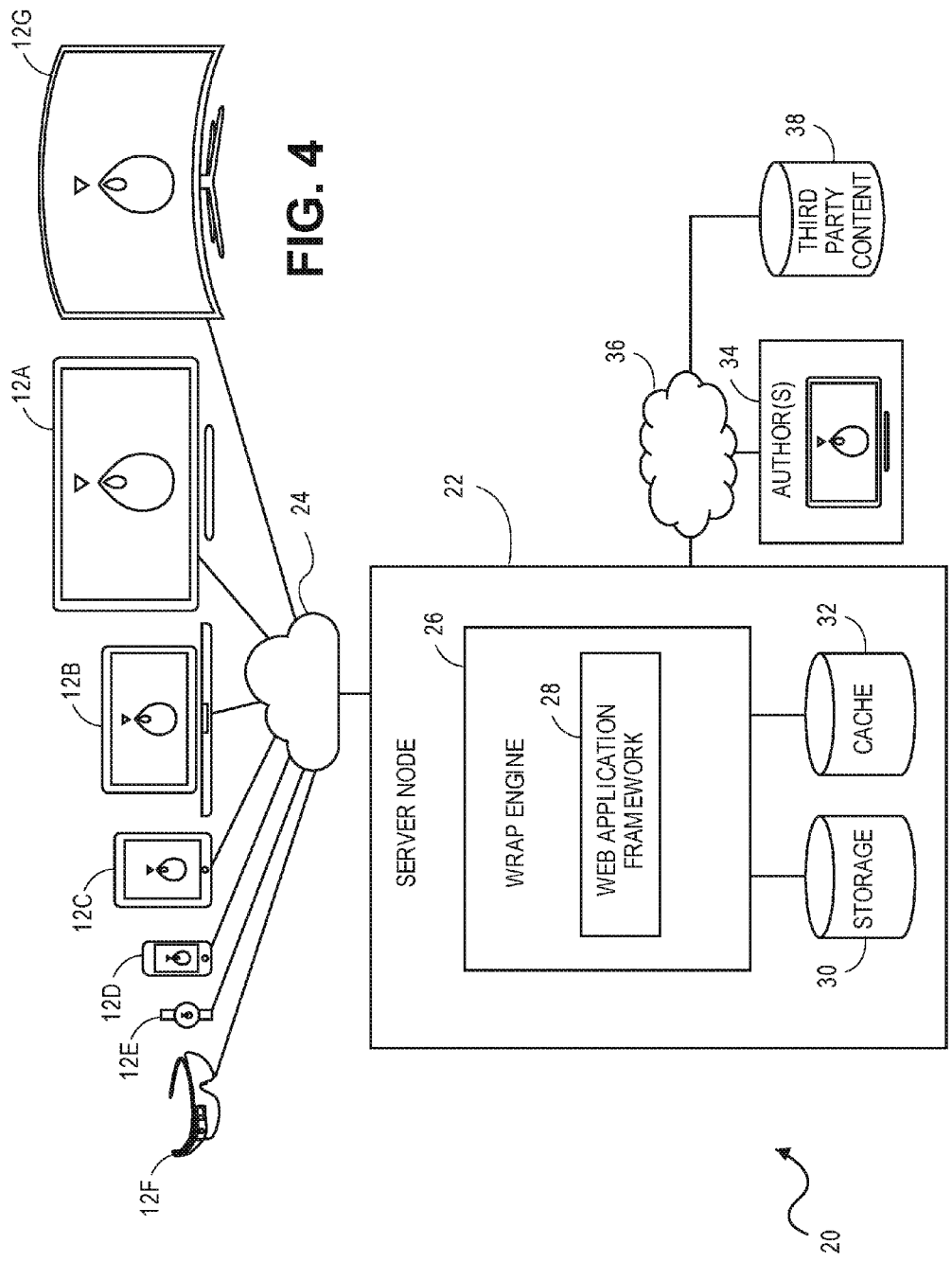

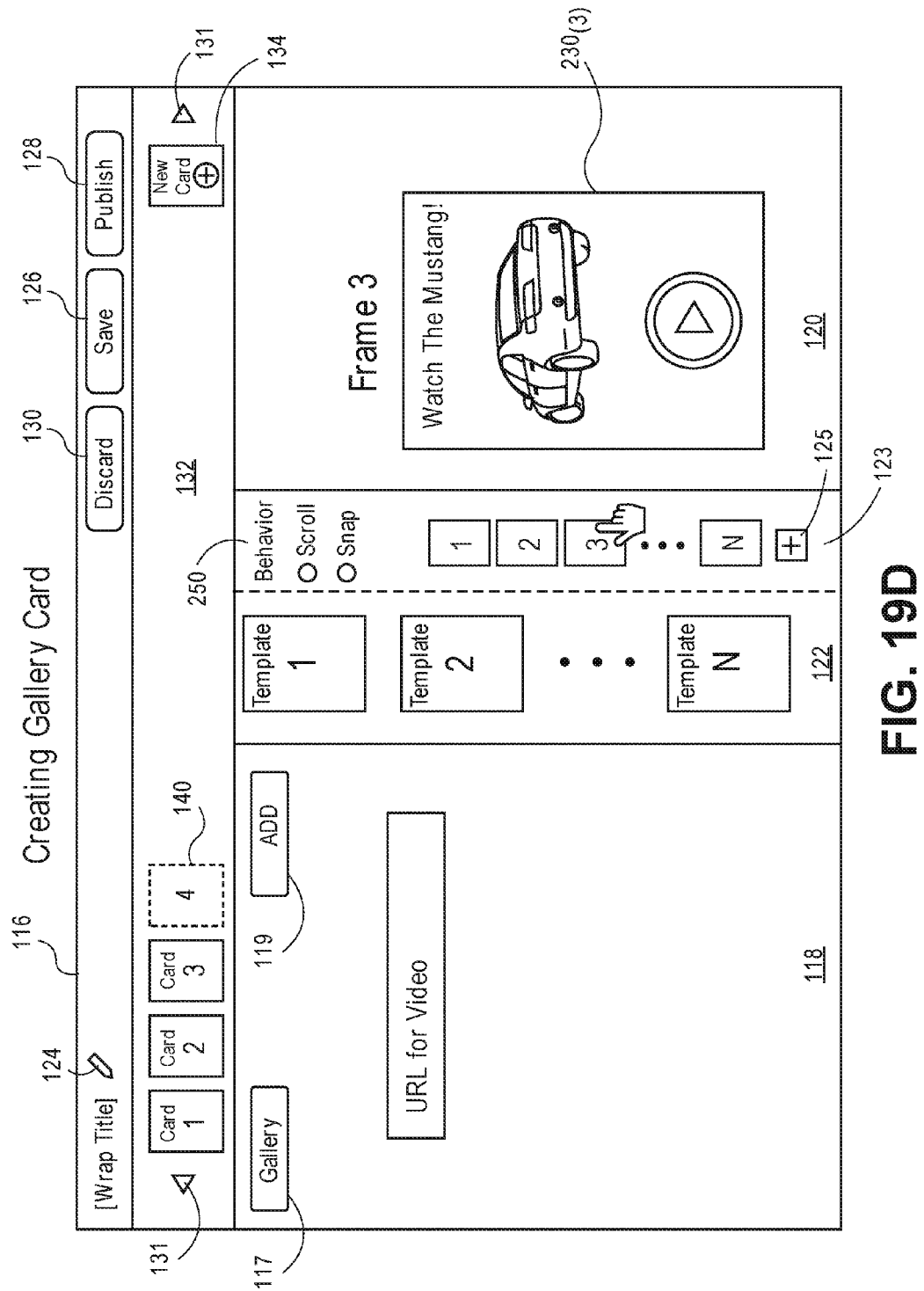

Permission Tool

| WRAP PACKAGE | EDIT | SHARE | | EDIT | | |
|---|---|---|---|---|---|---|
| Name | Yes ☐ No ☐ | Yes ☐ No ☐ | | Yes ☐ No ☐ | | |

| | EDIT | | SHARE | | DELETE | | MIX | |
|---|---|---|---|---|---|---|---|---|
| | Yes | No | Yes | No | Yes | No | Yes | No |
| CARD 1 | ☐ | ☐ | ☐ | ☐ | ☐ | ☐ | ☐ | ☐ |
| CARD 2 | ☐ | ☐ | ☐ | ☐ | ☐ | ☐ | ☐ | ☐ |
| CARD 3 | ☐ | ☐ | ☐ | ☐ | ☐ | ☐ | ☐ | ☐ |
| ⋯ | | | | | | | | |
| CARD N | ☐ | ☐ | ☐ | ☐ | ☐ | ☐ | ☐ | ☐ |

FIG. 21D

AUTHORING TOOL FOR THE AUTHORING OF WRAP PACKAGES OF CARDS

CROSS REFERENCE TO RELATED APPLICATIONS

This application is a Continuation of International Application No. PCT/US15/50478 filed on Sep. 16, 2015 which claims the benefit of U.S. Provisional Patent Application Nos. 62/062,056 and 62/062,061, both filed on Oct. 9, 2014 and both entitled "Wrapped Packages of Cards for Conveying a Narrative With Media Content, Providing Application Functionality, and Engaging Users in E-Commerce". International Application No. PCT/US15/50478 further claims priority of U.S. Provisional Patent Application Nos. 62/084,171, filed Nov. 25, 2014; 62/091,866, filed Dec. 15, 2014; 62/114,675, filed Feb. 11, 2015, 62/133,574 filed Mar. 16, 2015; 62/195, 642, filed Jul. 22, 2015; and 62/210,585, filed Aug. 27, 2015, each entitled "Card Based Package for Distributing Electronic Media and Services. International Application No. PCT/US15/50478 also claims the benefit of U.S. Provisional Application No. 62/144,139, entitled "Authoring Tool for Creating Wrap Packages", filed Apr. 7, 2015; and U.S. Provisional Application No. 62/170,438, filed Jun. 3, 2015. This application is a Continuation of U.S. patent application Ser. No. 14/851,362, filed Sep. 11, 2015, entitled "Authoring Tool for the Authoring of Wrap Packages of Cards." This application is a Continuation in Part of U.S. patent application Ser. No. 14/852,138, filed on Sep. 11, 2015, and entitled "Wrap Descriptor For Defining A Wrap Package Of Cards Including A Global Component." Each of these priority applications is incorporated herein by reference for all purposes.

BACKGROUND

This invention relates to a media-authoring tool, and more particularly, to an authoring tool for the authoring of wrapped packages of cards.

The above-listed non-prior art related applications describe a new media content type, referred to as "wrap packages". The terms "wrap" or "package" are interchangeably used herein to refer to wrap packages.

A wrap package is a collection of cards that are each selectively authored to include (i) one or more types of media content such as text, images, photos, video, etc., (ii) application functionality and/or (iii) e-commerce related services. The cards in a wrap are also typically authored to define one or more linear sequence(s) when consumed. With wrap packages, an author thus has the ability to select media content, combined with application-like and website functionality, and combine them all into an elegant, card-based, narrative. As a result, the author can create compelling stories using media, interwoven with interactive functionality and/or e-commerce services. Wrap packages are, therefore, ideal, but not necessarily limited to, delivering a unique, interactive. "book-like", experience to the mobile web, which previously has been not possible.

The cards of wrap packages are navigation metaphors. Each card can be authored to group related information that can be easily consumed within a user interface experience by swipe (or other simple gesture) navigation from card-to-card.

Cards have a visual representation intended to evoke similarities to their physical counterparts. They have a fixed portrait aspect ratio that makes them ideally suited to current mobile computing devices as well as easy to scale up to and arrange to fit other display form factors, such as provided on laptop and desktop computers as well as smart TVs. The physical card metaphor can also extend to the interactive behavior of cards in a wrap, as the user can use gestures that evoke the "flipping" of cards in a deck or bound booklet to navigate between them.

In addition, each card in a wrap has defined content that is displayed in a predefined layout. In general, the cards in a wrap have the same size and aspect ratio. The aspect ratio is preferably device independent and is preferably maintained regardless of device orientation and/or display window size.

Cards are like containers for holding and distributing media content, such as text, images, photos, audio, video and the like. In addition, cards may also contain or hold executable objects that provide or enable real-time features, such as application functionality (i.e., the ability to schedule appointments, engage in online chats or conversations) and support e-commerce related services (i.e., the ability to purchase goods and/or services). The multimedia content and/or interactive services contained by any given card can be determined entirely in advance or as late as the moment the wrap is consumed by the end-user. Such media content and executable objects are sometimes referred to herein as card "assets."

Cards, however, can differ from their physical counterparts in ways that provide for unique presentations of content or the aforementioned application functionality and/or e-commerce services. For example, a gallery card provides the ability to present an expanded amount of content in a vertically stacked orientation such that the overall length (i.e., the number of cards or in a horizontal sequence) of the wrap is not affected by the amount of content in the wrap. This aids in navigation since the user can flip to the previous or next card regardless of their current position in the gallery.

Wrap packages are delivered and rendered in a browser as a sharable and savable message. Wrap packages thus provides an app-like user experience that is delivered as a live, interactive, message from a cloud-based platform, using for example, the Software as a Service (SaaS) model. A wrap is thus a portable container of multimedia content, and interactive services, designed for ease of delivery, exchange, and consumption.

Wrap packages are also consumable anywhere, meaning they have the ability to be resolved and displayed on just about any type of device (mobile phones, laptops, tablets, wearable computing devices such as smart watches, desktop computers, smart TVs, etc.), regardless of the platform (e.g., iOS, Android, Microsoft, etc.). Wrap packages are thus platform and device independent. Wraps do not have to be written for any specific platform, such as iOS or Android, or for any specific device or class of devices (e.g. smart phones, tablets, desktops, etc.).

Wrap packages are thus a mobile-first marketing and commerce platform that ideally provides a beautiful world of storytelling in bite-size moments that get and hold attention. In addition, the unique characteristics of (i) authoring once and running on almost any device, regardless of the operating system or the type and (ii) the ability to easily distribute wrap packages similar to messages, together are a powerful construct that potentially can make the use of wrap packages near universal.

By creating wrap packages, businesses and other organizations can simply and cheaply create, distribute, and manage storytelling mobile web user experiences, app like functionality and e-commerce, all in the context of wrap packages delivered directly to consumers. Where businesses used to have to build destinations (websites) or use monolithic systems (apps), they can now provide consumers, particularly mobile device users, with a user experience that delivers the content they want combined with a complementary palette of functions and/or e-commerce related services.

Wrap packages thus solves a number of current problem with the mobile web. Unlike web sites, wrap packages are easy to consume on mobile devices and offer the opportunity to create compelling narratives and user experiences. In addition, the ability to incorporate app-like functionality into wraps provides a multi-function app-like experience, without having to develop an app, be in an app, download an app, or open several apps.

The uniqueness of wrap packages creates opportunities for business and other organizations alike to innovate and improve marketing efforts, customer support, and user experiences in ways previously not possible, because an enabling interface and platform did not exist. Wrap packages can thus potentially define the next generation interactive web paradigm, particularly for mobile, although for desktop and other types of devices as well.

Given all their features, advantages and benefits, an authoring tool that enables the easy creation of wrap packages is therefore needed.

SUMMARY

The present invention is directed to an authoring tool for authoring wrap packages of cards. The authoring tool includes a set of tools that enable an author to create a new card of a wrap selected from a variety of card templates. In various embodiments, the card templates include textual, video, image/photo, document, gallery, chat, location/GPS, transact, appointment, and end-of-wrap card templates. When a particular card template is selected, the template is then duplicated to create the new card. Thereafter, the author may author the card to include various components, content, attributes, layouts, styles triggers and/or behaviors. As the cards of the wrap are created, the authoring tool provides the author with the ability to order the sequence of the cards. The authoring tool thus enables authors to selectively create wrap packages that include media that conveys a narrative story and application functionality. Wrap packages are thus conducive for conducting e-commerce in a manner that has not previously been possible.

In a non-exclusive embodiment, the authoring tool is further configured to generate (i) a wrap descriptor that specifies the set of cards associated with the wrap package as authored, (ii) a structure, layout and content of the set of cards suitable for display on a computer display separately from their presentation, and (iii) a plurality of card descriptors, each card descriptor arranged to define the content, structure and layout of an associated one of the cards. In a non-exclusive variations, the wrap descriptor and/or the card descriptor is/are a data object(s), such as, but not limited to JSON or BSON data objects.

In other embodiments, the authoring tool is also configured to generate the wrap descriptor that defines the wrap package at runtime. The authoring tool generates the wrap descriptor by (i) generating one or more data objects for the cards of the wrap package respectively and (ii) generating the wrap descriptor from the one or more data objects for the cards of the wrap package respectively. As a result, the wrap descriptor defines the wrap package at runtime.

In yet another embodiment, the authoring tool enables the authoring of a gallery card among the plurality of cards of the wrap package. When creating a gallery card, the authoring tool enables the author to (i) select a gallery card among all the different types of cards for authoring, (ii) select a frame template among one or more frame template types, (iii) create a new frame from the selected frame template by duplicating the frame template, (iv) author the new frame, (v) repeat steps (i) through (iv) for each frame in the gallery card and (vi) define a sequence order for all the frames of the gallery card.

BRIEF DESCRIPTION OF THE DRAWINGS

The invention and the advantages thereof, may best be understood by reference to the following description taken in conjunction with the accompanying drawings in which:

FIG. 2 is a diagram depicting the design, functionality and data integration capabilities of a representative card in a digital companion wrap package according to the principles of the present invention.

FIG. 4 is a block diagram of a representative system for authoring, storing, distributing, and consuming wrap packages in accordance with the principles of the present invention.

FIGS. 19A through 19E illustrate the authoring of a gallery card using the authoring tool of the present invention.

FIGS. 21C and 21D illustrate a permission tool for setting permissions associated with an authored wrap package in accordance with a non-exclusive embodiment of the invention.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

Figure 1:
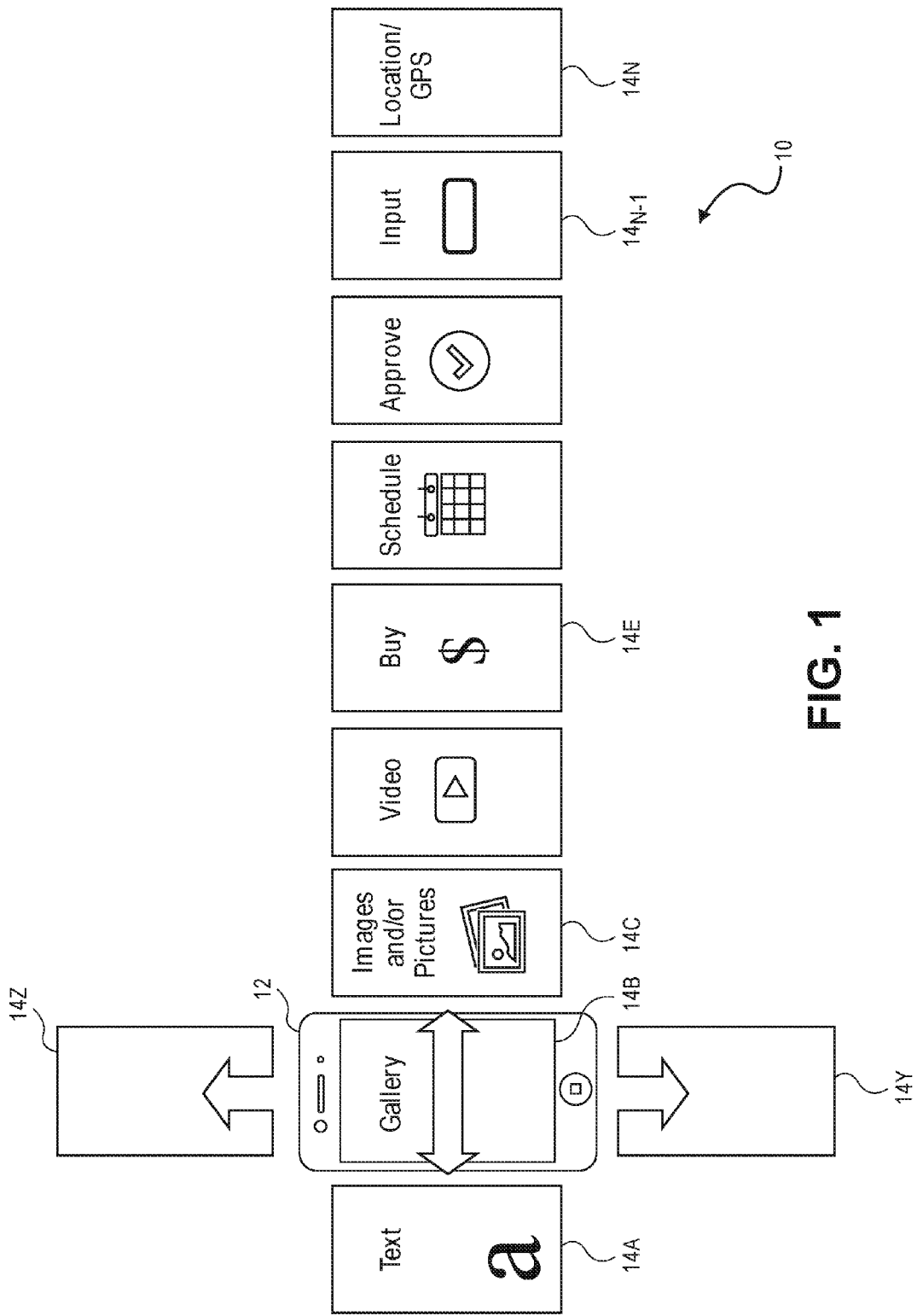
FIG. 1 is a diagram illustrating a wrap package layout that includes a plurality of cards threaded together so as to be viewable in linear arrays in accordance with the principles of the present invention.

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obscure the invention.

A wrap package, which includes a set of cards arranged in one or more predefined sequences, is a unique delivery mechanism for the distribution of authored content and functionality. Wraps are typically characterized by the following:

(a) Each card is selectively authored to include media, such as text, photos, images, video, documents, etc. Since the cards are arranged in their one or more sequences, the media can be authored to convey a "story telling" narrative that unfolds as the cards are sequentially browsed;

(b) The cards of wraps can also be selectively authored to include web or application like functionality;

(c) The layout of the content of any particular card is immutable. That is, the positional relationship between the displayed components of any given card remains the same, regardless of the size, width, height, or type of display on which the wrap is rendered;

(d) The cards of a wrap all have a defined presentational aspect ratio (typically, but not necessarily, a portrait view);

(e) Wraps are designed for, although not necessarily limited to, mobile. On mobile devices, the cards of wraps are navigated by swipe-browsing. Wraps thus mimic the way people already use their smartphones and other mobile devices such as tablets. Every swipe reveals a new card with a "bite-size" message and/or content.

As the cards are sequentially swiped during consumption, the story-telling narrative of the wrap unfolds. In addition, the user experience in viewing a given wrap is almost always the same, regardless of the type of viewing device, since each card is immutable and maintains the defined aspect at runtime.

Wraps are authored using a template-based authoring tool that requires little to no technical expertise. Wraps can, therefore, be simply and inexpensively created, allowing online retailers and others to promote and deliver their brand, products and/or interactive services through the web with an ease previously not possible. Up to now, developing apps or web sites typically required a high degree of software sophistication, significant cost, and took months or weeks to create. Now with wrap, businesses and other content providers can inexpensively create, with little software expertise, interactive wrap packages in hours or minutes.

Another advantage of wraps is that they do not require a dedicated infrastructure for distribution and viewing. By using wrap identifiers, such as URLs, wraps can be distributed to a specific individual or widely to many either by including the wrap identifiers in messages (e.g., emails, texts, etc.), by posting in social media feeds (Facebook, Twitter, etc.), and/or embedding in online advertisements, etc. This attribute, meaning the ability to easily share and distribute wraps over already pervasive communication channels, is likely to increase the possibility of (i) wraps in general becoming ubiquitous in the mobile economy and (ii) individual wraps going "viral".

Consumers now spend vast amounts of their time and consciousness on their mobile phones and tablets. As a result, the ability to easily distribute wraps to mobile devices helps brands intimately deliver elegant, user experiences, precisely where it matters the most. Wraps thus have the ability to transform mobile devices into powerful business tools. By delivering wraps to mobile devices, it helps brands sell more and build recognition, relationships and loyalty among customers.

In most situations, all that is needed to view a wrap is a browser. When a wrap is requested for viewing, a runtime viewer is provided along with a wrap descriptor. On the consuming device, the runtime viewer is arranged to deserialize the cards of the wrap descriptor and to generate a runtime instance of the wrap. In other situations, the runtime viewer may already be included in a native application residing on the consuming device.

Wraps are thus a groundbreaking, mobile-first, storytelling and e-commerce platform. By making it simple, inexpensive and easy to (i) author narrative wraps with interactive functionality and (ii) to distribute wraps like messages, wraps have the unique ability to:

(a) "democratize" the web by providing a powerful, low barrier, low cost alternative to apps and web sites;

(b) unlock the vast story-telling potential of the Internet, and (c) drive e-commerce by building customer relationships and increasing web conversion rates via the interactive functionality provided in wraps.

Wraps thus solve many of the problems and limitations associated with the existing methods for distributing content and conducting e-commerce, such as PDF files, web sites, dedicated apps, and the like. With all these benefits, wraps have the potential of becoming ubiquitous, ushering in a new paradigm referred to herein as the "Narrative Web".

A wrap descriptor is composed of a set of card descriptors, each defining a structure, layout and content of an associated card. The wrap descriptor may also include various wrap level components, attributes, behavior declarations and/or metadata.

Wrap and/or card descriptors will often separate content from their presentation. In other words, descriptors with content of any appreciable size will typically reference these asset(s), as opposed to incorporating them into the descriptor itself. With this approach, the runtime viewer is responsible for obtaining the external assets at runtime. Wraps are thus "lightweight", meaning they are easier to download and distribute over mobile and cellular networks, which tend to be relatively low bandwidth.

Each card descriptor also commonly includes component descriptor(s) identifying the component(s) in the card and any behaviors or other attributes associated with such component(s). Behaviors are often declared rather than being explicitly defined within the descriptors. Thus, the runtime viewer is responsible for associating the behaviors declared in the descriptor with their associated components in the runtime instance. In other embodiments, card behaviors can be authored inline or otherwise associated with the cards.

During consumption of a wrap, the runtime viewer on the consuming device initially generates an object graph from the wrap descriptor and then subsequently generates a Document Object Model ("DOM") from the object graph. The runtime viewer then cooperates with the browser on the device to generate a runtime instance of the wrap based on the DOM. This two-step approach differs from how conventional web pages are usually processed and displayed. Typically, the browser on a consuming device will convert Hyper Text Markup Language (HTML) defining a web page into a DOM, which is then used by the browser to directly display the web page. There is no intermediate transformation step of converting a "raw" wrap descriptor into an object graph prior to the browser displaying content based on a DOM.

In addition, the runtime viewer creates a card list in the sequence order(s) from the wrap descriptor and provides navigation tools that operate in cooperation with the browser to facilitate transitioning between cards during consumption. In non-exclusive embodiments, the order of the cards is implicit in the descriptor structure. Since the navigation functionality is provided by the runtime viewer, the cards themselves do not have to include navigational constructs. That is, there is no need to provide explicit linking or navigation components in the cards to facilitate normal navigation between adjacent cards in the wrap, which helps simplify card design. Since normal navigation is handled by the runtime viewer in cooperation with the browser, the cards only require navigational constructs when the author desires to override the standard wrap navigational features. This allows wrap authors to concentrate on creating the desired content and visual appearance of their wraps, without needing to worry about the platform dependent formatting or navigation requirements. In other embodiments, however, cards may include navigational constructs that operate either in place of or in cooperation with the navigation tools provided by the runtime viewer.

The navigation tools that are actually used for any particular wrap instance can be device and/or platform dependent. For example, swipe navigation is preferably facilitated when the consuming device has a touch sensitive screen, as is popular in most mobile computing devices such as smartphones and tablet computers. Selectable GUI navigation buttons (such as arrows, buttons, text-based swipe directions, etc.) may also be displayed on the screen to facilitate navigation between cards. In addition, non-touch screen based navigation may be facilitated when the consuming device has as a selection device (e.g., a mouse) and/or a keyboard or keypad where various keys (e.g., right, left, up and down arrow keys, etc.) may be used to navigate between cards.

The cards of the wrap packages are ideally authored in one or more linear sequences so that a book-like narrative unfolds, not only through the cards themselves, but also by the transition between the cards, as they are sequentially browsed. In addition, the wrap packages are portable objects that may exist within a social feed or within a custom application. Wrap packages are also readily distributed, similar to electronic messages, through e-mail, messaging, social-media, or via a variety of other electronic communication platforms. As a result, wrap packages are consumable, sharable and savable objects. As the cards are browsed in the one or more linear sequences during consumption, the user experiences the unfolding of the authored narrative, including the defined media content interwoven with the complementary application functionality and/or e-commerce related services. As a result, the entire user experience including any application functionality and/or e-commerce related services is substantially contained within the context of the wrap package itself, typically (but not necessarily) without the need to navigate to other sites.

Referring to FIG. 1, a diagram of a non-exclusive embodiment of a wrap package 10 viewable on a computing device 12 is illustrated. The wrap package 10 includes a plurality of cards 14 that are threaded together so as to enable browsing by swiping in one or more linear sequences. Any of the cards 14 may optionally include various types of media, such as text, images or photos, audio, video, a live or streaming feed of media, 3-D objects, or content from other wrap packages (not illustrated). Any of the cards 14 may also optionally provide application functionality, such as the ability to receive input data or display dynamically generated data, a calendar for scheduling or booking appointments or making reservations for goods and/or services, location/GPS, etc. In addition, any of the cards 14 may optionally provide or support e-commerce services, such as the ability to browse products in a catalog, communicate with an online sales representative, and/or purchase product(s).

By way of example, in the schematically illustrated wrap package 10, card $14_A$ includes text, card $14_B$ presents a gallery, card $14_C$ includes images or pictures, card $14_D$ includes a video, card $14_E$ includes e-commerce related service(s), card $14_F$ includes a calendar function for scheduling appointments and/or booking reservations, card $14_G$ includes a user approval function, $14_{n-1}$ includes a data entry function, card $14_N$ includes location or GPS services, etc.

On computing devices with touch sensitive screens, the cards 14 of wrap packages 10 can be navigated linearly by swiping or by using other suitable interfaces, such as a stylus or pen. In devices without a touch sensitive screen, alternative user interfaces are provided to facilitate transition (e.g., flipping) from one card to the next. In the context of the present application, the terms "swipe-browsing" or "swiping" is intended to mean the navigation from one card to an adjacent next card. With devices with touch sensitive screens, swipe browsing is typically implemented by the sliding of a finger or other input device across the display. With devices without touch-sensitive screens, other navigation tools such as a mouse, keyboard or remote control, can be used for swipe browsing. When a swipe is performed, the content of the next card in the sequence is displayed. For example, by swiping either right to left or vice versa, the next card, depending on the swipe direction, in the horizontal sequence is displayed. Similarly, by swiping up and/or down, the next card in either the up or down sequence is displayed. Thus, the user experience when consuming a wrap package is the wrap package itself (as opposed to a remote web site for example), viewable via a swipe-able interface.

Additionally, some cards may also include one or more embedded link(s) that, when selected, enable navigation to either a non-adjacent card not in linear sequence or to another wrap package, a web page or some other location entirely outside of the wrap package.

It should be noted that the particular layout of cards 14 in the wrap package 10 illustrated in FIG. 1 is merely illustrative. Both the number of rows and/or columns, and the number of sequential cards 14 within any given row or column, may vary widely as appropriate to deliver the desired user experience, narrative, content, functionality and services of the wrap package 10.

With gallery cards, such as card $14_B$ of FIG. 1, swiping allows for the scrolling through of the contents of a card 14, which are typically too voluminous to be displayed within the size of a fixed screen display, such as that provided on a mobile phone. In an illustrative example, a particular wrap package 10 may include a plurality of cards organized in a horizontal sequence. By swiping right to left or vice versa, the next card 14 or the previous card 14 in the horizontal sequence is displayed. In the vertical direction, however, one or more selected cards $14_B$ may be configured in the gallery format, allowing the viewer to scroll up or down by swiping through media content of the gallery. In an illustrative but non-exclusive example, a wrap package 10 authored and distributed by a car rental business may include a horizontal sequence of cards 10, each dedicated to a category of information pertinent to a traveler (i.e., cards dedicated to local hotels, restaurants, local tourist attractions respectively). By swiping up or down for a given card, relevant material within each category is displayed in a gallery format. For instance by swiping up or down the hotel card (not illustrated), a gallery of a number of local hotels is displayed. In variations of the gallery card format, the behavior invoked by an up or down swipe may differ. For example, swiping up or down my result in a continuous "rolling" of the content of the gallery card. In other embodiments, an up or down swipe may result in a "snap" action with the next item of content appearing after the snap, for example, as illustrated as cards 14Y and 14Z in FIG. 1.

The wrap package 10 is identified, as described in more detail below, through the use of a unique identifier (wrap ID 42) assigned to the package 10. By way of example, the wrap ID 42 may take the form of a Uniform Resource Identifier (URL). As such, the wrap ID may thus be provided as a link, which can readily be used to effectively send or retrieve the wrap package. That is, the wrap package may effectively be "sent" to a potential viewer as a link using any of the wide variety of mechanism that can currently—or in the future—be used to send a link or convey the URL. By way of example, this may include e-mail messages, text messages, SMS messages, via a Twitter tweet, as a post on social media such as Facebook, etc., discussion forums, walls or the like, as a link embedded in a document, an image, or a web page or any other media type, in a blog or micro blog (e.g. Tumblr), or any other messaging or electronic content distribution mechanism or communication platform currently known or developed in the future.

Wrap packages are therefore significantly different and more powerful than web sites. For example with wrap packages, they can be consumed "on the spot" where it is located (i.e., when delivered to a mobile device for example). In contrast with the selection of a banner ad appearing within a web site, where the viewer is taken to a new web page that is not (a) necessarily designed for mobile devices and (b) is self navigating, making it very difficult for a narrative to be conveyed. As a result, the user experience, particularly on mobile devices, may be very poor. Hence, the friction of providing a compelling user experience with wrap packages is far less than with web site.

The cards 14 of a wrap 10 can be displayed on the screen of virtually any type of computing device. It should be appreciated that the card metaphor is particularly well suited for use on mobile devices such as smart phones, tablet computers, etc., which makes the format particularly powerful for authors interested in developing content tailored for mobile devices. By delivering wrap packages 10 to mobile devices, users and potential customers can be won over at their point of intimacy, where they spend their time and consciousness. Wrap packages thus allow authors, merchants and other content providers to create compelling narratives and provide ongoing application functionality and/or e-commerce support directly delivered anytime and anywhere to users, transforming their mobile devices into a powerful business tool that enhances mobile engagement and relationships. As a result, higher customer satisfaction, better brand engagement, and a higher conversion (i.e., click-through rates) and repeat e-commerce related activity compared to other forms of after sale promotions and merchandising will likely result.

Referring to FIG. 2, a diagram depicting the design, functionality and data integration capabilities of a representative card 14 in a wrap package 10 is shown.

By using card templates, authoring tools and media collaboration tools, beautiful, content-rich, cards 14 may be created either by automation or by individuals with even minimal design skills and experience. As such, the author, either a person or an automated process, has the ability to easily create beautiful content-rich cards 14 that can selectively include text, images, photos, and other media similar to PDF files, but optionally, with the added benefit of additional application functionality and/or e-commerce related services, either embedded in the same card 14, or other cards 14, in the wrap package 10. In the automated authoring embodiments, the content of a card 14 can be populated by a data processing system that automatically uploads predefined content into various defined fields of a card template.

By authoring (i) the horizontal and/or vertical sequence order for swipe-browsing the cards 14, (ii) the media content in each card 14, (iii) application functionality and/or (iv) the e-commerce services for each card 14, it is possible to author Wrap packages 10 that are content-rich, highly interactive, and that define a palette of services, functions and experiences related to the wrap package 10, all within the context of a story book-like narrative that unfolds as the cards 14 are browsed in their sequence order(s).

In addition, the use of component libraries and the authoring tools allow for the authoring of cards 14 with a diverse, easy to use, reusable, set of component modules that provide a wide variety of application functions and e-commerce services. Such application functions include, but are not limited to, for example, calendar functions, scheduling of an appointment functions, reserving or booking goods and/or services, such as a car rental, hotel room, or table at a restaurant, map or GPS related functions, support for online conversations, streaming live video or other media feeds, etc. In addition, e-commerce related services include displaying product and/or service offerings, displaying user account information, engaging a sales representative in an online chat session, and enabling the purchase of goods and/or services, etc. These card services or "plugins" are all part of an ecosystem supported by a Wrap run-time engine viewer (described in more detail below), which allows the various plug-in services to all communicate and inter-operate together. For example, a calendar plugin could be configured to communicate with a reservation booking database plugin, which could communicate with a chat plugin. The communication among the various plug-in services is accomplished through a common set of APIs. As a result, the interactivity, functionality and usefulness of wrap packages 10 are significantly enhanced by such an ecosystem of connected plug-in services.

Finally, the integration capabilities of cards 14 enable the bi-directional flow of data from users browsing a wrap package 10 to other cards 14 in the same wrap package 10, to another wrap package 10, or a remote data processing system. For example, a card 14 can be integrated with the back end software system for a large online retailer, which will automatically populate the content of a card 14 with product images, user account information, prior purchase information, and a host of other user-related information. Alternatively, a card 14 can be used to capture data input from a user and provide it to a retailer's back end e-commerce software system. For example, a card 14 may display a one-click "Buy Now" function for a displayed item. When the Buy Now function is selected, previously saved user account information is automatically delivered to the back end software system of the online merchant, which then processes the information to complete the transaction.

The data entered by the user and/or the data presented via a card 14 of a wrap package 10 may thus be integrated with the back-end database, cloud computing services, web sites, etc., regardless if managed by an author and/or distributor of the wrap package or by a third party. The data processing for the purchase of goods and/or services, appointments, and/or other application functionality and e-commerce related services may, therefore, be performed either within the wrap packages 10 itself or integrated with a remote data processing resource.

The data integration capabilities of cards 14 can also be shared among other cards 14 in the same wrap package 10, with other wrap packages, with web sites, or just about any other data processing system.

Figure 3:
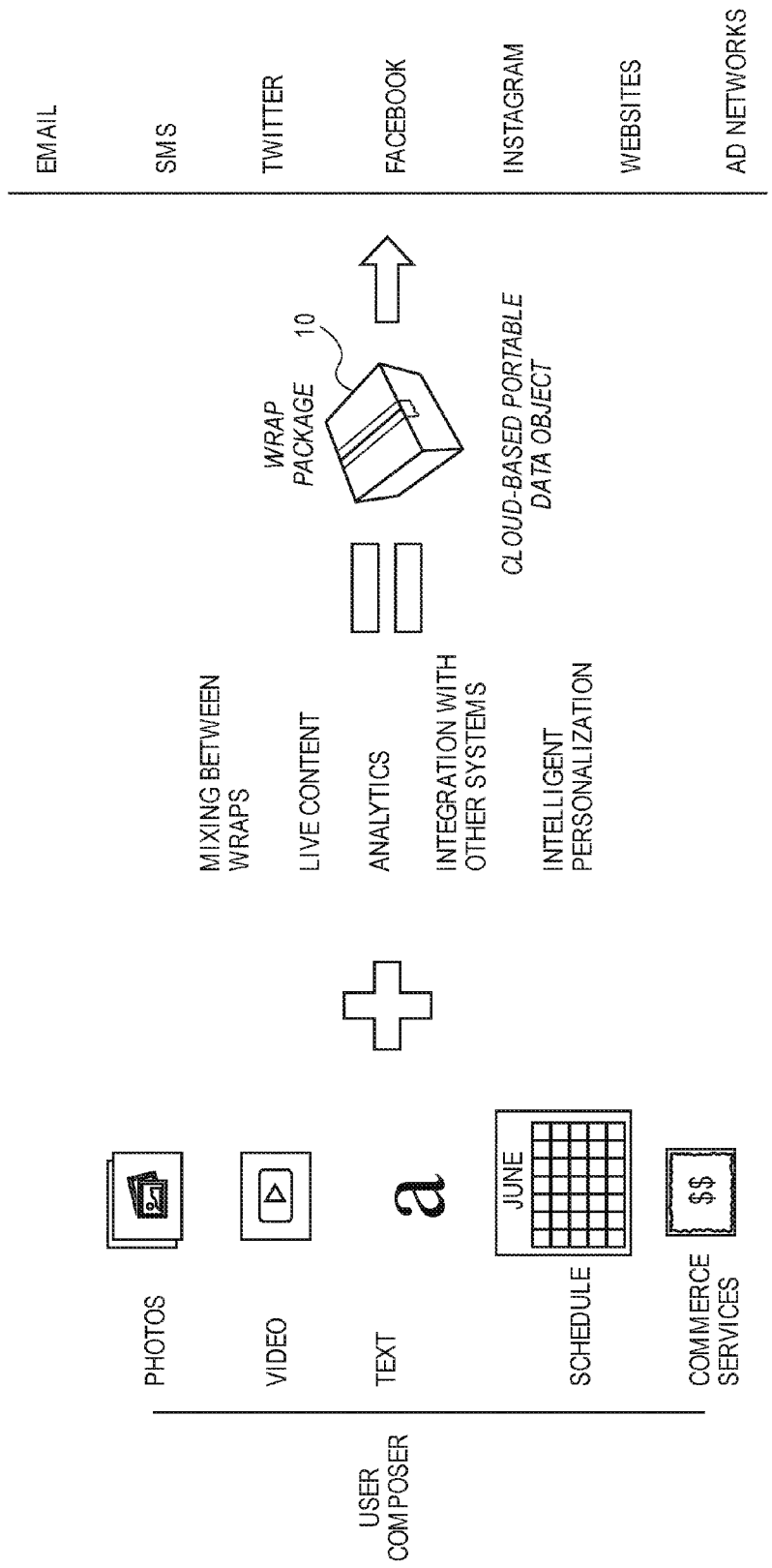
FIG. 3 is a diagram illustrating the media content and distribution model for distributing digital companion wrap packages in accordance with the principles of the present invention.

Referring to FIG. 3, a diagram summarizing the content and distribution model for wrap packages 10 is shown. As illustrated in the left most column, the content that may be included in the various cards 14 of a wrap package 10 may include photos and/or images, audio, video, text, 3-D objects, various types of streaming media (e.g., audio, video, audiovisual, data, biometric information, tickers, sensor outputs, etc.), other data types, application functionality and/or e-commerce services. This content may further be combined with content mixed from other wrap packages 10 as well as live or streaming content. The cards 14 of the wrap package 10 may be further modified based on analytics, intelligent personalization based on the demographics of targeted users or viewers, as well as the integration of either data input or data output to/from with other cards 14, other wrap packages 10, or remote data processing systems and processes, as explained above.

All of the above are then combined during the authoring process into a group of digital objects, defined herein as the wrap package 10. In non-exclusive embodiments where URLs are used as identifiers (i.e., wrap ID 42), the wrap packages are "light-weight", meaning content of the wrap package 10 is delivered over a network to a user only when the wrap ID 42 for the wrap package 10 and/or each card 14 is identified. As a result, the media content, application functionality, and/or e-commerce related services is delivered only when needed. Also, by authoring the cards 14 using a widely supported language such as HTML, the cards 14 of wrap packages 10 can be written once and are viewable on a display associated with almost any computing device running a browser. Accordingly, unlike applications, multiple version of a wrap package 10 need not be authored for multiple platforms.

The wrap package 10 is thus essentially a cloud based portable object that may be readily distributed in a number of ways. In non-exclusive examples, wrap packages 10 may be distributed by email, SMS messaging, ad networks, Twitter, merchant/retailer web sites, photo and/or video sharing web sites that support messaging, social networking web site such as Facebook, through the down-loading of applications from aggregators such as the Apple App Store or Google Play, or just about any means for electronically distributing data over a network, currently known or developed in the future.

Authoring and Distribution of Wrap Packages

Referring to FIG. 4, a block diagram of a non-exclusive system for authoring, storing, distributing and consuming wrap packages 10 is illustrated. The system 20 includes a server node 22, a plurality of computing devices 12, including but not limited to a desktop computer 12A, a laptop computer 12B, a tablet computer 12C, a mobile "smart" phone 12D, a wearable computing device, such as a smart watch 12E or smart glasses 12F and "smart" TVs 12G. The server node 22 and the computing devices 12A-12G communicate with one another over a network 24. In various embodiments, the network 24 may be the Internet, an intranet, a wired or wireless network, a Wi-Fi network, a cellular network, other types of communication networks, or any combination thereof.

The server node 22 includes a "wrap" engine 26, which defines a web application framework 28, a storage device 30 and cache 32, each for storing wrap packages 10 and other data. The server node 22 also may include a suite of tools, such as an authoring tool (as described in detail below), an analytic engine tool, a media collaboration tool and a data transformation tool, for authoring wrap packages 10.

The web application framework 28 is a software platform designed to support the manual and/or automated authoring of wrap packages 10. The framework 28 is designed to alleviate the overhead associated with common activities performed during the authoring of many wrap packages 10. For example, the framework 28 may include one or more libraries to help with the authoring of common tasks, and modularizes and promotes the reuse of code designed to perform specific tasks, such as implementing application functionality and/or supporting e-commerce. In various embodiments, the web application framework 28 may be implemented using, but is not limited to, Ruby, Rails, JavaScript, Angular-JS, and/or any other language or framework currently known or developed and used in the future.

In a non-exclusive embodiment, the web application framework 28 of the wrap engine 26 also performs content management as a way of organizing, categorizing, and structuring the media and other content resources such as text, images, documents, audio files, video files and modularized software code so that the content of wrap packages 10 can be stored, published, reused and edited with ease and flexibility. The content management function is also used to collect, manage, and publish content, storing it either as components or whole documents, while maintaining dynamic links between the components and/or cards 14 of a wrap package 10.

In yet another non-exclusive embodiment, the web application framework 28 of the wrap engine 26 is structured around multiple tiers, including but not limited to a client tier, an application tier and a database tier. The client tier refers to the browser enabled communication devices 12 that execute and display cards 14 of wrap packages 10, as well as web pages written in HTML or another mark-up language. The database tier, which is maintained in storage 30, contains the one or more libraries of user and/or platform provided media content, software components, modules, etc. used for the authoring of wrap packages 10. The application tier contains the software that runs on the server node 22 and that retrieves and serves the appropriate wrap package 10 from storage 30 and/or cache 32 when requested by a computing device 12.

Since wrap packages 10 are essentially data objects, they can be both cached and delivered over a Content Delivery Network Interconnection (CDN), both of which can be effectively used to deliver wrap packages 10 with minimal delay. For example, commonly requested wrap packages 10 may be cached in the cache 32, which provides faster access and delivery times than storage 30. Also other caching techniques, such as pre-caching, may be used with popular wrap packages 10, to speed up delivery times. Since the amount of storage in the cache is typically limited, cached wrap packages 10 and other data may be periodically replaced by any known replacement algorithm, such as first-in, first-out or least recently used for example.

During the composing of a wrap package 10, one or more author(s) 34 may access the server node 22 over a network 36, which may be different or the same as network 24. The author(s) 36 interact with the wrap engine 26, including the web application framework 28, and the above-mentioned suite of tools for the creation, editing, optimization and storing of wrap packages 10. In yet other embodiments, the one or more author(s) 34 can also access third party content 38 for inclusion into a wrap package 10. As previously noted, wrap packages 10 can be authored manually by one or more individuals or electronically in an automated process.

For more details on the authoring of cards 14 of wrap packages, see U.S. provisional applications 62/062,056 and 62/062,061, both entitled "Wrapped Packages of Cards for Conveying a Narrative With Media Content, Providing Application Functionality, and Engaging Users in E-commerce", both filed Oct. 9, 2014, and both incorporated by reference herein for all purposes.

Once the authoring of a wrap package 10 is complete, it is maintained in storage 30 and possibly cached in cache 32. In response to receiving an identifier, the wrap engine 26 fetches the corresponding wrap package 10 from storage 30 or the cache 32 and serves it to the requesting computing device 12 for consumption in a format customized for the viewing device.

It should be noted that the authoring and distribution diagram of FIG. 4 is merely representative and should not be construed as limiting. For example, multiple server nodes 22 for the authoring and/or distribution of wrap packages 10 may be provided at the same or different locations. In addition, multiple instantiations of a given wrap package can 10 be stored at multiple server nodes 22, typically located at different geographic locations. With this arrangement, the server node 22 that is most capable of quickly delivering a requested wrap package 10, sometimes referred to as the "publication server", is the node 22 that will deliver the wrap package to the requesting device 12.

The Wrap Package

Figure 5A:
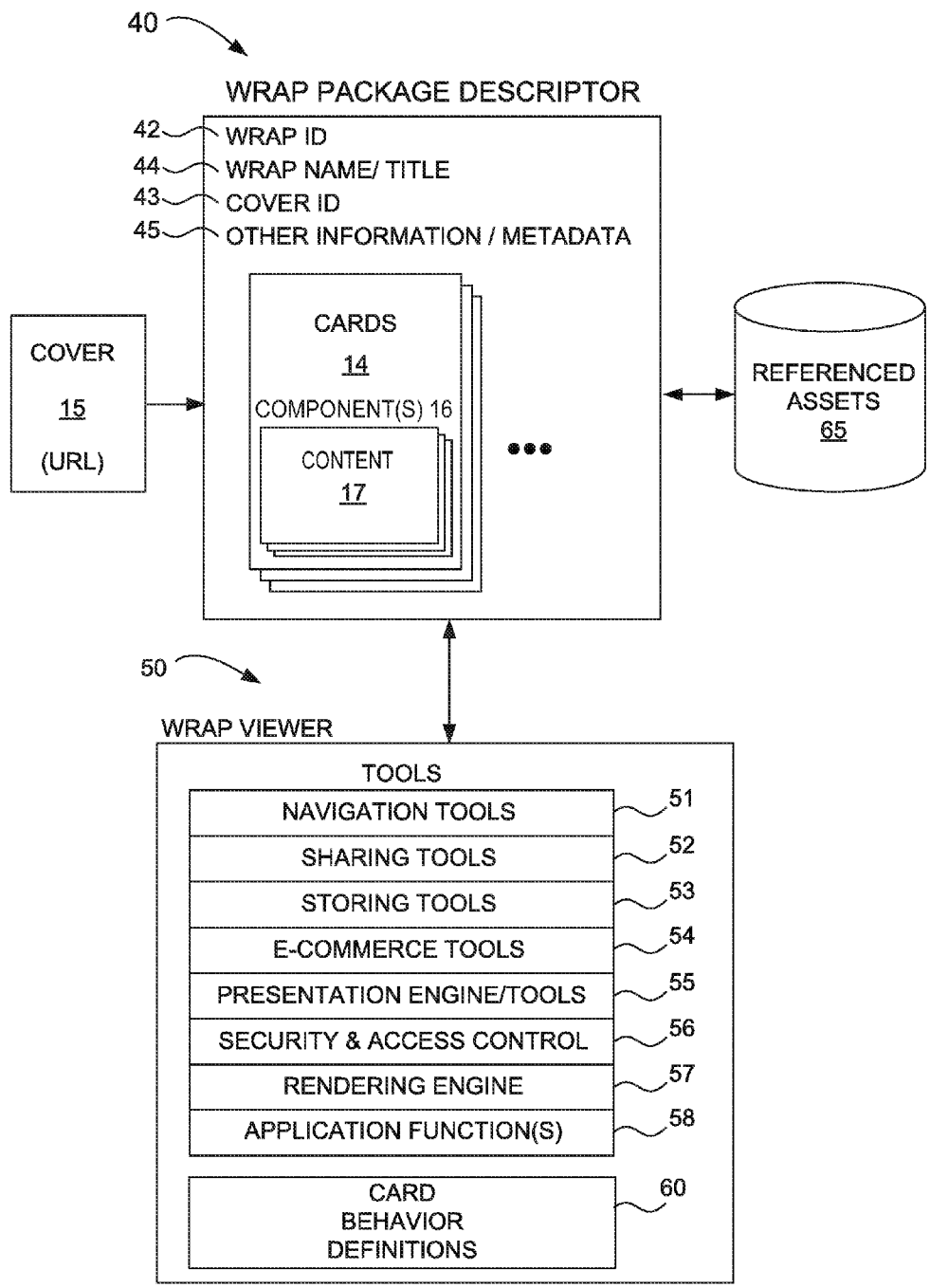
FIG. 5A diagrammatically illustrates selected components associated with defining and rendering a representative wrap package.

As diagrammatically illustrated in FIG. 5A, a wrap package 10 includes a set of one or more cards 14. Each card 14 may contain one or more components 16 that serve as containers for content objects 17. The content objects 17, together with the behaviors associated with the cards and components 16, define the content and functionality of the cards. The content objects 17 may be simple or complex. Simple content objects 17 include standard web-based content types such as text, images, video clips, etc. More complex content objects 17 may include objects having more complicated structures and/or behaviors, as will be described in more detail below.

The structure of the wrap 10, including the structure, layout and components 16 of each of its cards 14 is preferably defined by a wrap descriptor 40. The actual structure of the descriptor 40 may vary widely and a few different suitable descriptor structures are described in more detail below with respect to FIGS. 6-6D. Some content objects 17, such as text, may be directly included (in-line) in the component 16. Other content objects 17, such as images or video clips, may be included by reference, e.g., through simple URL references, or in-line through an encoding method such as MIME (Multi-Purpose Internet Mail Extensions). Complex content objects 17 may be specified in-line or by reference and may (a) contain other components 16 or content objects 17 and/or (b) specify abstract behaviors.

Referenced content objects 17 stored outside of the wrap descriptor 40 are sometimes referred to herein as assets 65. The referenced assets 65 may take the form of almost any type of content that can be included in the wrap package. This can include text, photos, images, 3-D objects, audio, video, and other media content or streams and/or a variety of executable objects, services and/or other functionality. Sometimes an asset may take the form of a stream and the wrap descriptor 40 is arranged to identify the source of the stream (i.e., the feed). By way of example, the stream could be a live audio or video stream, a data feed such as a stock ticker, sensor outputs, biometric information, etc.

In certain circumstances, some or all of the assets 65 associated with a wrap 10 may be stored and accessible from a dedicated wrap server. However, that is not a requirement. Rather, an asset can be retrieved from any location that would be accessible by the consuming device (e.g., through the Internet, an intranet or private network or any other reliable means), and there is no need for the various assets 65 to be located in a single asset store, although that may be desirable in many circumstances.

The wrap package 10 has an associated identifier, the wrap ID 42, that uniquely identifies the wrap 10. The wrap ID is preferably a globally unique identifier (GUID). In some embodiments, the wrap ID 42 takes the form of a URL, or any other identifier that can be converted to, or extracted from, a URL, which facilitates access to the wrap 10 over the Internet using conventional mechanisms. An example of a conversion of the wrap ID to a URL might be adding a domain as a prefix to the wrap ID to form a URL (e.g., www.wrap.com/wrap/<wrapID>).

FIG. 5A also diagrammatically illustrates selected components associated with defining and rendering a representative wrap package 10. The illustrated components may optionally include one or more covers 15, a wrap descriptor 40, a wrap runtime viewer 50 and various referenced external assets 65. As previously noted, the wrap descriptor 40 defines the structure, layout and components 16 of each of the cards 14 within the wrap package 10. The wrap descriptor 40 typically includes the wrap ID 42 and a set, deck or array of card definitions or card descriptors 46, each defining the structure of an associated card (as described with respect to FIG. 6 for example). The wrap descriptor 40 may also include other information of interest such as a wrap name/title 44 and optionally one or more cover identifier(s) 43 and/or other information or metadata 45 about the wrap package 10.

To facilitate rendering the wrap package 10 on various different devices, the wrap is preferably stored in a data format that separates the data from the presentation. At the time of this writing, JavaScript Object Notation (JSON) is a popular, light-weight, data-interchange format that can be used to describe the wrap package 10. Thus, by way of example, the definition of the wrap package 10 may be stored as a JSON data object at the server(s) 22. That is, the descriptor 40 may take the form of a JSON object. In other embodiments, a BSON (Binary JSON) data object may be used. Although the use of JSON or BSON data objects is described, it should be appreciated that in other embodiments, the wrap package 10 may be stored in a variety of other suitable formats, whether now existing or later developed.

The optional cover 15 of the wrap package 10 is typically a graphic object that contains an embedded hyperlink to the wrap (e.g., the URL used as wrap ID 42) and can be placed in any suitable type of electronic media to represent the wrap package 10. Thus, a wrap 10 may be accessed by clicking on or otherwise selecting the cover 15 or by clicking on, or otherwise selecting any other type of link containing the wrap ID 42. As such, in order to "distribute" a wrap package 10, either the cover 15 or a link can be distributed to potential viewers of the wrap package 10 using any available tool. For example, the wrap package 10 may be distributed by: (i) placing the cover 15 or a link on a webpage, in an ad or in any other location that can be accessed by a potential viewer via a browser; (ii) by posting the cover 15 or a link on a blog, a micro blog, a forum, a wall etc. or any social media distribution mechanism such as Facebook, Twitter, etc.; (iii) by including the cover 15 or a link in a message such as e-mail, SMS message, a Twitter Tweet, text messages, etc.; or (iv) using any other available distribution mechanism or platform, either known now or developed in the future. Therefore, in many circumstances, it is desirable to create a cover 15 that is attractive and entices viewers to access the associated wrap package 15. In some instances, the cover 15 may take the form of an image from the wrap package 10 itself (e.g., the first card); however, that is not a requirement.

The wrap package 10 is configured to be rendered on a consuming device 12 in conjunction with a wrap runtime viewer 50, which is also sometimes referred to as the wrap run-time engine or simply the viewer. The runtime viewer 50 provides a set of tools and functionalities that are helpful for viewing and/or interacting with the wrap. In some circumstances, the viewer 50 will take the form of a dedicated, platform specific, wrap viewer application (e.g., an applet or app in the context of a mobile device), a plug-in (e.g. a browser plug-in) or other mechanism installed on the viewing device that provides the necessary functionality. In other circumstances the wrap viewer functionality may be incorporated into other types of applications. However, limiting the rendering of wraps to devices which have preinstalled wrap viewing applications/functionality would greatly reduce their portability since users are not always motivated to install such applications unless or until they see a compelling need. Therefore, as will be explained in more detail below, the delivery of a wrap packages 10 may optionally be accompanied by a run-time viewer 50 that includes a set of associated tools and functionalities suitable for use by a conventional browser to generate and/or render the runtime instance of the wrap based on the wrap descriptor 40 and to facilitate user interaction with the wrap package 10. These tools and functionality can be thought of, and are often referred to herein as a wrap toolset that is part of the wrap runtime viewer 50. By providing the wrap construction, viewing and interaction toolset in a browser executable form together with the wrap descriptor 40, the wrap package 10 can be consumed on a wide variety of different devices and operating system platforms (e.g., iOS, Android, Microsoft, etc.) without requiring the users to download and install a device and/or platform specific viewer application. This is a powerful construct for enhancing the portability and viral distribution of wrap packages among a myriad of devices and operating system platforms In the embodiment illustrated in FIG. 5A, the viewer toolset provided with the wrap viewer 50 includes navigational tools 51, sharing tools 52, storing tool 53, various e-commerce tools 54, presentation engine/tools 55, security and access control tools 56, a rendering engine 57, and application functionality tools 58. Of course, it should be appreciated that not all of these tools are required in all implementations and that in other implementations, a variety of other tools and functionalities may be provided as well. The navigational tools 51 facilitate navigation within the wrap package 10. The sharing tools 52 provide mechanisms by which a consumer of the wrap 10 may share the wrap with others, e.g., by e-mail, by SMS message, via a social media post, etc. Storing tool 53 allows a user to persistently store the wrap and/or when applicable, the wrap state, either locally or remotely. The e-commerce tools 54 may include a variety of functionalities that can help facilitate a variety of e-commerce tasks including purchasing, making reservations, etc. Application functionality tools 58 enable "app-like" functionality within the wrap package 10, such as conducting online chats, GPS functionality, etc. Presentation engine 55 controls the presentation. In some embodiments, the presentation engine 55 may be arranged to present the wrap on the consuming device at a scale and in an aspect ratio that is at least somewhat optimized for the device.

Security and access control tools 56 provide security and access control functionality, which might include encryption functionality and user authentication services. For example, in some circumstances, the publisher of a wrap may want to limit the circulation of the wrap to specific users or groups of users. A few, nonexclusive examples of such circumstances include when the wrap is created for use as: (i) an active receipt for a purchase as described in U.S. Provisional Application Nos. 62/062,056 and 62/075,172 (both incorporated by reference herein for all purposes) and (ii) a ticket for an event as described in U.S. Provisional Application No. 62/079,500; (also incorporated by referenced herein for all purposes)(iii) an item customized for a customer such as a travel itinerary; (iv) an employee manual as described in U.S. Provisional Application No. 62/114,731 (also incorporated by reference herein for all purposes); etc. Encryption services may be desirable to protect confidential information. Of course, there are a very wide variety of other circumstances where security and/or access control/permission functionality may be desired.

With certain embodiments, the viewer 50 may optionally also include a rendering engine 57 arranged to create and/or render a runtime instance of the wrap on a consuming device 12 based on the descriptor 40. In such embodiments, the rendering engine is arrange to dynamically generate the HTML (or other markup language) use by a browser or other viewing mechanism on the device 12 to render the wrap at runtime. In some implementations, the rendering engine 57 is arranged to create an object graph based on the descriptor 40 and a document object model (DOM) based on the object graph. The browser or other suitable app or application may then use the DOM to render the wrap package 10.

Figure 5B:
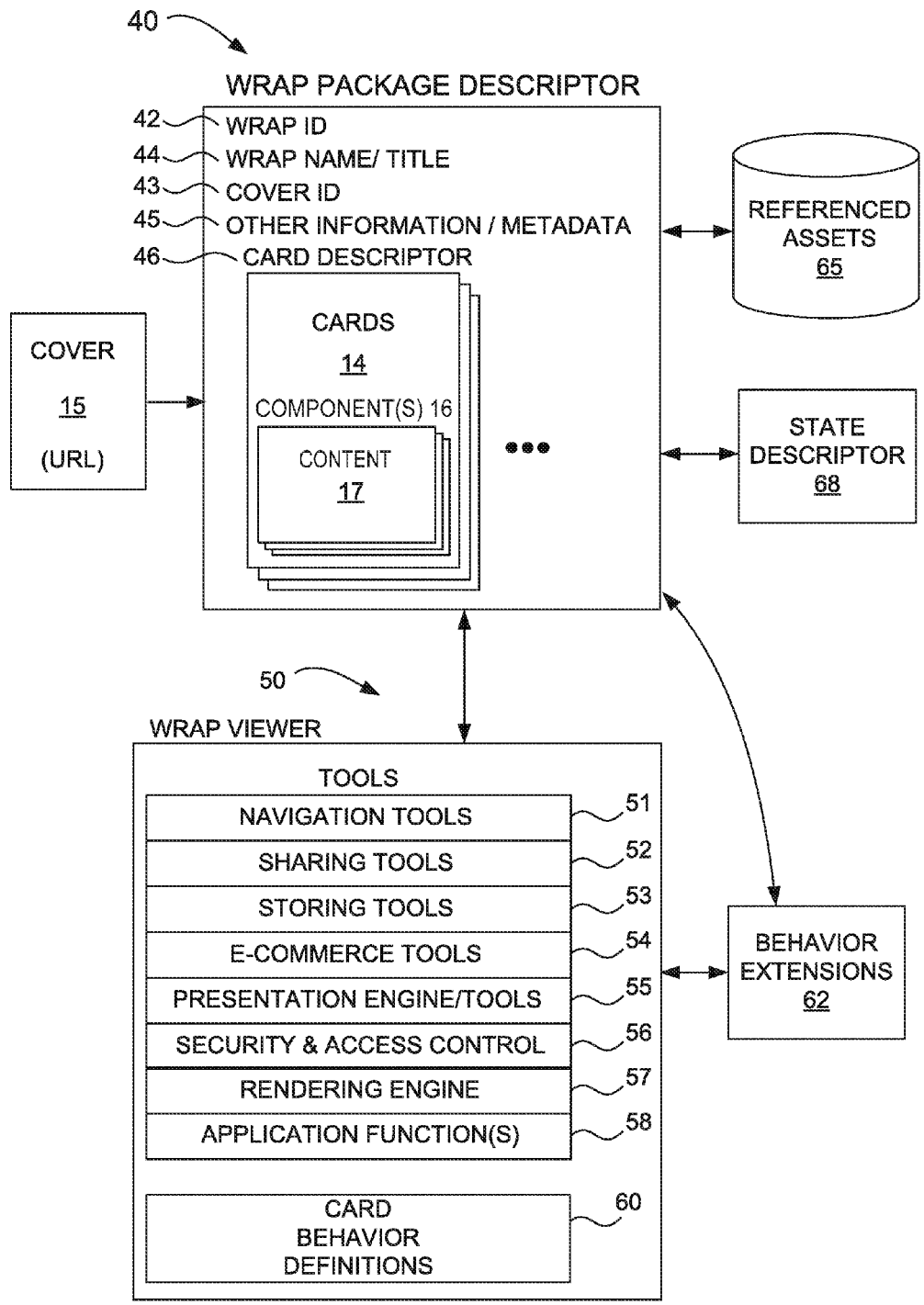
FIG. 5B diagrammatically illustrates selected components associated with defining and rendering a representative wrap package in accordance with another embodiment that utilizes state descriptors and/or behavior extensions.

With yet other embodiments, the viewer 50 may also optionally have any number of card behaviors definitions 60. As will be described in more detail below, different cards can be designed to exhibit a wide variety of different behaviors. In order to simplify the card, and card template creation processes, various desired behaviors can be defined separately from the cards themselves. The behaviors are known to or accessible by the wrap viewer 50 (e.g., desired behaviors may be defined through behavior definitions 60 or may be accessible as behavior extensions 62 as seen in FIG. 5B). Thus, the descriptor for any particular card or component may simply declare the desired behavior and the viewer 50 will know how to impart such behavior to the wrap/card/component and/or how to obtain an extension that imparts such behavior.

In FIG. 5A, the behavior definitions and the various tools are illustrated as separate items to facilitate their description. However, in practice, some of the illustrated tools are simply sets of associated behaviors, and therefore, the illustrated distinction between the behaviors and such tools is/are largely for emphasis.

As discussed above, the wrap package 10 may be rendered on a wide variety of different devices 12A through 12G. These devices may have a wide variety of different screen sizes, capabilities, and viewing mechanisms. When a particular device 12 requests a wrap package 10, a determination is effectively made as to whether a suitable wrap runtime viewer is already present on the requesting device. If not, a browser compatible runtime viewer 50 is provided in addition to the wrap or wrap descriptor 40. The browser compatible run-time viewer may be written in any format that is appropriate for execution by a browser. By way of example, JavaScript (JS) is a dynamic programming language that is currently popular and supported by most general purpose browsers and many other rendering mechanisms. Thus, JavaScript works well for the browser compatible viewer since the same wrap viewer can be used for a wide variety of different browsers. However, it should be apparent that in other embodiments, the wrap viewer 50 may be implemented using a wide variety of other now existing or future developed frameworks and/or languages. For example, the DOM rendering may be replaced with a React framework or another suitable framework currently known or developed in the future. When the wrap viewer is incorporated into a native application, it will sometimes be desirable to write the viewer (or portions of the viewer) in a format that executes more efficiently or is otherwise preferred for execution on the underlying operating system, etc.

Defining Card Behavior

Different cards 14 within a wrap 10 can be designed to exhibit a wide variety of different behaviors. To simplify the card authoring process, the card descriptor 46 within a wrap 10 can be arranged to declare the behavior of the card 14 without internally defining that behavior. Rather, in such circumstances, the desired card 14 behaviors are defined within the wrap viewer 50 as part of the behavior definitions 60 or through behavior extensions 62. With this arrangement, a card template designer can define the behavior for cards 14 authored using the template, or can define a set of available behaviors from which a card author can choose. If a set of behaviors are available to the card author, then the authors selects the desired behavior from the available set. In either case, the desired behavior is declared as part of the card. With this arrangement, different cards 14 within a wrap 10 can exhibit different behaviors and such behavior remains with the card even if the card is used in a different wrap. If a new card behavior is desired, the new behavior can be created and added to the behavior definitions 60. In this manner, the newly defined behavior becomes available to other template designers and/or card authors.

The card descriptor 46 for the gallery card includes a behavior declaration that identifies the desired behavior for the card, which can then be bound to the card at run-time by the wrap viewer (e.g., browser based viewer, native viewer, etc.). For example, this could take the form of a statement such as:

"Behaviors": ["vertical-snap-to-card"]

Further examples are shown in Appendix I of U.S. Provisional Application No. 62/133,574.

The developer of the wrap viewer 50 can define any number of card behaviors that are supported by the viewer, such as but not limited to the different scrolling techniques in the example above. Third parties can provide extensions that define still other behaviors (e.g., a scrolling behavior in which a two finger swipe reacts differently than a one finger swipe, etc.). The developer of a card template can define which of the available behaviors are available for use with the template (e.g., a subset, or all of the defined scrolling behaviors). Wrap and card authors using the template can then select which of the behaviors available to the template they would like to associate with the card, and the chosen behavior is declared as part of the card descriptor 46.

Although the specific example of scrolling behavior in a gallery card has been given, it should be appreciated that virtually any desired type of card behavior can be defined and declared in a similar manner. It should be appreciated that differences in card behavior may take a wide variety of different forms. For example, different types of cards may have different accompanying behaviors; the behavior of a particular type of card may be different based on its position within the wrap 10; and/or the animations associated with transitions may vary with respect to card position.

The actual structure of the descriptor used to define a gallery card may vary significantly. By way of a representative card descriptor structure suitable for implementing a gallery card is described in more detail below and is illustrated in FIG. 6C.

Triggers

A card can have one or more triggers embedded therein. Triggers are hooks associated with displayed items that can cause an action or behavior in response to an event (e.g. a user input). That is, a predetermined user action or other event (such as the selection of the displayed item) triggers a defined action. In general, a trigger is a component 16 of a card. The trigger has associated behaviors and one or more associated handlers. When a triggering event is detected, the associated handler causes execution of the desired behavior.

Virtually any type of computer detectable event can be used to activate a trigger. In many circumstances, the triggering event may be a user input such as the selection of a displayed trigger component (e.g., by tapping or performing another appropriate gesture relative to a displayed item configured as a trigger component). However, in other circumstance, the activating event may be system generated. System generated events can include sensor input based events, time or timer based events, the receipt of a particular message, the determination that a particular navigational sequence has occurred within a wrap, geo-location or proximity based events (e.g., the viewing device is located within a particular store or geographic area, or near to other users viewing the same wrap) or any of a wide variety of other computer detectable events.

Once activated, a trigger may exhibit any desired behavior which can be associated with the trigger through appropriate behavior declarations 95. Virtually any type of computer implementable behavior can be associated with a trigger. By way of example, a linking trigger may be used to link the user to another card within the current wrap, to send the user to another wrap, webpage or other destination. The linking trigger may also be arranged to define a desired linking behavior (e.g., open in same tab, open in new tab, etc.). Other triggers may initiate a wide variety of other action.

The ability to generally define triggering events and the resulting behaviors is an extremely versatile construct that provides wraps with tremendous flexibility and power. Thus, triggers can be used to enable a wide variety of actions, including invoking of a number of different application-like functionalities or e-commerce related services. For example, a trigger may be used to initiate an action (e.g., order a product, conduct an online chat, sharing the wrap with others, book or reserve a table at a restaurant, a hotel room, a rental car, etc.). Almost any type of wrap component/asset can be associated with a trigger, which gives authors tremendous flexibility in guiding the user experience.

Figure 7:
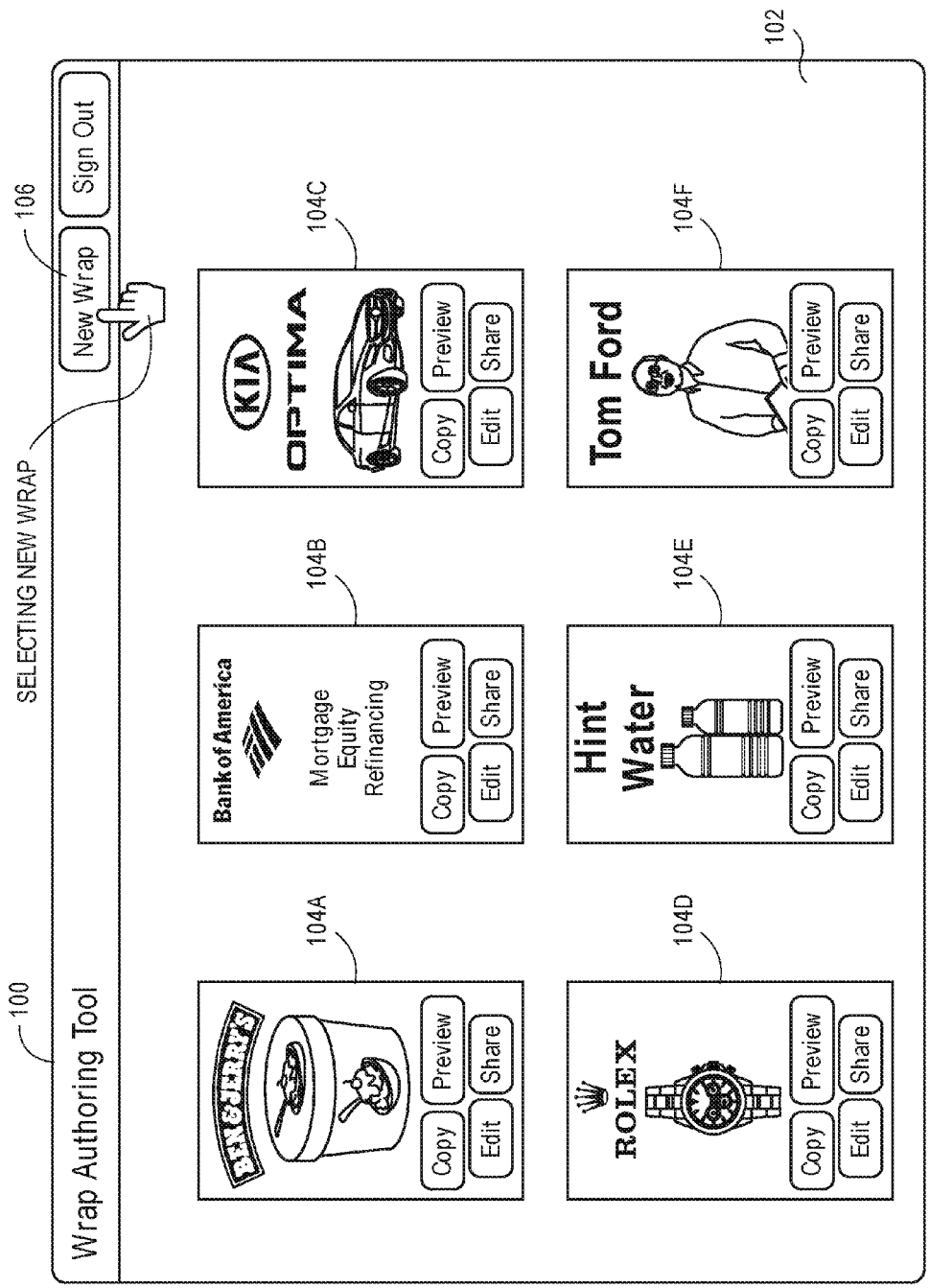
FIG. 7 is a home screen for an authoring tool used for authoring wrap packages in accordance with a non-exclusive embodiment of the invention.

The wrap 310 illustrated in FIG. 7 has a number of triggers. These include purchasing trigger 340 (FIGS. 7F-7K), subscription trigger 360 (FIG. 7L) and social media triggers 381, 382, 383 (FIG. 7M). The purchasing trigger 340 is arranged to facilitate a user purchase of the displayed product. As an illustrative example, the trigger 340 of FIG. 7F, is associated with a generally rectangular region that bounds the text and graphic located at the bottom of the card, including the text "pomegranate $18 for 12 16-ounce bottles" and the adjacent "Buy Now" button. The region that involves the trigger is generally shown by a dashed box in FIG. 7F. Selection of the trigger 340 links the user to a mechanism that facilitates the purchase of the identified item. The other above-identified triggers in the wrap 310 are characterized by and operate in a manner similar to the Buy Now trigger 340 of FIG. 7F.

The implementation of a purchase mechanism within a wrap package 10 may be widely varied. For example, in some implementations, the user may be linked to the vendor's website, where the purchase may be made in a conventional manner through the website. If this approach is taken, it is often desirable to access the target website through a "Cul-de-sac" so that the user is returned to the wrap when finished with any transactions they wish to make (a Cul-de-sac has the property of returning to the initiating wrap card/page when the user closes the target website). In another approach, the selection of the trigger causes the wrap to transition to a purchasing card (or sequence of cards) within the same wrap where the desired transaction can occur. One such approach is described below with respect to FIGS. 8A-8C. Alternatively, the transition could be to a separate purchasing wrap. Regardless of the mechanism, it is often desirable (although not necessary) to use a cul-de-sac approach so that the user is returned to the card from which the transaction was initiated after the transaction is completed. In still other implementations, the transaction can be completed without leaving the current card—particularly when the user is using a secure viewer that knows the user's identity and relevant purchase related information. In such an embodiment, the transaction can be completed using a "one-click" purchasing option, where previously stored customer billing, shipping and other account information is used to process the purchase.

In a non-exclusive embodiment, the specific behavior associated with the link may be declared in the same manner described above. For example, consider a situation where the trigger activates a link to an external website. There are several ways that such a link could be implemented. One approach might be to link to the target web page in the currently active browser tab, which has the effect of navigating away from the wrap. A second approach might be to open a new browser tab and open the target webpage in that new browser tab. A third approach might be to initiate a Cul-de-sac in the current browser tab and open the target webpage in the Cul-de-sac (a Cul-de-sac has the property of returning to the initiating wrap card/page when the user closes the target website). In such an arrangement, the card template developer can make these three link behaviors available to the trigger and the card author can select the desired behavior. The card developer can also define a default link behavior selection in the event that the card author does not affirmatively make a selection. As can be seen in Appendix I of U.S. Provisional Application No. 62/133,574, trigger 340 in card 316 has these three possible linking behaviors in response to activation of a trigger.

The ability to direct a user to a target website to complete a transaction can be helpful in many scenarios. However, a drawback is that it can be more difficult to track or guide user behavior after the user has navigated away from the wrap. Therefore, it is often preferable to design the wrap in a manner that facilitates handling user side interactions involved with a transaction from within the wrap itself.

The actual structure of the descriptor used to define a trigger may vary significantly. By way of example, a representative trigger component descriptor structure is described in more detail below and is illustrated in FIG. 6D.

Wrap Descriptors

Figure 6:
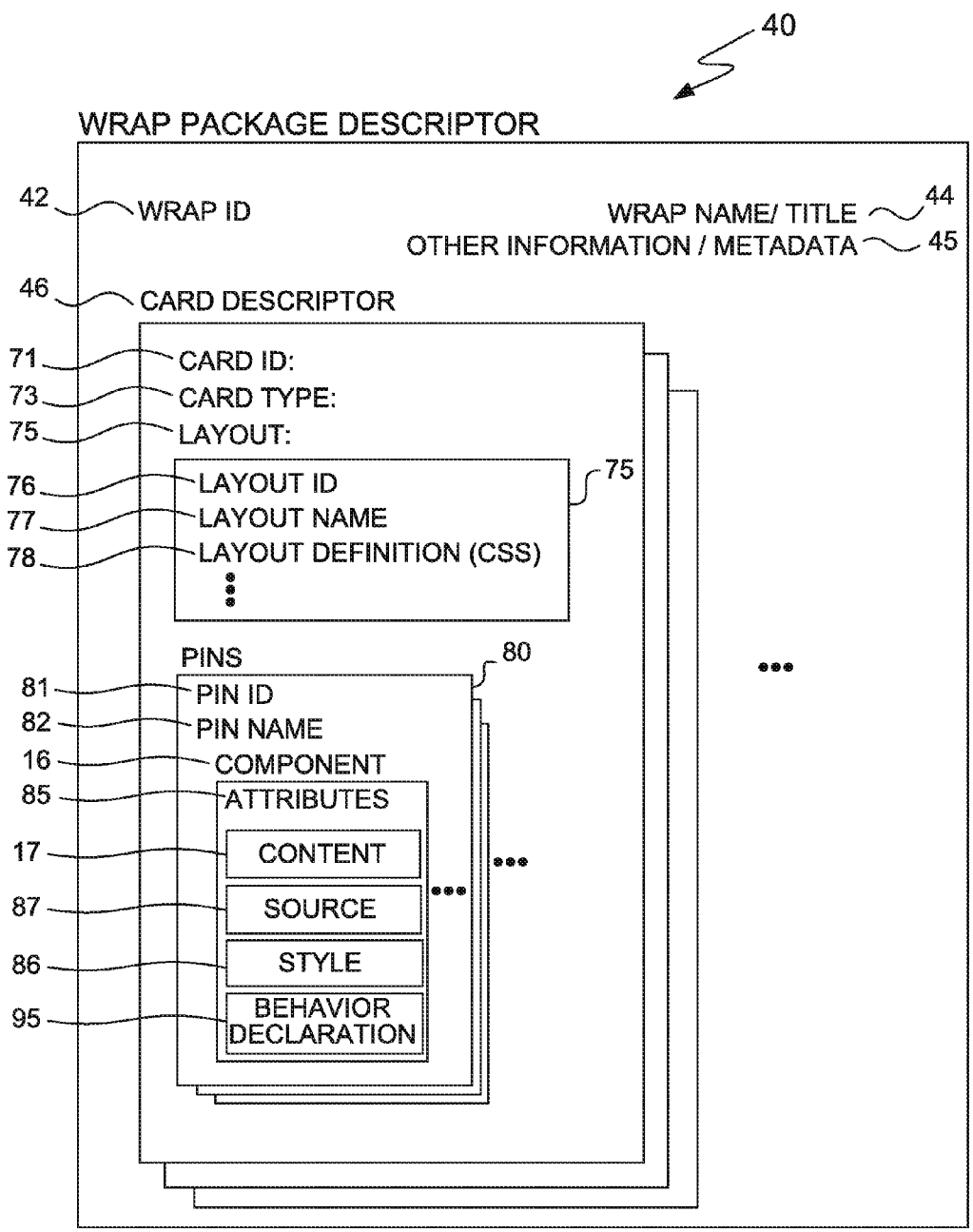
FIG. 6 is a diagram illustrating the hierarchy of a wrap descriptor in accordance with the principles of the present invention.
Figure 6A:
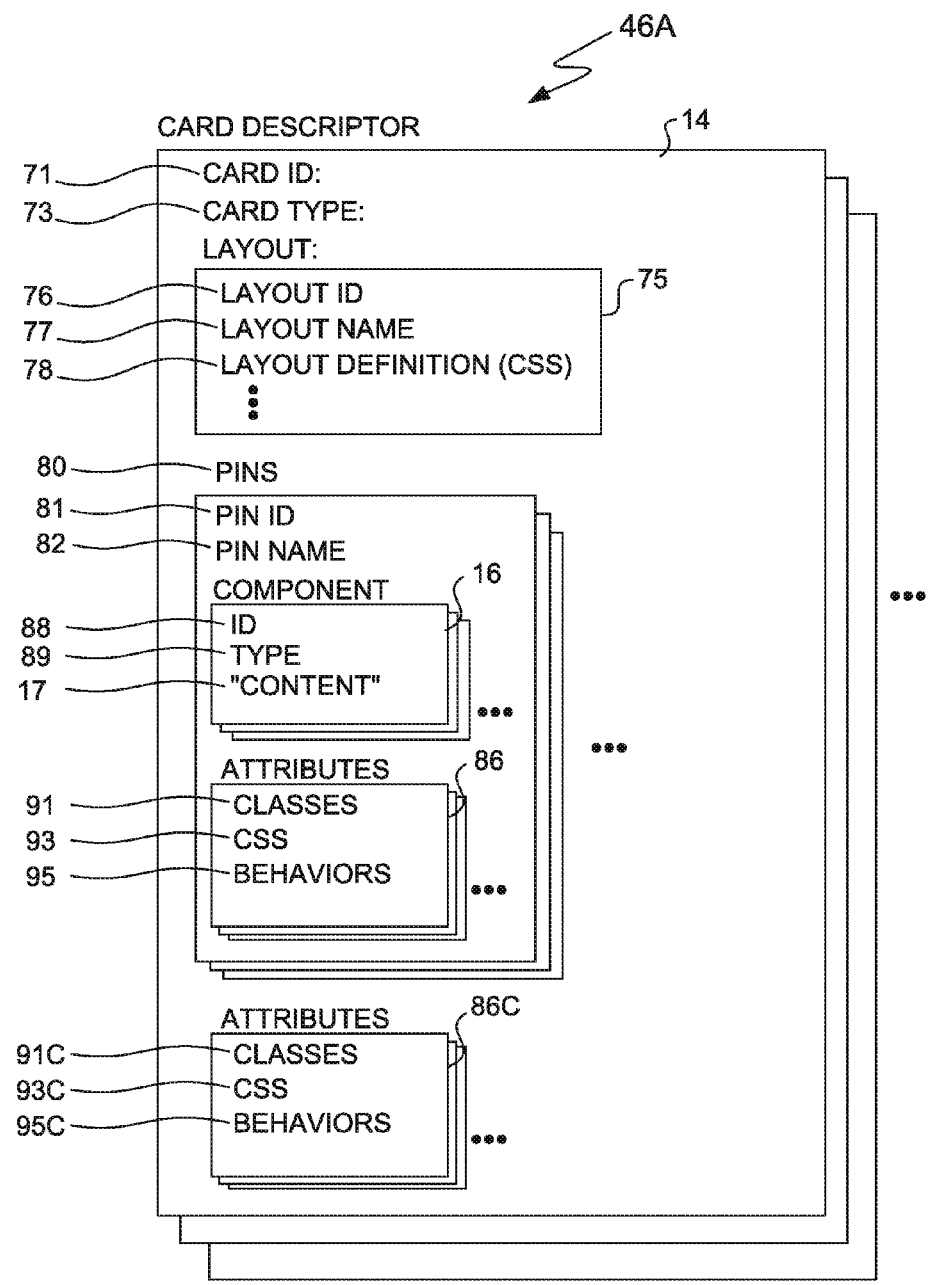
FIG. 6A is a diagram illustrating the hierarchy of a particular card descriptor in accordance with the principles of the present invention.
Figure 6B:
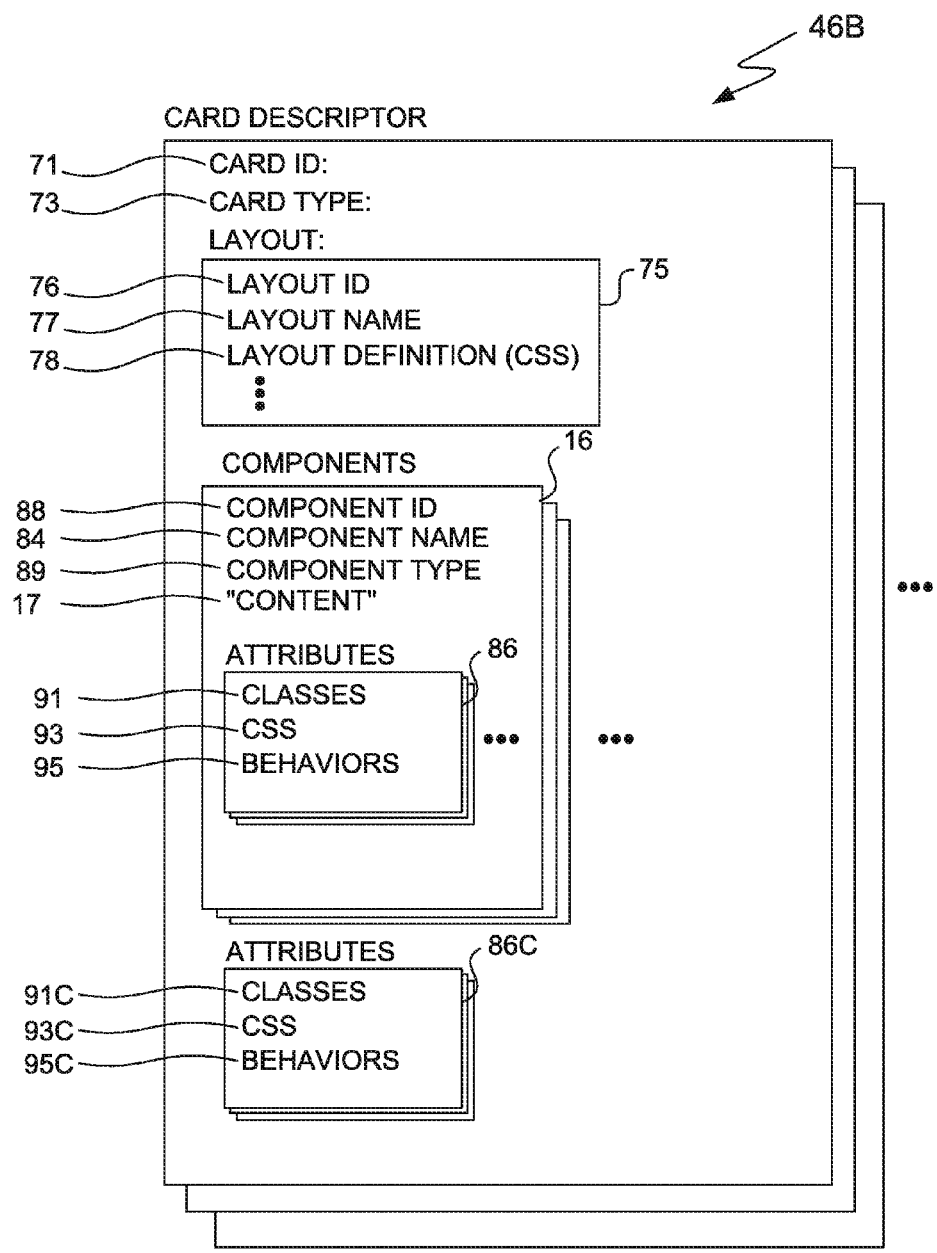
FIG. 6B is a diagram illustrating the hierarchy of a second card descriptor embodiment.
Figure 6C:
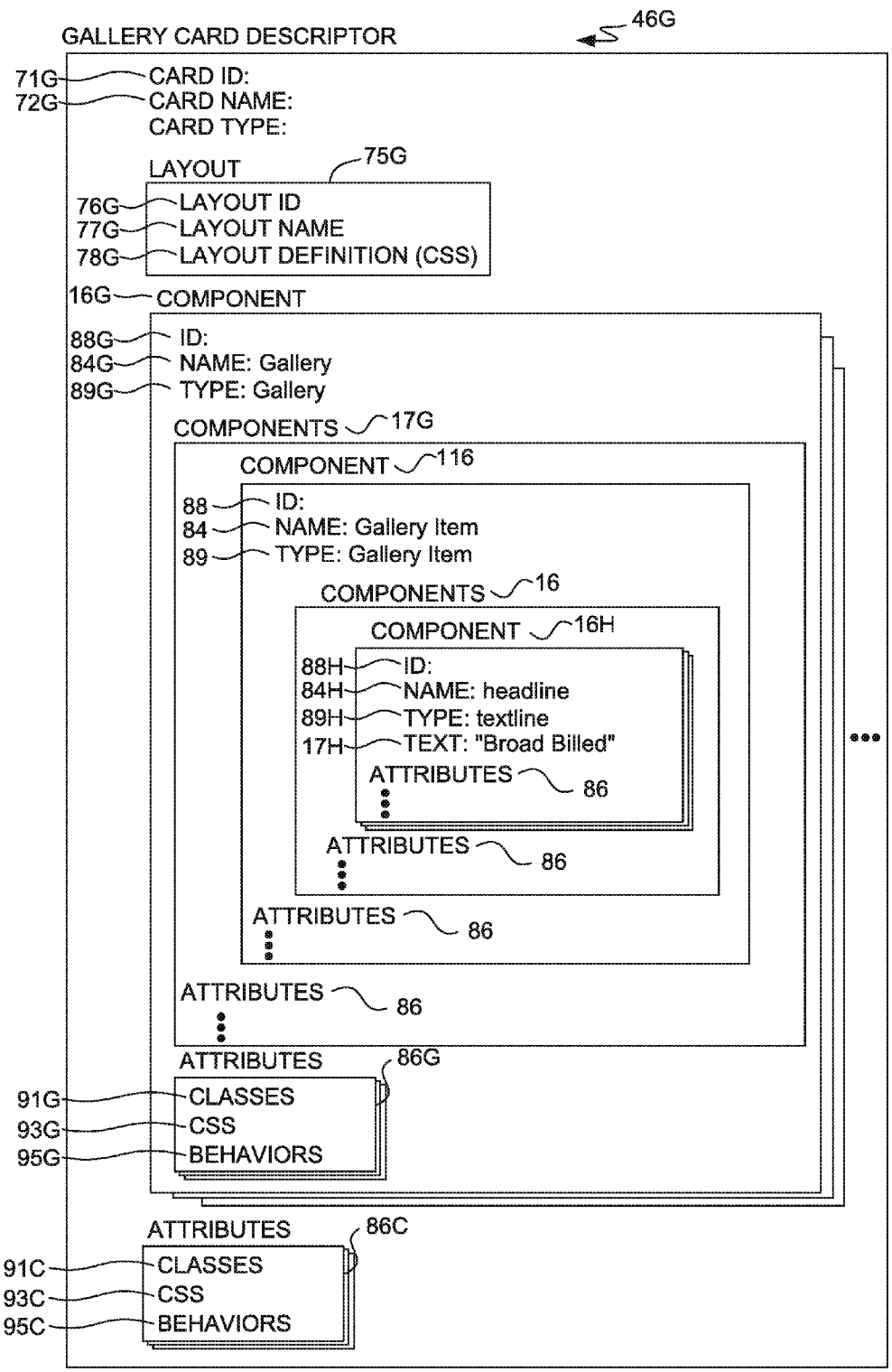
FIG. 6C is a diagram illustrating the hierarchy of a gallery card wrap descriptor embodiment.
Figure 6D:
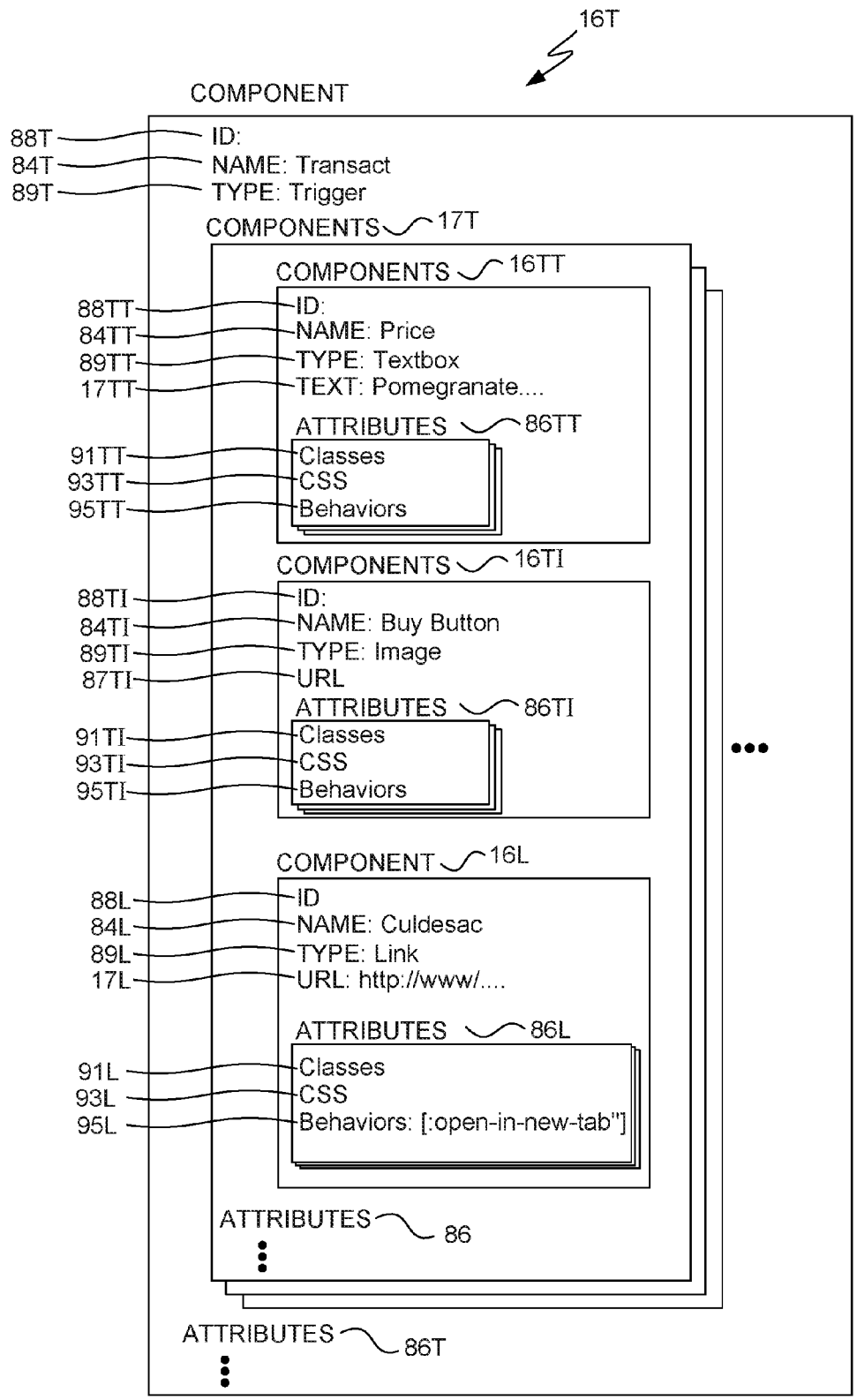
FIG. 6D is a diagram illustrating the hierarchy of a trigger component descriptor embodiment.
Figure 6E:
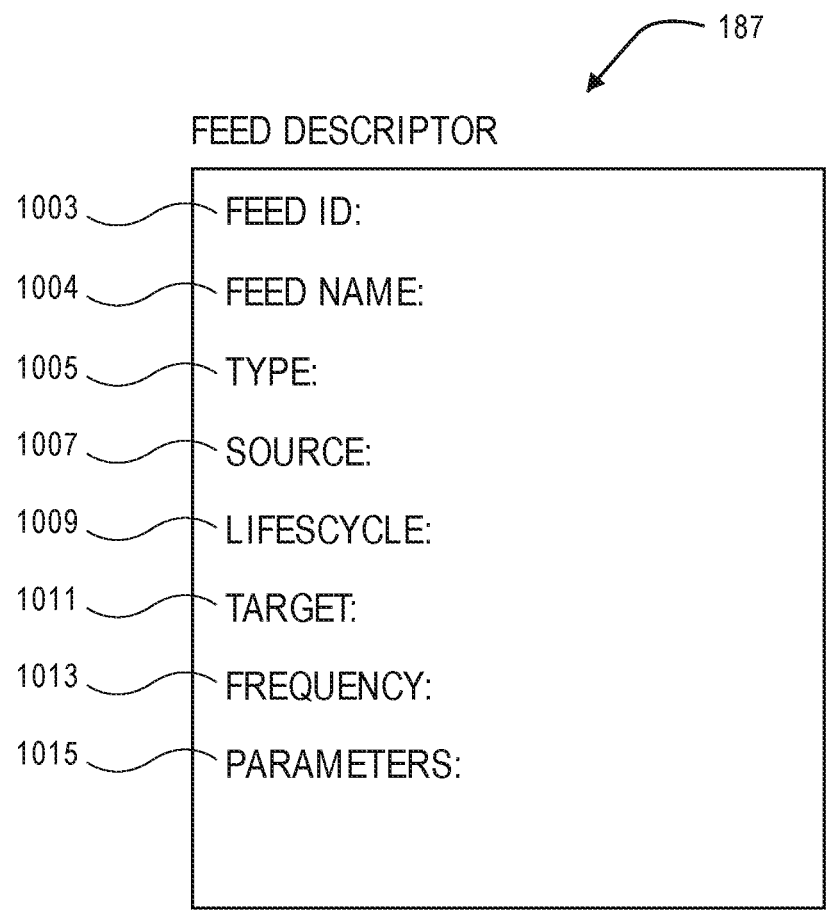
FIG. 6E is a diagram illustrating a feed card in accordance with another non-exclusive embodiment of the present invention.
Figure 6F:
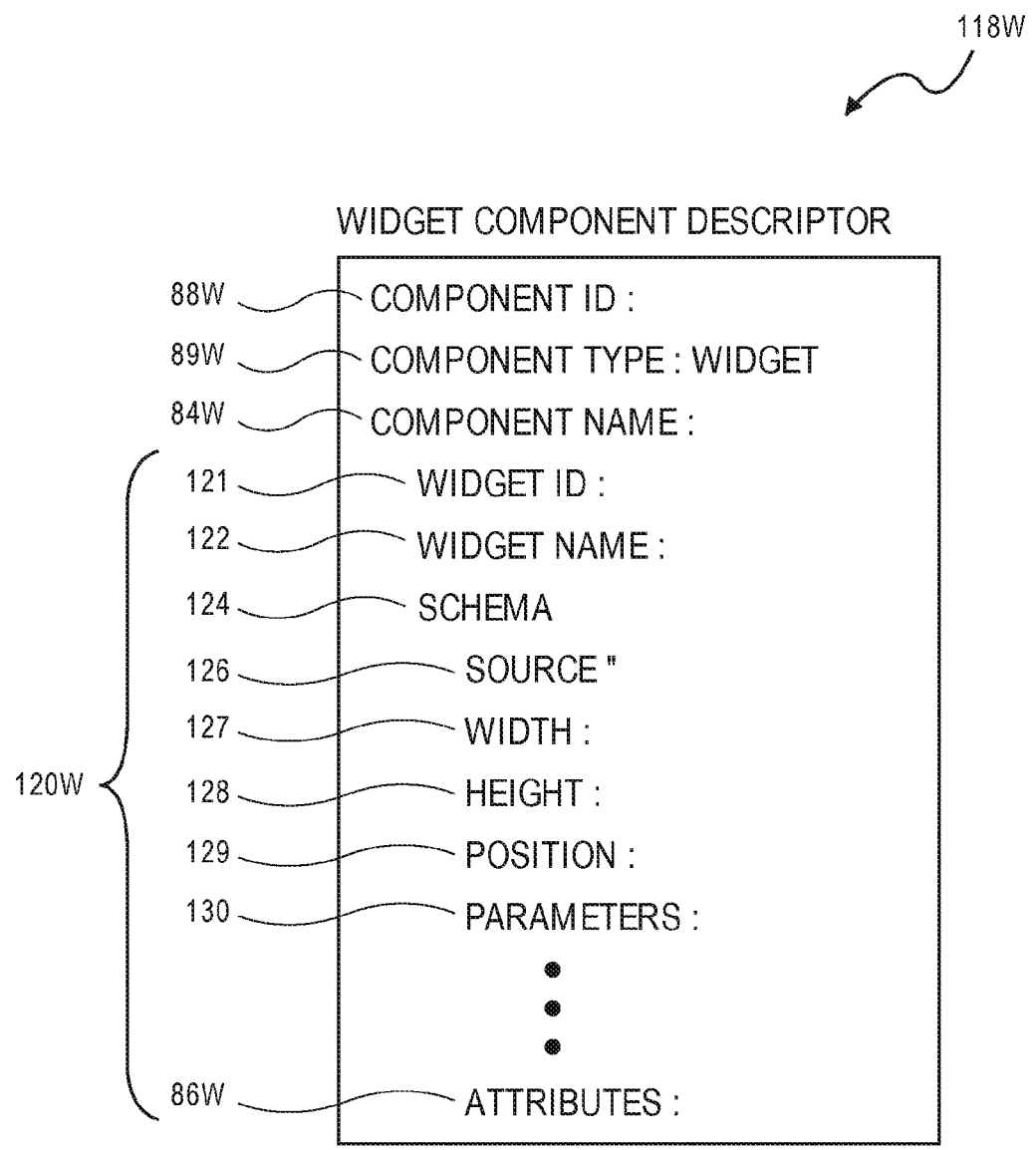
FIG. 6F is a diagram illustrating a widget card in accordance with another non-exclusive embodiment of the invention.

Referring next to FIGS. 6-6F, a variety of specific descriptor structures suitable for use in defining various wraps, cards and/or components will be described. Although specific descriptor structures are illustrated, it should be appreciated that the structure of the various descriptors can be widely varied. In general, the descriptors are arranged to define the structure, layout, content and behaviors of the wrap without details of its presentation on a particular device. That is, the descriptors capture the functional and behavioral intent of the author, in a platform independent way, such that the runtime may implement the described structures and behaviors in a way optimal for the platform in question.

A wrap generally will include multiple cards and the corresponding wrap descriptor will typically have discrete descriptors for each of the cards. The card descriptors each include a unique card identifier and define the structure, behavior, layout and content of the corresponding card. Behaviors associated with any particular card can be applied at the card level (i.e., associated with the card as a whole), at a component level (i.e., associated to a particular component alone—which may or may not include subcomponents) or at any subcomponent level. Since the card descriptors are discrete, self-contained, units with a unique identifier, it is very easy to mix wraps (i.e., use cards created for one wrap in a second wrap). When cards are mixed, their components and associated behaviors remain the same—although it is possible to define behaviors that are context or state aware and therefore exhibit different states/properties/responses/etc. in different circumstances.

The components are encapsulated units that may have defined content (although such content may be dynamic) and, when desired, specific defined behaviors, styles and/or other attributes. In some preferred embodiments, each component has a unique identifier and could optionally also have an associated type and/or name. The use of encapsulated components with unique component identifiers makes the components highly modular such that an authoring tool can readily use and reuse the same components in different cards and/or wraps. Behaviors can be associated with the component and any component can be composed of one or more subcomponents which themselves are fully defined components.

Regardless of the level to which they are applied (i.e., wrap level, card level, component level, subcomponent level, etc.), the behaviors are preferably declared in the descriptor rather than being explicitly defined within the descriptor. In that way, the behavior declaration acts as a hook which can be used to associate virtually any programmable logic with a card/component/etc. The behaviors are preferably defined (or at least obtainable) by the runtime viewer.

FIG. 6, diagrammatically illustrates the structure of a first representative wrap descriptor 40. In the illustrated embodiment, the wrap descriptor 40 includes the wrap ID 42, the wrap title 44, and a card descriptor 46 for each of the cards 14. Each card descriptor 46 describes of the structure, layout and content of the associated card. The wrap descriptor 40 may also optionally include cover identifier(s) 43 and/or any other desired information or metadata 45 relevant to the wrap. The cover identifier(s) 43 identify any cover(s) 15 associated with the wrap. Other information and metadata 45 may include any other information that is deemed relevant to the wrap, as for example, an indication of the creation date and/or version number of the wrap, attributions to the author(s) or publisher(s) of the wrap, etc.

The card descriptors 46 may be arranged in an array, deck, or in any other suitable format. In the diagrammatically illustrated embodiment, each card descriptor 46 includes: a unique card identifier (card ID 71); a card layout 75; and optionally, an associated card type 73. The card layout 75 preferably includes at least one of a layout identifier (layout ID 76) and a layout definition 78 and optionally, a layout name 77. When the layout definition is not explicitly provided in the card descriptor 46, it may be obtained by reference through the layout ID 76. The layout definition 78 may be provided in a variety of different format. By way of example, Cascading Style Sheets (CSS) works well. As will be appreciated by those familiar with the art, CSS is a style sheet language used for describing the look and formatting of a document. Of course, in alternative embodiments, other style sheets and/or other now existing or future developed constructs may be used to define the layout of the cards.

The card ID 71 is preferably a unique identifier that uniquely identifies the associated card 14. An advantage of using unique identifiers as card IDs 71 is that the cards 14 are not wed to a particular wrap package 10, but rather, can to be used in or shared among a plurality of wrap packages. That is, once a card is created it can be used in any number of different wraps by simply placing that card's descriptor 46 at the appropriate locations in the card decks of the desired wrap package. Thus, the unique card IDs 71 can be used to help streamline the process of using one or more cards 14 from one wrap package 10 in a second wrap (sometimes referred to as the "mixing" of cards 14 and/or wrap packages 10), which can help simplify the process of creating the second wrap package. In some implementations, the card IDs 71 may also take the form of URLs, although this is not a requirement. A potential advantage of using URLs as the card IDs 71 is that the URLs can potentially be used to allow a card in the middle of the wrap to be more directly accessed from outside of the wrap.

The card layout 75 defines the layout of the components 16 of the associated card 14. Preferably the card layout 75 includes a card layout ID 76 which uniquely identifies the associated layout. In some embodiments, the descriptor itself defines the layout using a conventional web presentation definition mechanism such as Cascading Style Sheets (CSS). In other embodiments, the layout definition may be accessed from a server using the layout ID 76. As will be familiar to those skilled in the art, CSS is a style sheet language used for describing the look and formatting of a document written in a markup language. CSS enables separation of document content from the document presentation, including elements such as the layout, colors and fonts. Thus, CSS is very well adapted for inclusion within the wrap descriptor 40.

It should be noted that the layout ID 76 is also useful in the context of the aforementioned authoring tool used to create and author wrap packages 10. Specifically, in some embodiments, the authoring tool is provided with a number of predefined templates (card layouts) from which an author of a new card can choose. Each template has one or more containers/components 16, which are arranged on the card in a predetermined manner for holding card content 17. The template itself can have any particular layout, or can be used to create a particular layout. In either case, the particular layout can be assigned a unique layout ID 76, and thereafter, be used and reused in conjunction with different cards thereby simplifying the card creation process.

The card type 73 (which is optional in the descriptor) relates primarily to such an authoring tool. For convenience, the templates may be categorized into different groups or classes. By way of example, the classes/groups may relate to their intended uses, the entity for which the templates are to be used, to the creator of the templates or any other logical grouping of templates. For example, card type 73, can be assigned to one or more predefined card templates, depending on their intended function. For instance, an authoring tool may include one or more card templates, each centric for the display of text, visual media such as photos or images, the playing of video, live or streaming media, application functionality (e.g., scheduling appointments, GPS, etc.), or supporting e-commerce (e.g., displaying products and/or services for purchases, chatting with online sales representative, etc.) respectively. Thus for each template type and class/grouping, card type ID 73 may be assigned.

With the template-based approach, the author(s) of a wrap package 10 can easily select a desired template/card layout that meets their need from a set of available templates and create a new card by readily inserting the desired content, functionality and/or services into the predefined containers. Such a template based approach can greatly simplify the authoring of cards 14 and wrap packages 10, since the author(s) need not be an expert in HTML, scripting or other typical web page language constructs required in order to create the card(s) 14 as typically required with creating conventional web pages. Rather, those details are embodied in the selected template itself, which translates to a specific layout 75, which in turn is identified by the layout ID 76. When a run-time instance of the wrap package 10 is created, layout 75 is used to format the associated card 14.

The associations between components 16 and their contained content objects 17, whether explicit in the card descriptors, or implicit and anonymous, are sometimes referred to herein as "pins" 80. When explicit, pins 80 are identified in the card descriptors 46 by a universally unique Pin ID 81, and by a symbolic pin name 82. When implicit, pins are anonymous at runtime, but may at design time be instantiated in order to provide operable constructs to the authoring tools, in which case they will share the name and ID of the component they bind and associate.

Whether implicit or explicit, these conditions are equivalent, and one representation may be trivially transformed into the other and vice versa, with no loss of meaning. The runtime, authoring environment and other tools are free to transform the object graph as they see fit, and whether the association is treated as intrinsic or extrinsic is irrelevant for the purposes of the determination of the structure of the wrap and its contents, this transformation being a matter of convenience.

The symbolic name of a pin (pin name 82) or component is both Human and Machine-Readable, for example, "Headline", "Glyph", "Body", "Image", "Video", "Cul-de-sac", or any other heading that the template designer deems appropriate. The symbolic name is used to identify its function; can be used and bound to by constraints and layouts to further constrain their display, behavior and function; and is used by the authoring tools to identify the role of the thus-associated component and map fields from one layout to another when changing the layout associated with a card. Multiple pins or components can share the same symbolic name. When they do, it implies that they serve the same role in the system, and that the same rules will apply to them.

Components 16 contain there associated content 17 and may also contain or reference zero or more attributes or constraint objects, specifying metadata to manage or modify the display of, or behavior of, that component. Constraint objects may specify abstract symbolic data used by the runtime to determine how to display or manage the object containing it, (the Constrained Object) or the behavior of that object. Examples of such abstract symbolic data are CSS class names, behavior names, or other symbolic names acted on by other objects in the system. Constraints may also contain concrete specifications to modify the display or behavior of the object, or its container or any contained objects. An example of the former is containing CSS rules applied to the content. An example of the latter is inclusion inline or by reference of JavaScript code that acts on the constrained object.

The various constraint objects may be thought of as attributes that define the style, format, behaviors, source/feed, and/or constraints associated the corresponding content 17. In the illustrated embodiment, these attributes include style attributes 86, source attributes 87 and other constraint objects such as behaviors 60, 62. Of course, other attributes of a component can be defined and declared as appropriate for the associated content.

The style attributes associate various styles with the content 17 and may take the form of style sheets (e.g. CSS) or other conventional style definition mechanisms. By way of example, if the content 17 is a text string, the style attributes 86 may include features such as the font, size, case, color, justification, etc. of the text. If the content is a glyph, the style attributes may include the color of the glyph, the size, etc.

The source attributes 87 indicate the source of the associated content 17. In some circumstances, the source attribute may simply be a reference or pointer (e.g. a URL) that identifies the location of a static content object (e.g., an image, a photo, a video, etc.). However, it should be appreciated that the content can also be dynamic. For example, the content object associated with a component of a wrap could be the current price of a particular stock. In such a case, the source attribute identifies the feed from which the current price will be retrieved when the card is rendered.

The ability to incorporate feeds into a wrap is a powerful construct that facilitates a wide variety of different functionalities including the dynamic updating of information presented in a wrap after the wrap has been rendered. In general, a feed is a structured source having content that can be dynamically updated after the wrap has been rendered. As will be appreciated by those familiar with the art, there are a wide variety of different types of feeds and different feed structures. For example, a live streaming feed may present a live stream that is progressively rendered as the stream is received. Examples of live streams include live video streams, audio streams, biometric streams, stock ticker streams, etc. Other feeds are server side event driven as is commonly used to facilitate live updates—as for example, sports score updates, stock price updates, etc. Still other feeds are polling feeds in which the wrap periodically polls a source.

The source attribute 87 may take the form a feed descriptor that defines the nature and structure of the feed as well as its feed characteristics including source location, data format(s), update semantics, etc. For example, some feeds (e.g. live feeds and live update feeds) require that a socket be opened and kept open as long as the feed is active. Polling feeds require the identification of the desired polling frequency. In other embodiments, the source attribute may include a reference to a feed object (note shown) that defines the feed.

It should be appreciated that there are a very wide variety of different types of information/content that a wrap author may desire have updated dynamically while a wrap is being displayed. These might include items that may be expected to update frequently and others that may update very slowly. By way of example, a few examples of items that may be desirable to update dynamically include sports scores, stock prices, the number of tickets still available for purchase for an event, number of units of a product that are available or simply an indication of whether a product is in our out of stock, breaking news headlines, etc. A number of services can also benefit from the ability to dynamically update content based on information that can change while a wrap is displayed such as, the user's geographic location, social networking group information (e.g. friends or peers that are nearby, online, etc.), featured information, etc. For example, a card in a wrap for a sports stadium could show the nearest concession stands, restrooms, etc. which can vary as the user roams around the stadium. Another card could show the stats of a baseball player currently at bat. A social networking card may inform a user when their friends or others sharing similar interests are nearby. A retailer may wish to run special offers that update periodically. Of course, these are just a few examples. The types of content that an author may wish dynamically update is limited only by the creativity of the author. Other constraint objects may include declarations of specific behaviors that are intended to be associated with the component 16 and/or content 17. Such behaviors may include behaviors 60, 62 known to or accessible by the runtime viewer 50 as discussed above.

FIG. 6A diagrammatically illustrates an alternative pin based card descriptor structure 46A. Appendix II of U.S. Provisional Application No. 62/133,574 illustrates a representative wrap descriptor 40A that takes the form of a JSON object that utilizes the pin based card descriptor structure 46A illustrated in FIG. 6A. FIGS. 14A-14E illustrate the wrap defined by the wrap descriptor of Appendix II of the referenced provisional. To facilitate correlation between the Appendix and FIG. 6A, various descriptor elements are labeled with corresponding reference numbers in Appendix II of the referenced provisional.

In the embodiment of FIG. 6A, the card descriptor 46 includes a unique card ID, 71, a card name 72, card type 73 and a card layout 75. The layout 75 includes a layout ID 76, optionally a layout name 77 and an explicit layout definition 78. In the illustrated embodiment, the layout definition takes the form of style sheets (e.g., cascading style sheets (CSS)). Although the illustrated embodiment includes both the layout ID 76 and an explicit layout definition 78, it should be appreciated that either could be eliminated from the descriptor if desired. For example, if the explicit layout definition is not part of the descriptor structure, it could be accessed through the use of the layout ID. Alternatively, when the layout definition 78 is explicitly provided, the explicit use of the layout ID 76 may be eliminated. However, it is generally preferable to explicitly provide the layout ID.

The descriptor 46A also includes an array of zero or more pins 80, with each pin 80 corresponding to a first level component 16. Each pin 80 includes a pin ID 81, a pin name 82 and an associated component 16. The component 16 includes a component ID 88, a component type 89, and the component content 17. As indicated above, the content may be provided in-line or by reference. Any desired attributes and behaviors may then be associated with the component through a set of zero or more component attributes 86 which potentially include any desired component style class declarations 91, component style sheets (CSS) 93 and component behavior declarations 95. In the illustrated embodiment, the style class declarations 91 refer and bind to CSS classes defined in the layout definition 78 that are used to define the format of the associated component 16. Numerous examples of this binding can be seen in the Appendix II of the referenced provisional. By way of example, the first pin 80(1) in Appendix II has an associated component style class declaration 91(1) that refers to and binds the font size style "font size-x1" 96 defined in layout 78 to the associated text content 17(1).

Component style sheets 93 provide an alternative component level mechanism for associating specific styles and formatting with a component 16. In general, it is expected that the card layout definition 78 will define the styles and formats associated with each component in a robust manner that is satisfactory to the card author. In such implementations, there is no need to include any component level style sheets 93, and it is expected that in many (indeed most) such card implementations, no component style sheets would be provided. Rather, the associated styles may be bound through the use of class declarations 91. However, the component style sheets 93 provide a mechanism by which the style assigned to the component by the layout definition 78 may be overwritten, which gives card authors great flexibility in defining the stylistic presentation of their content without altering the card layout definition. In other implantations, it may be desirable to define some of the style attributes at the component level rather than the card level. In such implementations more aggressive use of component level style sheet 93 would be expected. In still other embodiments, the availability of component level style sheets can be eliminated altogether. In the illustrated embodiment, style sheet are used to assign styles to the components since they are currently a popular format for associating different styles with HTML content. However, it should be appreciated that other now existing or later developed constructs can readily be used to associate styles with the content as appropriate.

Behaviors 60, 62 can be associated with a component on the component level in the same manner as the style sheets. This can be accomplished, for example, through the use of behavior declarations 95 which declare specific behaviors 60, 62 with their associated component. It should be appreciated that the ability to associate specific behaviors with specific components in a general manner provides tremendous flexibility in the card creation process that facilitates the creation of cards having an incredibly wide range of functionality and behaviors while maintaining a simple, compact, and highly portable wrap structure. Even though there is an ability to associate behaviors with specific components, it is expected that the behavior set may be null for many components because they would have no need to have any specific behaviors associated therewith.

The card descriptor 46A also associates any desired card level attributes and/or behaviors with the card through a set of zero or more attributes 86C that are associated with the card at the card level. Like the component attributes 86, the card attributes 86C potentially include any desired card level style class declarations 91C, card level style sheets 93C and/or card level behavior declarations 95C which work in substantially the same way as the component attributes, except that they operate at the card level. When desired, the wrap descriptor 40 can also have similar wrap level attributes 86W. Similarly, when the content of a component includes one or more subcomponent(s), the various subcomponent(s) may have their own associated component attributes 86 regardless of the tier of the component/subcomponent. Still further, when desired, attributes can be associated with groups of components.

FIG. 6B diagrammatically illustrates an alternative card descriptor structure 46B that does not utilize pins 80. The structure of card descriptor 46B is generally similar to the structure of card descriptor 46A described above with respect to FIG. 6A except for the use of pins. Therefore, the attributes (e.g., styles and behaviors) are associated with their corresponding components 16 rather than with pins 80. Like in the embodiment of FIG. 6A, the card descriptor 46B includes a card ID 71, a card name 72 and a layout 75. The layout 75 includes a layout ID 76, layout name 77 and layout definition 78. The descriptor then includes an array of zero to many components 16.

Each component 16 includes a component ID 88, a component name 84, a component type 89, the associated content 17 and the associated attributes 86. Like in the previously described embodiment, the associated attributes may include associated classes 91, component style sheets or definitions 93, behavior declarations 95 and/or their associated behaviors 60, 62. Thus it can be seen that card descriptors 46B are functionally substantially equivalent to the card descriptors 46A described above.

Appendix III of U.S. Provisional Application No. 62/133, 574 illustrates a representative wrap descriptor 40B that takes the form of a JSON object that utilizes the component based card descriptor structure 46B illustrated in FIG. 6B. To facilitate correlation between Appendix III and FIG. 6B, various descriptor elements are labeled with corresponding reference numbers in the Appendix. It is noted that the attributes container 86 is labeled "Styles" in the JSON code of Appendix III.

Although only a few particular card descriptor structures have been described, it should be appreciated that equivalent functionality can be obtained using a wide variety of different descriptor arrangements.

Gallery Card Descriptors

FIG. 6C illustrates a representative gallery card descriptor 46G. The illustrated embodiment uses the component based descriptor approach of FIG. 6B although it should be appreciated that other card descriptor hierarchies (such as those illustrated in FIGS. 6 and 6A can be used as well. Gallery card descriptor 46G includes card ID 71G, card name 72G (in this case "Gallery Card"), and card layout 75G with layout ID 76G, layout name 77G and CSS layout definitions 78G, which together define a layout suitable for a gallery card. The initial component is gallery component 16G, which has a component ID 88G, a component name 84G, a component type 89G, gallery component content 17G, and any associated attributes 86G (including class declarations 91G, style sheets 93G and behavior declarations 95G).

In the illustrated embodiment, both the component name 84G and the component type 89G are "Gallery." The "content" of the gallery component 16G is a set of one or more gallery item components 116. Each of the gallery item components 116 typically, although not necessarily, has the same component structure previously described and can be thought of as subcomponents. This introduces a powerful feature of the described architecture. That is, the "content" of any particular component may be one or more "subcomponents". Similarly, the content of any of these "subcomponents" may also include one or more next tier components and so on, with the components at each tier having the same generic structure. Thus, each gallery item component 116 includes: a component ID 88, which may be thought of as a gallery item ID; a component name 84, a component type 89, content and any associate attributes 86 (potentially including class declarations 91, style sheets 93 and behavior declarations 95).

In the illustrated embodiment, the component name 84 and component type 89 for the gallery item 116 is "Gallery Item". The content of the gallery item 116 is a set of components (subcomponents) that make up the gallery item (that is, gallery items 116, which are subcomponents of the gallery component 16G, themselves have subcomponents which might be thought of as third tier components). Each of these gallery item components has the same structure as any other component. By way of example, the gallery item components may include a headline component 16H, and an image component 16I (shown in Appendix III of U.S. Provisional Application No. 62/133,574). Only the headline component 16H is shown illustrated in FIG. 6C, but the corresponding JSON descriptor is shown and labeled in Appendix III.

With the described structure, specific behaviors or styles can be associated with components at any level. Thus, for example, a behavior can be associated at the card level, the gallery item level, the component of a gallery item level or at any other level at which components are used. An example of a card level behavior might be the aforementioned gallery card "snap to item" behavior 60C, which can be seen in the aforementioned Appendices I, II and III. An example of a gallery item subcomponent level behavior might be a trigger as described below.

Although a particular gallery card descriptor structure has been described, it should be appreciated that equivalent functionality can be obtained using a wide variety of different descriptor arrangements.

Trigger Descriptors

Referring next to FIG. 6D, a descriptor structure for a representative trigger component will be described. Like other components, the trigger component 16T includes an optional trigger component ID 88T, a component type 89T, a component name 84T, content 17T and any associated attributes 86T (including any class declarations 91T, style sheets 93T and behavior declarations 95T). In the illustrated embodiment, the component type 89T is labeled "trigger" and the component name 84T is labeled "transact" indicating that the trigger is a transaction trigger.

The content 17T of the trigger component 16T in this illustrative example includes three subcomponents. The subcomponents include a text box 16TT, an image 16TI that takes the form of a "buy button" and a link 16L. The link 16L has an associated behavior "open-in-new-tab", which causes the browser to open the target URL in a new tab when the trigger is activated by tapping on a touch sensitive display anywhere within the region defined by the trigger or by otherwise activating the trigger. The described link trigger behavior is a good example of a component level behavior.

In the illustrated embodiment, the link component 16L is a first level component of the trigger and therefore the link is activated by tapping on (or otherwise selecting) any component within the trigger—as for example either the text box 321 or the buy button 327. If the card creator preferred to have the link activated only by selection of the buy button 327, that can readily be accomplished by making the link 327 a component of the buy button rather than a first level component of the trigger—or, by moving the text box component definition out of the trigger—as for example to the same component level as the trigger itself. Any tap or click in the bounding rectangle of the trigger, as defined by the components contained by the trigger, results in the trigger being activated.

It should be apparent that the trigger component may be included as a first tier component in the card descriptor or as a subcomponent at any level within the card descriptor hierarchy. Although a particular trigger descriptor structure is illustrated, it should be appreciated that equivalent functionality can be obtained using a variety of different descriptor arrangements. It should further that FIG. 6D is illustrative for providing an example for the purchase of an item for sale. It should be understood, however, the cards can be authored with triggers for a wide variety of actions besides purchasing an item, such as the reservation or booking of goods and/or services, online chats, GPS related services and functionality, etc.

Feed Descriptors

As indicated above, there are a wide variety of different types of feeds and feed structures that may be desirable to incorporate into any particular wrap. To facilitate the use of feeds, any wrap descriptor 40 or individual card descriptor 46 may include one or more feed descriptors 187. Each feed descriptor 187 has a number of descriptive elements that together define an associated feed in a manner that can be used by the runtime to integrate information from the feed into a rendered wrap instance in the manner desired by the wrap author.

Referring next to FIG. 6E, a representative feed descriptor 187 in accordance with a nonexclusive embodiment will be described. In the illustrated embodiment, the descriptive elements of feed descriptor 187 include a feed type 1005, a feed source 1007, a desired lifecycle 1009, a feed target 1011, an update frequency indicator 1013 and any required feed parameters 1015. Of course, not all of these descriptive elements are required in every feed descriptors and any particular feed descriptor may include one or more additional descriptive elements as appropriate. The feed descriptor 187 may also optionally include a feed ID 1003 and/or a feed name 1004.

The feed type 1005 indicates the type of the associated feed. In general, most feeds can be categorized into categories or "types" that share similar traits and/or requirements. As previously discussed, some of the feed types might include "live" (server side event driven) feeds, polling feeds, streaming video feeds, streaming audio feeds, etc. When the feed descriptor is processed by the runtime, the feed type can be used to help identify the resources that may be required to support the feed. For example, live streaming feeds and server side event driven feeds may require the opening of a socket for the feed and keeping the socket open for the duration of the defined feed lifecycle 1009.

As will be appreciated by those familiar with the art, most web feed are formatted using either RSS or Atom and the runtime can be configured to handle either of these web feed formats or any other desired feed format. Typically, it is not necessary to specifically identify the feed format in the descriptor, however, we desired, a feed format field (not shown) can be added to the descriptor or the feed format can be dictated by the feed type.

The feed source 1007 indicates the location from which the feed can be obtained. Often, the feed source 1007 takes the form of a URL, although other endpoints or source identifiers may be used in alternative embodiments.

The lifecycle 1009 indicates the feed's lifecycle semantics. That is, when and how the feed in activated, the conditions under which it remains active and potentially, when it is closed. For example, a few potential lifecycles might include: (a) "while-card-visible" which opens the feed when that associated card is displayed and keeps the feed active as long as the associated card is the visible card within the wrap; (b) "always" which opens the feed when the associate wrap is rendered and keeps the feed active as long as the wrap is displayed; (c) "on-card-open"—which activates a feed any time the wrap transitions to the associated card; (d) "on-wrap-load" which opens the feed when the wrap is loaded; (e) "on-user-selection" which opens and/or updates the feed in response to a user input (e.g., the selection of a displayed button or other user activated trigger). Some of the lifecycles, such as "while-card-visible" and "always" may be more appropriate for live and streaming feeds, or feeds that affect globally-visible wrap state (e.g. in a globally visible sports score ticker or stock ticker) whereas others, such as "on-card-open" or "on-wrap-load" may be more appropriate for polling feeds. Which type of feed is most appropriate is highly context-dependent, and will be determined by wrap authors.

The semantics of feed lifecycle management when a feed is no longer active may also vary widely based on what is appropriate for a particular feed. To illustrate this point, consider a feed that is active "while-card-visible." When the user navigates away from the relevant card, the feed becomes "inactive" and there are several different feed handling approaches that can be utilized at that stage. For example, in some circumstances, it may be desirable to simply close the feed and the associated connection when the user navigates away from the relevant card. Thereafter, if the user navigates back to the card, a new feed/connection is opened—with or without retained knowledge of what was previously downloaded. In other circumstances, it may be desirable to continue to accumulate any updates associated with the feed at the server while the feed is "inactive", and to forward such updates to the wrap in a batch if, and when, the user returns to the associated card. In such circumstances, the connection associated with the feed might be kept open while the user continues to navigate within the wrap, and thus, the connection would only be closed when the wrap itself is closed or the feed times out. Although only a few "inactive" feed management approaches have been explicitly described herein, it should be appreciated that a wide variety of other mid-life and end of life feed management techniques can be used as appropriate for any particular implementation.

Feeds may also remain active in order to collect events, and to initiate alerts related to those events. For example, in a chat session, it may be desirable for a wrap may indicate that there was activity on another card, based on an incoming chat message, and in some cases not force the user back to that card. In other cases the wrap author may choose to cause the user to be brought back to a chat card when a new message comes in. Moreover, a feed may be manually initiated or terminated, e.g. in the case of a user chat session, when the user chooses to initiate or terminate a chat session, perhaps with a customer service person, or another user.

The target 1011 indicates the callback endpoint for the feed—which may be the method to call when an event happens. In many implementations, the target will be a container within the wrap that the feed is to be associated with. In many circumstances, the intended container will be the component or other structure (e.g., card/wrap) within which the feed descriptor 187 is defined within the wrap descriptor 40. That is, when the feed descriptor 187 is included as part of a particular component definition, it might be assumed that the feed is intended to be bound to that particular component. Alternatively, if the feed descriptor 187 is included as part of a card descriptor 46 outside of any of the associated component descriptions, it might be assumed that the feed is intended to be bound to the associated card. Still further, if the feed descriptor is included as a part of a wrap descriptor 40 outside of any of the associated card descriptors 46, it might be assumed that the feed in intended to be bound to the wrap as opposed to any particular card or component.

However, in other situations, it may be desirable to bind a feed to an endpoint or containing structure that is different than the structure within which the feed descriptor appears within the wrap descriptor. For example, in some circumstances it may be desirable to overlay the feed content over all of the cards or a subset of the cards within a wrap. In such a circumstance, it may be desirable to associate the feed descriptor with the overlay or the wrap rather than a particular card or card component. At the same time, the feed may be defined as part of a particular card, or as part of a particular component of a particular card. As such, although the feed is defined (via the feed descriptor 187) as part of a particular card/card component, it may be desirable to associate the feed with an endpoint other than the card/component. The target field 1011 provides a simple mechanism that provides great flexibility in allowing a card author to associate a feed with any suitable structure within the wrap without forcing a rigid feed descriptor authoring syntax, while the default behaviors make it easier for the author to build more standard feed behaviors.

In embodiments, in which the target 1011 is not explicitly defined, the default target may optionally be set to the container associated with the structure within which the feed descriptor appears in the wrap descriptor 46. Alternatively, the default target could be the containing card, wrap or other level container. In still other embodiments, the explicit target definitions can be eliminated and all targets can be implicitly defined by the location of the feed descriptor 187 within the wrap descriptor. Although such an arrangement can work well, it should be appreciated that it lacks some of the flexibility provided by supporting explicit target definitions.

When explicit, the target can be identified relatively, by reference or through the use of explicit identifiers. By way of example, in a particular embodiment, representative targets include: "container"—which refers to the container associated with the structure within which the feed descriptor 187 appears; "parent"—which refers to the parent of the structure within which the feed descriptor 187 appears; "card"—which refers to the card within which the feed descriptor 187 appears; "warp"—which refers to the wrap within which the feed descriptor 187 appears; "grandparent", etc. It is noted that when a relative term such as "parent" is used, the level of the containing structure will be dependent on context. For example, when "parent" is used in the context of a subcomponent, the "parent" would be the containing component. However, when the term "parent" is used in the context of a first level component, the term "parent" would refer to the containing card, etc. It should be noted that the same target can be identified by multiple methods: relative references, absolute references, and default references being the primary embodiments.

The frequency 1013 is particularly relevant to polling feeds and indicates how often the feed should be polled. In some circumstances it will only be desirable to poll the feed once—e.g., when the associated card is opened, which can be uniquely defined by the combination of Lifecycle: on-card-open and Frequency: once. In other circumstances it may be desirable to periodically poll the feed, as for example, every minute, every 15 seconds, every 5 minutes, etc. In still other circumstances it may be desirable to poll when the card or wrap is first opened and thereafter only poll in response to user inputs or other events, as for example in response to the user selection of an "update" button (not shown). Of course, a very wide variety of other update rules can be defined through the use of different frequency and lifecycle constraints, and the feed may itself update the polling frequency for subsequent reads, over the life of the interaction.

Some feeds may require the passing of specific parameters to the server that may be used by the server for various control, tracking or authentication or other purposes. Feed parameters 1015 can be used to pass such parameters to the feed server. In the illustrated embodiment, the feed parameters take the form of name/value pairs although other data structures can be used in other embodiments. In some circumstances, the feed parameters 1015 may be static and explicitly included in the wrap descriptor. For example, if a card employing a feed is associated with a particular ad campaign, it may be desirable to identify the ad campaign through the use of campaign identifier passed a feed parameter. In other circumstances the feed parameters may be variables. For example, a card arranged to provide current MLB scores sports may use team identifier parameters to identify the teams of interest to the user, with the user being given the ability to select the teams of interest—as for example through the selection of one or more teams of interest through a menu provided on the card. Of course the specific parameters that are appropriate for any given feed and the manner in which the parameters are obtained may vary widely and will often depend in large part on the APIs associated with the feed.

As described in more detail below, a feed engine in the runtime viewer has a set of rules that know how to access and bind the feed appropriately based on the descriptor information. Thus, the runtime viewer can readily access the feed source and deliver the content to the appropriate container when the associated card/wrap is rendered based on this descriptor information.

The actual contents of any particular feed descriptor can vary significantly based on the nature of the feed and its intended use within the wrap. For example, a representative, nonexclusive, polling feed descriptor 187a may have the following structure:

| | |
|---|---|
| Feed: | (187a) |
|     Type: polling | (1005) |
|     Source: https://feed.wrap.com/macys/catalog-spring_15 | (1007) |
|     Lifecycle: on-card-open | (1009) |
|     Target: container | (1011) |
|     Frequency: once | (1013) |

In this embodiment, the feed descriptor 187a defines a "polling" feed as indicated by "polling" feed type 1005. The feed is queried once each time the card is opened as indicated by frequency indicator 1013 and lifecycle 1009 respectively. The source 1007 of the feed as well as the target container 1011 are also provided. In this example the target is "container" which refers to the structure within which the feed descriptor 187 appears. Of course, the feed descriptor may also optionally include a feed ID 1003 and/or a feed name 1004, in addition to any feed-specific parameters.

In another example, a representative, nonexclusive, server side event driven feed descriptor 187(b) may have the following structure:

| | |
|---|---|
| Feed: | (187b) |
|     Type: live | (1005) |
|     Source: https://live-feed.wrap.com/mlb/scores | (1007) |
|     Lifecycle: while-card-visible | (1009) |
|     Target: container | (1011) |
|     Parameters: | (1015) |
|         Teams: [SFG, NYM] | (1016) |

In this embodiment, the feed descriptor 187b defines a "live" server side event driven feed as indicated by "live" feed type 1005. The feed is activated any time that the card is visible so that updates can be displayed as they are received. The runtime feed engine knows to open a connection with the server when the associated card is displayed and to keep it open as long as the card is visible based on the feed engine rules associated with "live" feed types 1005 and the declared "while-card-visible" lifecycle 1009. The source 1007 of the feed as well as the target container 111 are indicated in the same manner as the previously described polling feed 187a. The card associated with the illustrated feed is designed to provide current scores for MLB baseball games. The feed is arranged such that the specific teams to be followed can be identified in feed parameters 1015 (i.e., Team parameters 116) sent to the server. In the illustrated example, two teams, the San Francisco Giants and the New York Mets are indicated. As such, the feed will only provide updates on games involving at least one of those teams. In the illustration above, the team parameters 1016 are specifically identified in the descriptor. For cards that are associated with one or more specific teams, it may be desirable to include explicit team parameters 1016 in the descriptor. However, in other instances, the associated card may include a selector interface that allows users to select which games they are interested in following. In such a case, the team parameter in the descriptor might specify that selector, might be a null or default field that can be filled and/or overridden by user selection, or other structure as appropriate.

One of the application functionalities that is supported by the wrap runtime is chat services. Thus, chat functionality can readily be integrated into the any wrap. Chats typically require the use of a feed which can be defined in the same manner as other feeds. The feed used in a chat session can take the form of a live feed, a polling feed, or any other available feed structure. The feed structure that is most appropriate for any particular chat will depend in large part on the nature of the communications that are expected. In implementations where communications are expected relatively continuous, a live feed may be most appropriate. In implementations where communications are expected to be relatively infrequent, a polling feed with an appropriate polling interval may be more appropriate. The specific chat feed structure may vary with the design intent of the chat tool provider. By way of example, a representative, nonexclusive, chat feed descriptor 187(c) may have the following structure:

```
Chat:                                                    (187c)
    Type: Customer Service                               (1005)
    Source: https://chat.wrap.com/macys/customer_service (1007)
    Lifecycle: open-on-user-selection                    (1009)
    Target: chat-overlay                                 (1011)
    Frequency: every 30 seconds                          (1013)
    Parameters:                                          (1015)
        User Name: [$user_name]                          (1016)
        Account No.: [Account-#]
```

In this embodiment, the feed type is customer service 1005 which is a polling type feed with the update frequency 1013 is "every 30 seconds." In the frequency example, 'every' is a keyword indicating a polling interval, 30 is a parameter indicating the number of units, and 'seconds' indicates the units applied to the unit parameter. There are a number of other chat types that may be appropriate, but way of example, "group" chat which may involve multiple participants, "single user" which may be a point to point chat, etc.

The lifecycle 1009 is defined as "open-on-user-selection" which indicates that the feed is activated directly or indirectly by user selection as opposed to automatically when the wrap is renders or an associated card us displayed. Any suitable gesture can be used to activate the feed—as for example, by a user tapping or clicking on a "Chat Now" button (thereby activating a trigger that in turn launches the chat session). Some chat sessions may require or request certain information to initiate the session. When some (or all) of the required information is known at the time the wrap is authored, the appropriate information/values can be included in the feed descriptor parameters 1015. For example, in the illustrated embodiment, a user name and an account number is desired (if available). Although user specific information would not be known at the time the wrap is authored, variables can be provided in the descriptor, (e.g. $user_name) as placeholders, (e.g. [Account #]), or be incorporated dynamically from session state information, user cookies, or other available state information.

User specific information such as user name, account number (in illustrated embodiment a Macy's account number) may be stored persistently at any appropriate location, as for example in a state descriptor, the runtime viewer, a cookie associated with the runtime viewer, etc. The runtime viewer can then look up the information corresponding to the declared variables appropriately at runtime—e.g., when the wrap is rendered, when the chat session is launched or at any other time that is deemed appropriate. In some circumstances, the requested information may not b available to the wrap. If the requested information is optional, then the chat session can be initiated without that information. If required, the user may be prompted to input the requested information.

Widgets

Application functionality can be incorporated into a wrap in a wide variety of different manners. In some wraps, behaviors are integrated directly into one or more card to instill desired wrap functionality. Another construct that the wrap runtime supports to facilitate the integration of different functionalities into a wrap is the component type "widget." Conceptually a widget component creates an internal frame within the associated card (e.g. an HTML iframe) and points to an external source that supplies the content for the internal frame. The widget component typically contains a URL that points to the source (e.g., a server associated with the widget) and may specify any number of parameters to be passed to the server that may be helpful to the server in determining the specific content that is appropriate to supply to the internal frame. When a widget component is loaded by the runtime, the runtime creates an internal frame within the associated card and obtains the contents to populate the internal frame from the identified source. Thus, the content rendered within the internal frame associated with the widget is dictated by a source/server that is external to the wrap runtime rather than by the wrap descriptor itself. By using widget components, third parties can introduce any desired content or functionality into a wrap.

In a specific example, the internal frame may take the form of an HTML iframe which is a well established HTML construct that facilitates embedding a document inside another document. The iframe effectively creates a blank frame within the associated card that can be populated with content supplied by a server associated with the widget. The content may be provided in HTML format, which allows standard browsers to render the content within the frame. The HTML may include any desired scripts (e.g. JavaScript) to provide the widget with desired behaviors. HTML iframes work particularly well because HTML is currently the de facto standard markup language used to create web pages and is therefore supported by virtually all state of the art web browsers and is familiar to most web designers. Although HTML iframes are used in the specific example, it should be appreciated that in other embodiments, the internal frames may be constructed using other structures and/or may be have their content delivered in a variety of different now existing or later developed formats, markup languages, etc.

To incorporate a widget into a card, a widget component descriptor 118W is included in the associated card descriptor 46. A representative widget descriptor architecture is illustrated in FIG. 6F. In the illustrated embodiment, the widget descriptor 118W includes a component type 89W (which in this case is type "widget"), a component ID 88W, an optional component name 84W, and a widget definition 120W. The widget definition 120W includes a widget ID 121, a widget name 122 and a definition 124 which is labeled "schema" in FIG. 6F. The definition 124 includes a source identifier 126 that identifies the location of the server that will supply the widget content and parameter(s) 130 that represent parameter(s) to be passed to the server when the widget is instantiated. The widget definition 120W also preferably includes frame size and position related identifiers such as width 127, height 128 and position 129. The width 127 and height 128 identify the internal frame's intended height and width, while the position 129 identifies its position within the card—e.g., the X-Y coordinates of its origin. It should be appreciated that the actual dimensions of the displayed cards may vary with the size of the screen upon which the wrap is displayed. Therefore, the various size parameters may be relative rather than absolute (e.g., 10%, etc.) Of course, in alternative embodiments, the dimensions and location of the internal frame can be defined in other manners. As with all components, the widget may also have associated attributes 86W (e.g., styles, behaviors, etc.).

The nature of the parameters 130 that are included in any particular widget descriptor will vary widely with the nature of the widget itself and the information that the widget developer deems important to the widget content server. If the widget content is static and the frame size is known to the server, there may be no need to include any parameters in the widget descriptor. However, it is expected that more often, it will be desirable to provide some additional types of information to the server as part of the content request. For example, in some circumstances the parameters might include one or more parameters that indicate the originating source of a request such as the associated wrap, card or widget component identifier(s); a user or system ID; the geographic location of the user, etc. Other parameters might be variables that provide information about the user (e.g. user demographic information), the current wrap viewing state, and/or information inputted or selected by the user, etc. Such information may be available from a variety of different sources, as for example: (i) a cookie associated with the wrap; (ii) the runtime viewer, (iii) a wrap state descriptor associated with the wrap and user, etc. Still other parameters may convey information that is particularly relevant to the widget. For example a Pintrest widget may identify specific pins, hosts, boards or tags of interest for the particular Pinterest card; a shopping cart widget may convey information identifying the user's identity, account number, shipping/billing address, items selected for purchase, credit card information, etc. It should be appreciated that these are just examples and that the parameters may be configured to provide whatever information is relevant to the specific widget.

In the embodiment illustrated in FIG. 6F, the widget definition includes a unique widget ID 121 that is distinct from the component ID 88W. The widget ID is optional, but can be useful to identify a widget class or object that is used to create the component. This is particularly useful from an object oriented programming and tracking standpoint in that a particular class/object may be utilized in multiple different widgets and the use of a widget ID allows the base class to be explicitly identified within the widget descriptor.

The content and functionality provided by a widget is only limited by the imagination of the widget author. By way of example: a Twitter widget can be configured to render a Twitter feed and facilitate Twitter services; a chat widget can be configured to provide a chat service; a countdown widget can be configured to provide a timer-like functionality; a live sports score widget can be configured to display sports scores in real time; a receipt widget can be configured to interact with a company's backend financial systems to provide purchase receipts; a purchase transaction widget can be configured to facilitate purchase transactions; cul-de-sacs can be implemented using a cul-de-sac widget; a stock widget can be configured to display stock prices and/or support trades etc. The specific parameters that may be useful for each of these widgets may vary dramatically with both the widget's purpose and its particular implementation.

In a particular example, a representative, nonexclusive, widget descriptor suitable for presenting a Pinterest pin may have the following structure:

| | |
|---|---|
| Component Type: Widget | (89W) |
| Component ID: <UUID> | (88W) |
| Component Attributes: | (86W) |
| Widget Type: | |
|     ID: <UUID> | (121) |
|     Name: Pinterest Widget | (122) |
|     Schema: | (124) |
|         iframeURL: | (126) |
|         https://pintrest.com/wrap_widget_server/ | |
|         width: # | (127) |
|         height: # | (128) |
|     Parameters: | (130) |
|         PinID: <pin #1> | |
|         PinID: <pin #2> | |
|         * | |
|         * | |

In this example, component is of type widget (89W), and has a universally unique component identifier (88W). Any desired component level styles or other attributes are associated with the component through component attributes 86W. The widget includes a universally unique widget identifier 121 and a name (Pintrest widget) 122. The widget definition 124 includes the source 126 from which the contents associated with the widget are to be obtained from—specifically, the URL https://pintrest.com/wrap_widget_server/ and the parameters 130 to be sent to the widget server. In the example above, the only parameters specifically shown are the Pin Ids of interest. The Pin Ids are used by the widget server to identify the particular Pinterest pin(s) to be transmitted to the wrap. In the illustrated example, two pins are shown although it should be appreciated that any number of pins and/or other relevant parameters may be included.

To illustrate a few additional uses of widgets, consider some features that a retailer might wish to include in a wrap to facilitate transactions. In some circumstance it may be desirable to include a short term "specials" card (e.g., "today's special(s)", this week or month's special(s), the "blue light" special, "clearance" items, etc.). A potential problem with special cards is that the card's contents will become stale relatively quickly. This drawback can be addressed in part by frequently putting out new wraps with fresh content. While wraps with fresh content are usually desirable, older versions of the wrap may still be circulating which doesn't eliminate the problem. Another potential approach would be to periodically update the wrap. This can be accomplished, for example, by updating the wrap (and thus the wrap descriptor) periodically such that a different (i.e., modified) descriptor is delivered in response to the same wrap request (e.g., by clicking on the same cover). However, such an approach is often disfavored and it doesn't solve the problem with respect to copies of the wrap descriptor stored at away from the wrap server.

Another approach is to utilize a widget in the "specials" card. In this example, an iframe is created within the specials card and the contents for the card may be delivered directly to the card at runtime by the merchant's server (e.g., a web server). Thus, the desired content of the specials card can be updated by the merchant at any time simply by updating servers it controls, and such updates are immediately applied to any wrap that is instantiated after the update is made without requiring the generation or use of a new descriptor. When desired, the widget in a "specials" card can be configured as a gallery (i.e., a gallery widget) so that the resulting card has an appearance that is similar to a gallery card. Gallery widgets can also be used to present frequently updated items like catalog items so that it is not necessary to update the wrap each time items are added or deleted (e.g., each time an item is added to or deleted from the catalog). For further details on how to implement widgets into wrap packages, see U.S. application Ser. No. 14/838,164 (WRAP P019) entitled "Card Based Package for Distributing Electronic Media and Services, filed Aug. 27, 2015, incorporated in its entirety (included any appendices) by reference herein for all purposes.

Maintaining State Information

In many circumstances it may be desirable to transitorily or persistently maintain state information associated with a user of a wrap 10 and/or state information associated with a wrap 10. Some information, such as general information about the user, may be shared state information that is relevant to a number of different wraps. Other state information may be specific to a particular wrap (e.g., a particular user selection or input within a wrap, etc.). Still other relevant state information can be more global state information that is relevant to all instances of a particular wrap independent of the specific user.

State information can be stored in a number of ways and the appropriate storage techniques will vary in part based on the nature of the state information. By way of example, general information about a user and other user specific shared state data can be maintained in a cookie, or when the user has a persistent viewer application, the user state information can be persistently stored locally in association with the viewer application. If desired, any or all of the shared state information can also be stored on the server side. The shared state information may be useful to support a wide variety of different services including: user login and/or authentication; e-commerce applications where the identity, contact info, mailing address, credit card information etc. of the user may be necessary; integration with other applications (e.g. a calendar application, a chat application, etc.); and many other services. User specific shared state information can also be used to affect the navigation within a wrap. For example, user demographic information can be used to determine which card to display next in a set of cards.

There are also a variety of circumstances where it will be desirable to persistently maintain state information about the state of a particular wrap. For example, if a card includes a dialog box that receives a user selection or a textual input, it may be desirable to persistently store such selections/inputs in association with the wrap itself so that such information is available the next time the wrap is opened by the same user (or same device).

In a nonexclusive embodiment, a state descriptor 68 is created and used to maintain state information associated with a particular wrap as illustrated in FIG. 5B. The state descriptor 68 is associated with both a specific wrap and a specific user and thus can be used to store state information relevant to that specific user's interaction with the wrap. When persistent state descriptors are used, the state descriptor 68 may be stored with the wrap on the publication server 22. When the user has a persistent viewer application, the state information can additionally or alternatively be stored locally in association with the viewer application either in the state descriptor form or in other suitable forms. Generally, a state descriptor 68 will include a wrap ID 42 and a user ID that identify the wrap and user that the descriptor is associated with respectively. The state descriptor 68 also stores the relevant state information in association with the card and component IDs for which the state information applies.

In certain embodiments, it may also be desirable to synchronize different instantiations of state information, depending on the where the state information is stored. For example if a user updates their credit card or shipping address information at a publication server 22, then the corresponding state information residing within any particular wraps associated with the user, or within a persistently stored wrap viewer residing on a communication device belonging to the user, would preferably automatically be updated. Conversely, any state information locally updated within a wrap and/or a persistently stored viewer would also selectively be updated in any other instantiations of the state information, such as but not limited to, other wraps, publication servers 22, on a network, or any other remote data processing location for example.

Authoring Tool

Wrap packages 10 are composed by authors 34 using an authoring tool 100. In various embodiments, the authoring tool may operate in a desktop computing environment or a mobile communication environment, such as on a mobile or cellular phone, a tablet, or other mobile device, such as a laptop computer.

Referring to FIG. 7, an exemplary "home screen" 102 of a computing device running the authoring tool 100 is illustrated. In this example, the home page includes a number of existing wrap packages 104A through 104F. For each wrap package 104, options are provided to "Copy", "Preview", "Edit" and "Share". By selecting any of these options, the corresponding wrap package 104 may be copied, previewed, edited or shared respectively.

For the purpose of explaining the operation of the authoring tool 100, the authoring of a new wrap package is described below. By selecting a "New Wrap" icon 106 appearing within the home screen 102, an author can begin the process of authoring a new wrap package.

Figure 8:
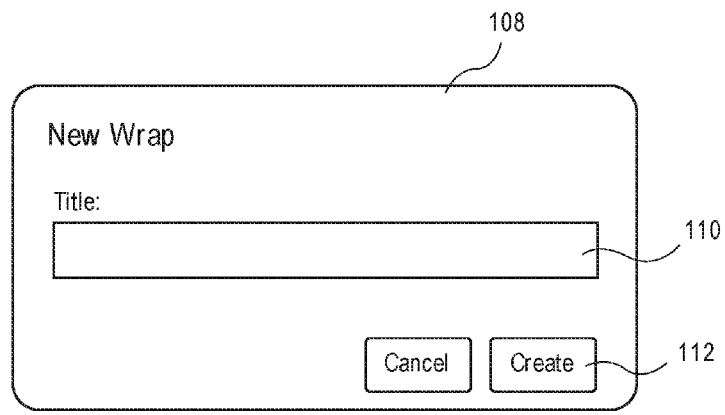
FIG. 8 illustrates an exemplary window for defining a title for a new wrap to be authored according to a non-exclusive embodiment.

Referring to FIG. 8, a window 108 for assigning a title for the new wrap appears on the screen of the computing device running the authoring tool 100 after the icon 106 is selected. Within this screen, a text field 110 is provided for entering an appropriate name or title for the new wrap package. Once the title has been entered, the author 34 selects the "Create" icon 112 to begin the authoring process for the new wrap package.

Figure 9:
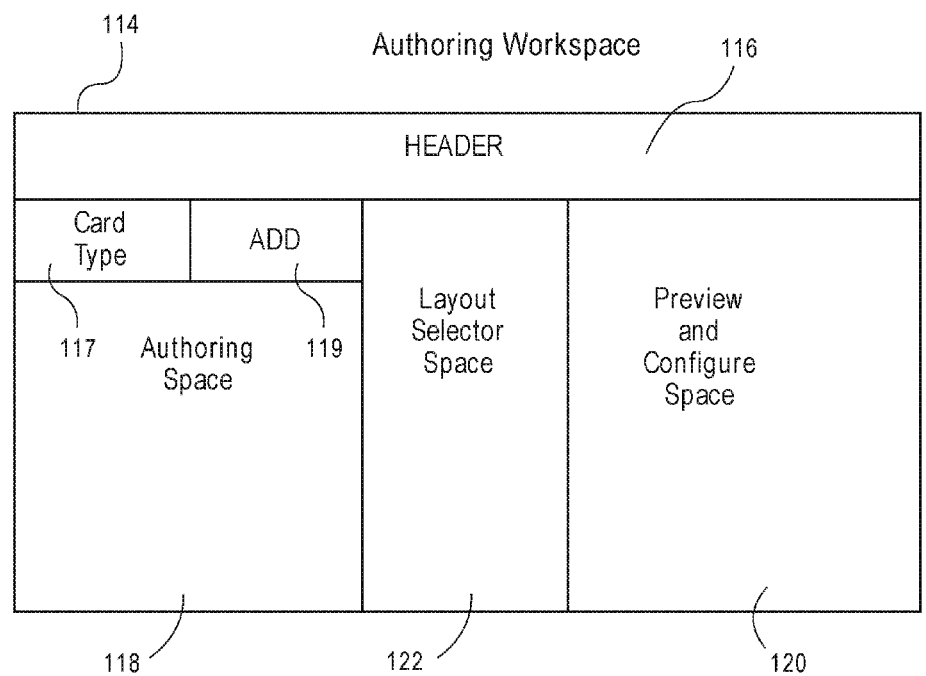
FIG. 9 illustrates a non-exclusive embodiment for an authoring workspace space for the authoring of wrap packages using the authoring tool of the present invention.

Referring to FIG. 9, an exemplary authoring workspace 114 is shown, which appears on the display screen of the computing device executing the tool 100 after the title for the new wrap has been defined. Within the workspace 114, the author 34 is provided a work area and a set of tools for the composing of wrap packages.

The workspace 114 includes a header field 116, a card type selector field 117 for specifying the type of card to be authored, an authoring space 118 for defining the components and content of cards the of the wrap package as they are authored, an add component field 119 for adding component(s) to the card appearing in the space 118, a preview and configure space 120 for previewing and configuring the card defined in the authoring space 118, and a layout selector space 122 for defining various card templates used for creating and configuring the various card types of the wrap package.

Figure 10A:
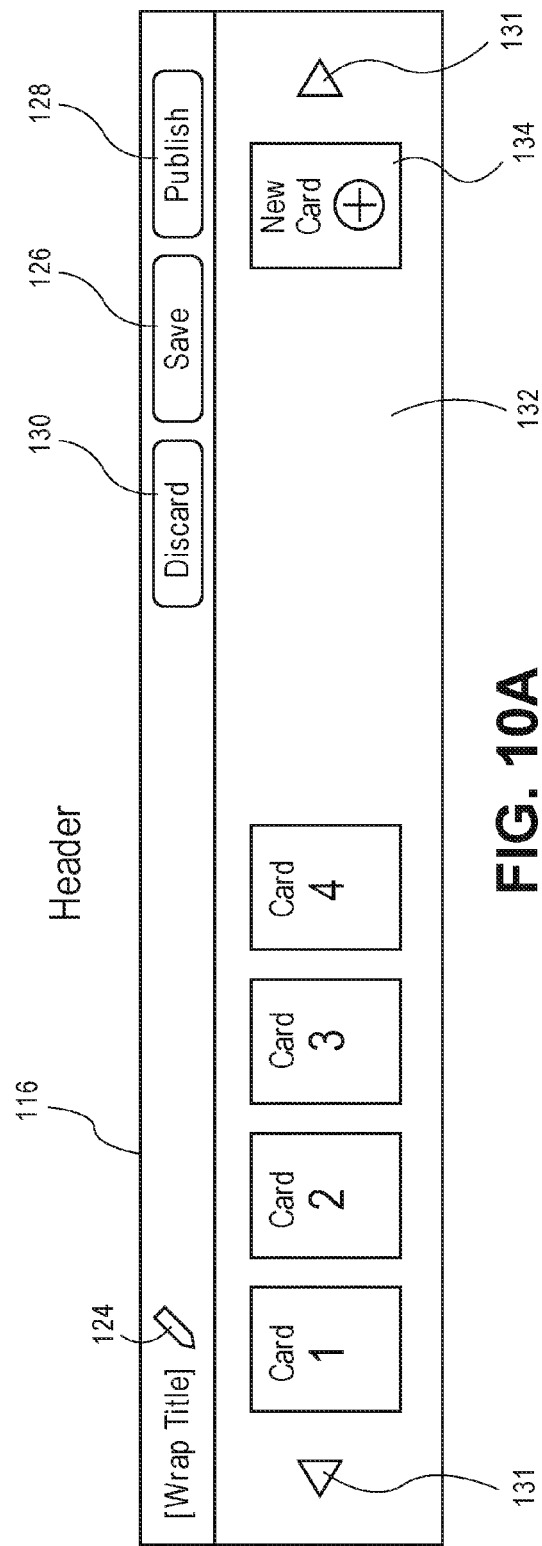
FIGS. 10A through 10C illustrate a header of the workspace for the authoring of wrap packages using the authoring tool of the present invention.
Figure 10B:
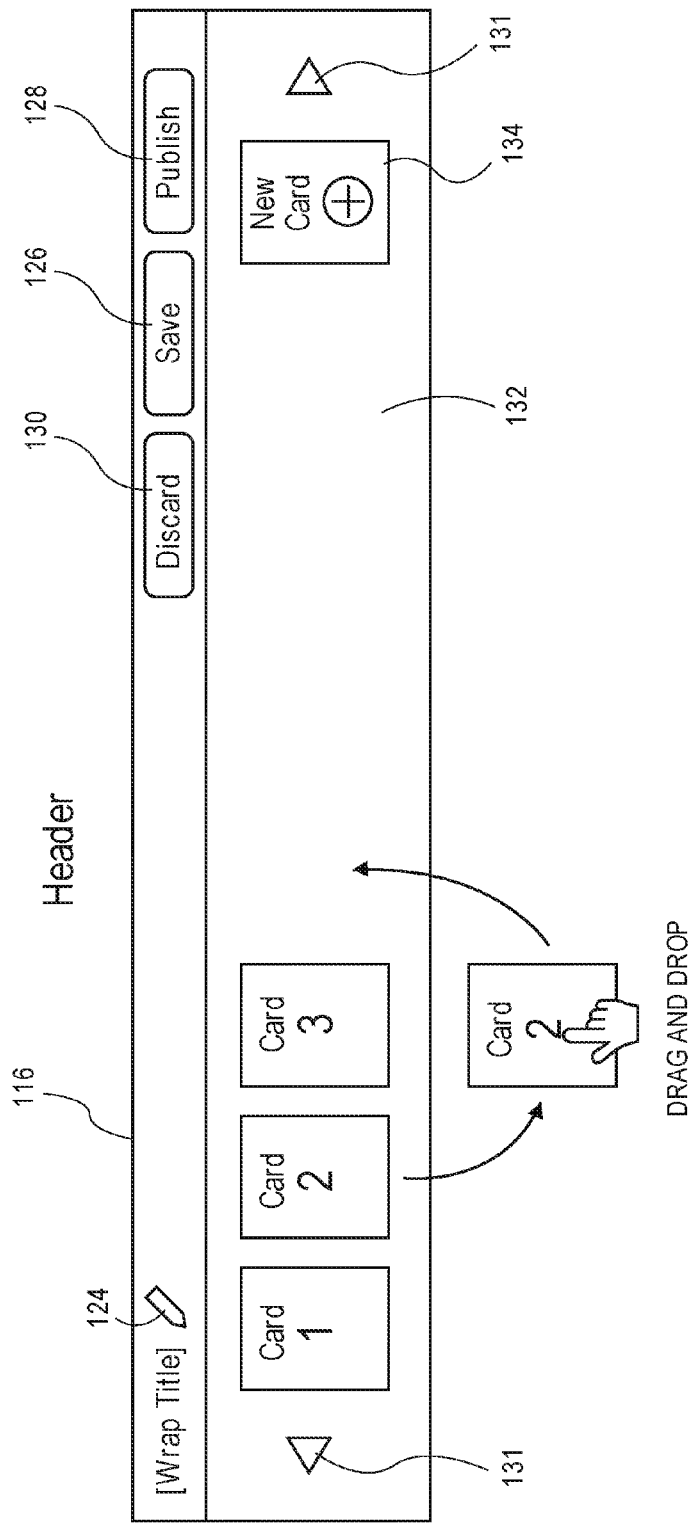
Figure 10C:
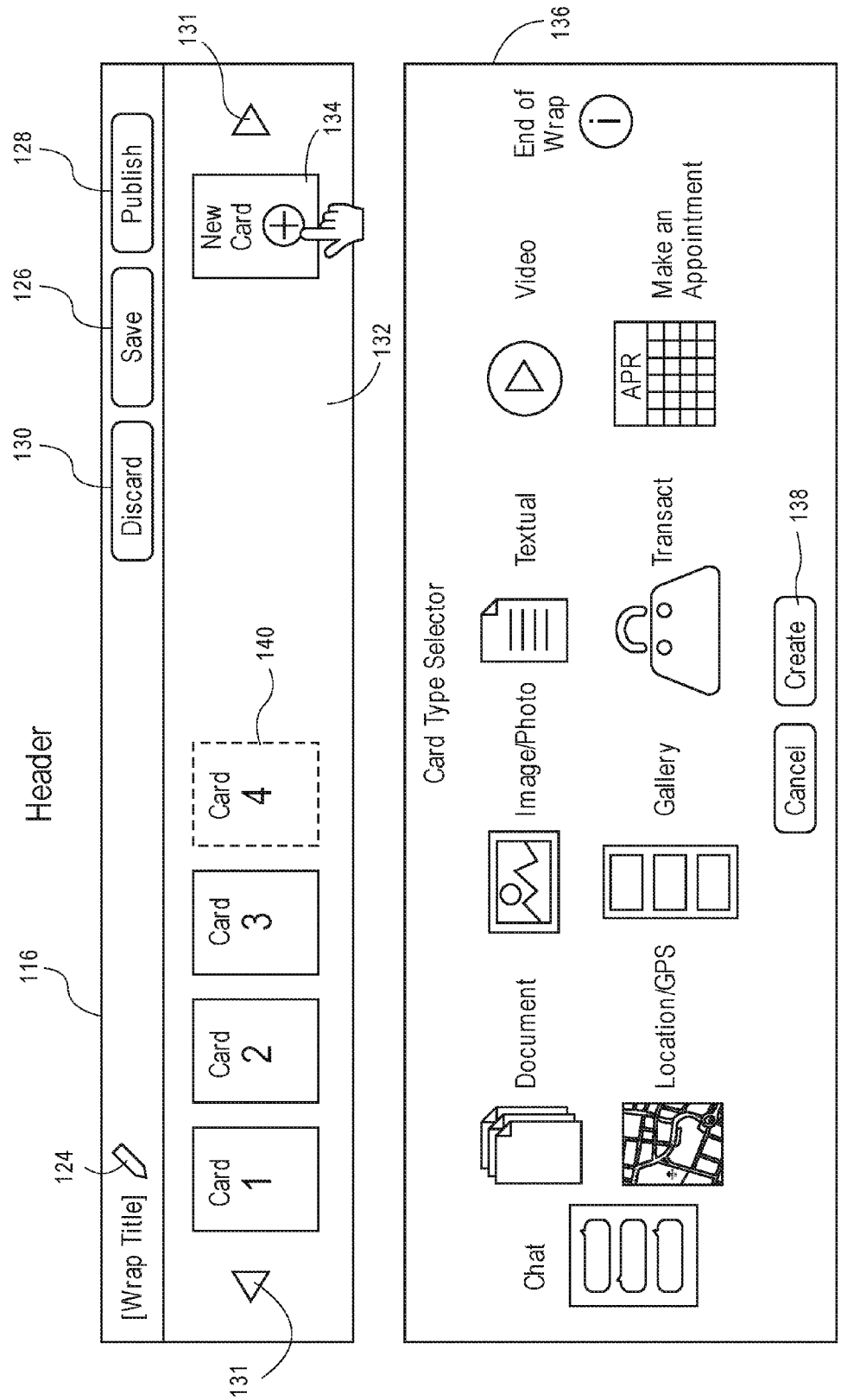

Referring to FIGS. 10A through 10C, features of the header field 116 of the workspace 114 are illustrated.

As shown in FIG. 10A, the header field includes the previously defined title of the wrap package 10, a title editing tool 124 for revising or changing the title of the wrap package, a save tool 126, a publish tool 128, and a discard tool 130. The tools 126, 128 and 130 are respectively used for saving, publishing and discarding cards 14 of the wrap package 10 as they are authored.

The header field 116 also includes a card sequencing space 132. Within this space 132, the author can arrange the cards and define the one or more linear sequences in which the cards are to be rendered when the wrap package is consumed.

As the individual cards of the wrap package are authored, they are added to the sequencing space 132 in the numerical order (e.g., 1, 2, 3, 4, etc.) in which they are created. In the event the author 34 wishes to re-order the sequence, one of several operations may be used.

As shown in FIG. 10B, an exemplary re-sequencing operation is illustrated. In this particular example, Card 2 is moved after Card 3 using a drag and drop operation. When the operation is complete, the cards are renumbered to reflect their new sequence order. In another embodiment (not illustrated), cards can be copied and pasted. In yet other embodiments, cards can be moved or re-sequenced using any technique.

By moving the various cards to different positions within the space 132, the horizontal sequence of the cards can be arranged in any order as determined by the author 34. In addition, one or more of the cards can also be configured as a gallery card(s), which are navigable in the vertical direction. Thus, by defining (a) any gallery cards in the horizontal sequence in space 132 and (b) the horizontal order of the cards, including any gallery cards, in space 132, the horizontal and/or vertical sequence for rendering the cards when the wrap package is consumed is defined by the author 34.

The header 116 also includes left and right scrolling icons 131. When either the left or right scrolling icon 131 is selected, the cards appearing in the card sequencing space 132 scroll in either the left or right direction respectively. By providing the scrolling icons 131, all of the cards of the wrap package can be viewed, even in situations where the number of cards in the wrap package are too numerous to all conveniently display in the sequence space 132 at the same time. The scrolling icons 131 thus allow the author 34 to navigate, view and edit all of the cards of the wrap package.

As illustrated in FIG. 10C, the header 116 also includes a "New Card" tool 134. When the author selects this tool, two actions occur. First, a new card 140 is created in space 132. Implicitly, the new card 140 appears next in the horizontal sequence order in space 132. However, as noted above, the sequence order of the card can be changed by the author 34 if desired. Second, a new card type selector tool 136, which lists a number of different possible card types, appears. In a non-exhaustive list, the types of cards that are provided within the card type selector tool 136, include, but not limited to, a textual card, an image/photo card, a video card, a gallery card, a document card, a chat card, a transact card, an appointment card, and an end of wrap card. By selecting any one of these card types, and then the create icon 138, the new card 140 is defined as the selected type.

In this particular example, the new card 140 appears as card 4 in the sequence order. A number of examples are provided below illustrating the authoring of the new card 140 for each of the card types listed above.

Referring to FIG. 11A through 11D, the authoring of an exemplary textual card 140 is illustrated.

Figure 11A:
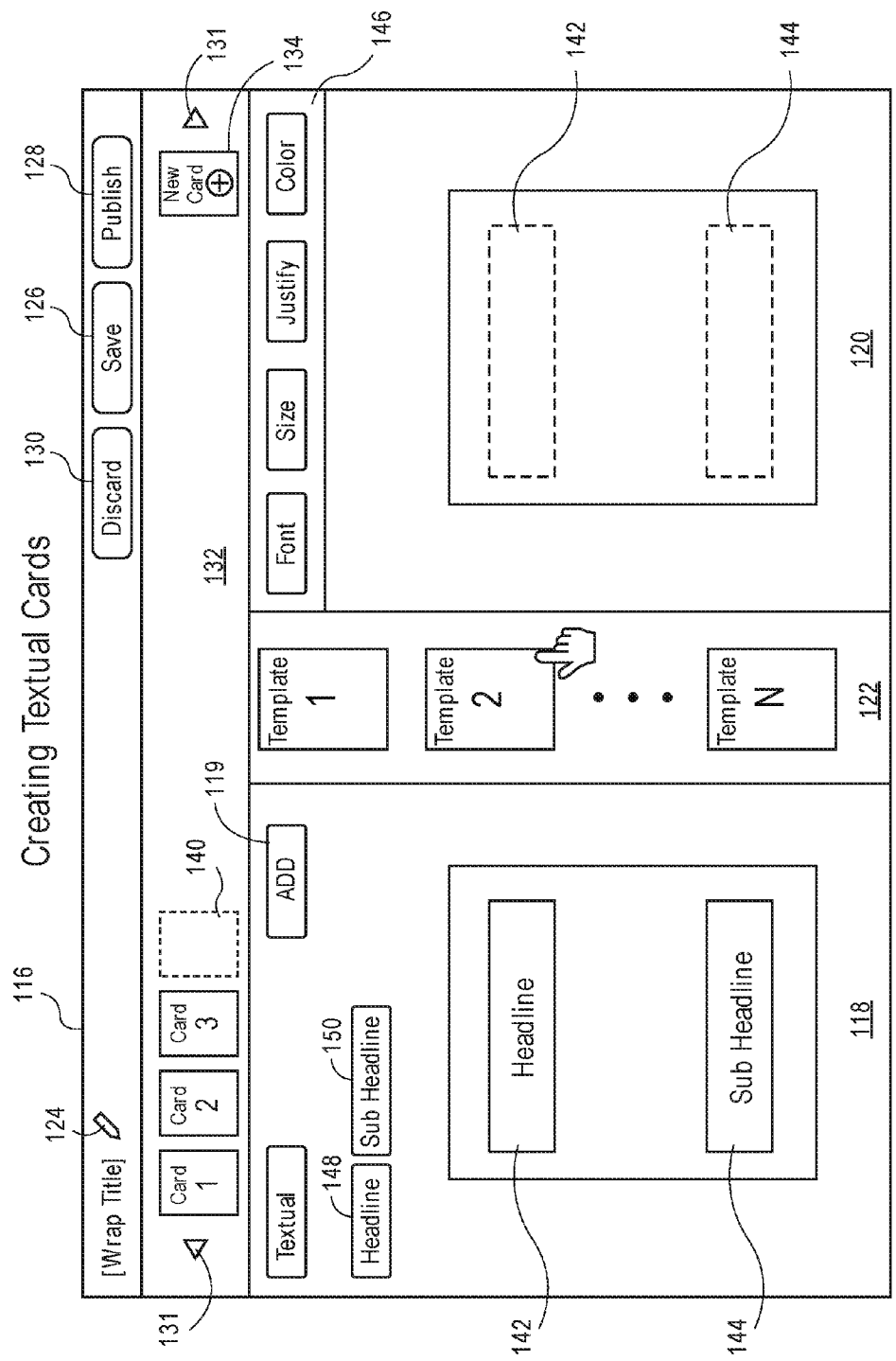
FIGS. 11A through 11C illustrates the authoring of a textual card using the authoring tool of the present invention.

As shown in FIG. 11A, a number of textual card templates are provided in the layout selector space 122. Each of the templates is labeled Template 1, Template 2, through Template N. Each of the various templates includes a different structure and layout. For example, each may include different arrangement of predefined headlines, sub-headlines, and/or components. In this particular example, Template 2 is selected, resulting in a card having the same structure and layout as the selected template appearing in the authoring space 118 and preview and configure space 120. In this particular example, the selected template includes a headline 142 and a sub-headline 144.

Figure 11B:
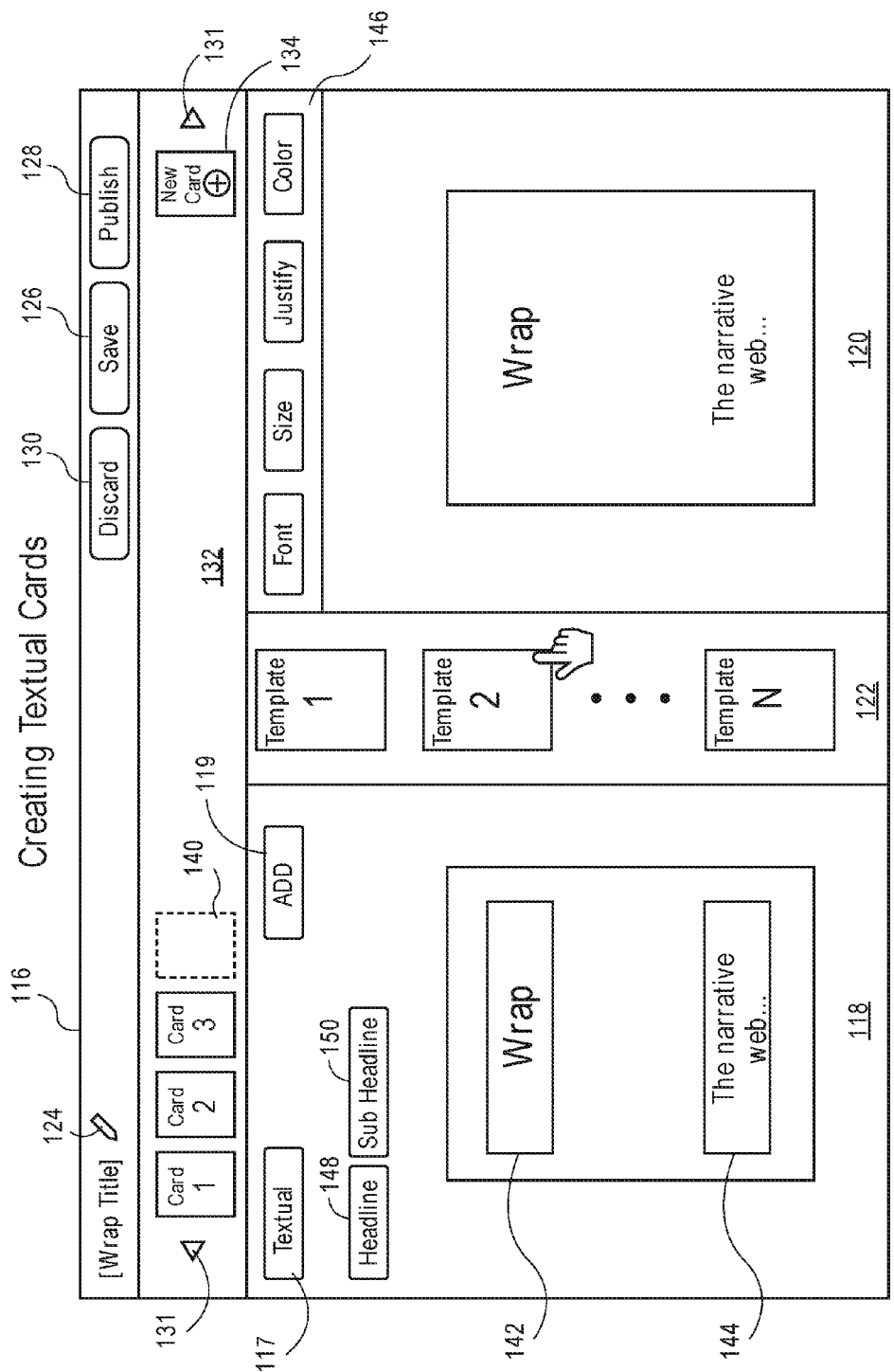

As illustrated in FIG. 11B, the author 34 types text into the headline 142 and the sub-headline 144 within the authoring space 118. As the text is typed, it appears in the corresponding headline 142 and sub-headline 144 of the card appearing in the space 120. In this particular example, the author has typed "Wrap" into the headline component 142 and "The narrative web . . . " into the sub-component 144. Since this card includes text components, a set of style tools 146 are provided to enable the author to configure the font, size, justification and color of the text contained in the components 142 and 144 respectively. It should be understood, however, that the style tools 146 may optionally not be provided for cards that do not contain text. The style tools 146 are, therefore, not necessarily constrained to all the different card types.

Additional tools, provided in the authoring space 118, enable the author to further modify the selected card template if desired. For example, a headline tool 148 enables the author to modify the card template with another header and sub-headline tool 158 enables the author to create another sub-heading. When either is selected, a text box appears in the image of the cards appearing in space 118 and space 120. The author can then type into the text box(es), similar to that described above. In addition, the text box(es) can be positioned or moved in the image of the card appearing in space 120 to any location desired by the author and the style tools 146 can be used to define the style of the entered text.

Figure 11C:
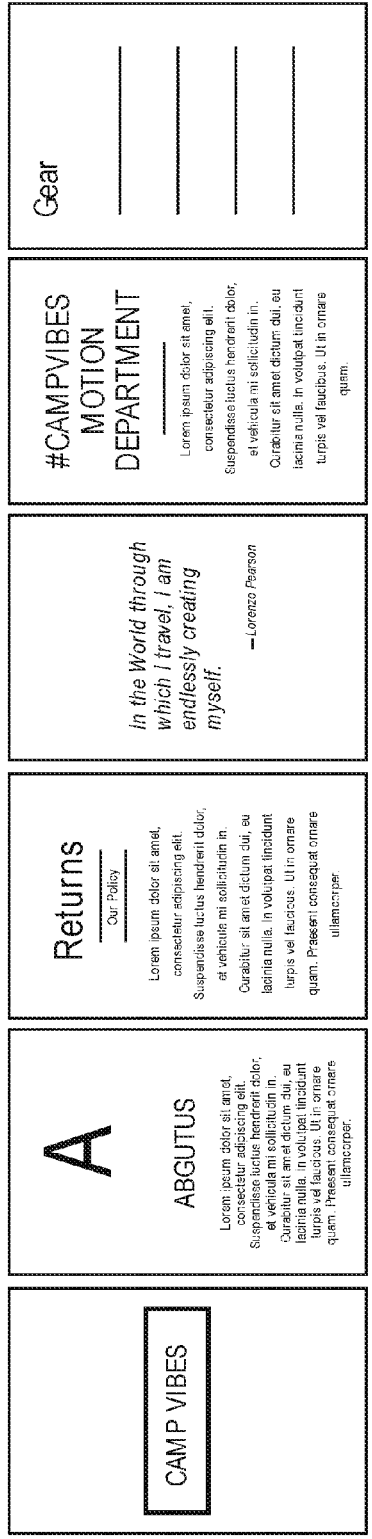

Referring to FIG. 11C, a number of exemplary textual cards are illustrated. In each instance, a different card, each derived from a template with different layouts, structures, headers and/or sub-components, is illustrated. Also in each case, the style tools 146 are available to the author to define the different fonts, sizes, justification and potentially color (not visible) of the text in each of the cards. It should be noted that these examples are not exhaustive. Various templates of different structures, layouts and/or arrangements of components can be used to create an almost infinite number of textual card styles.

Figure 12A:
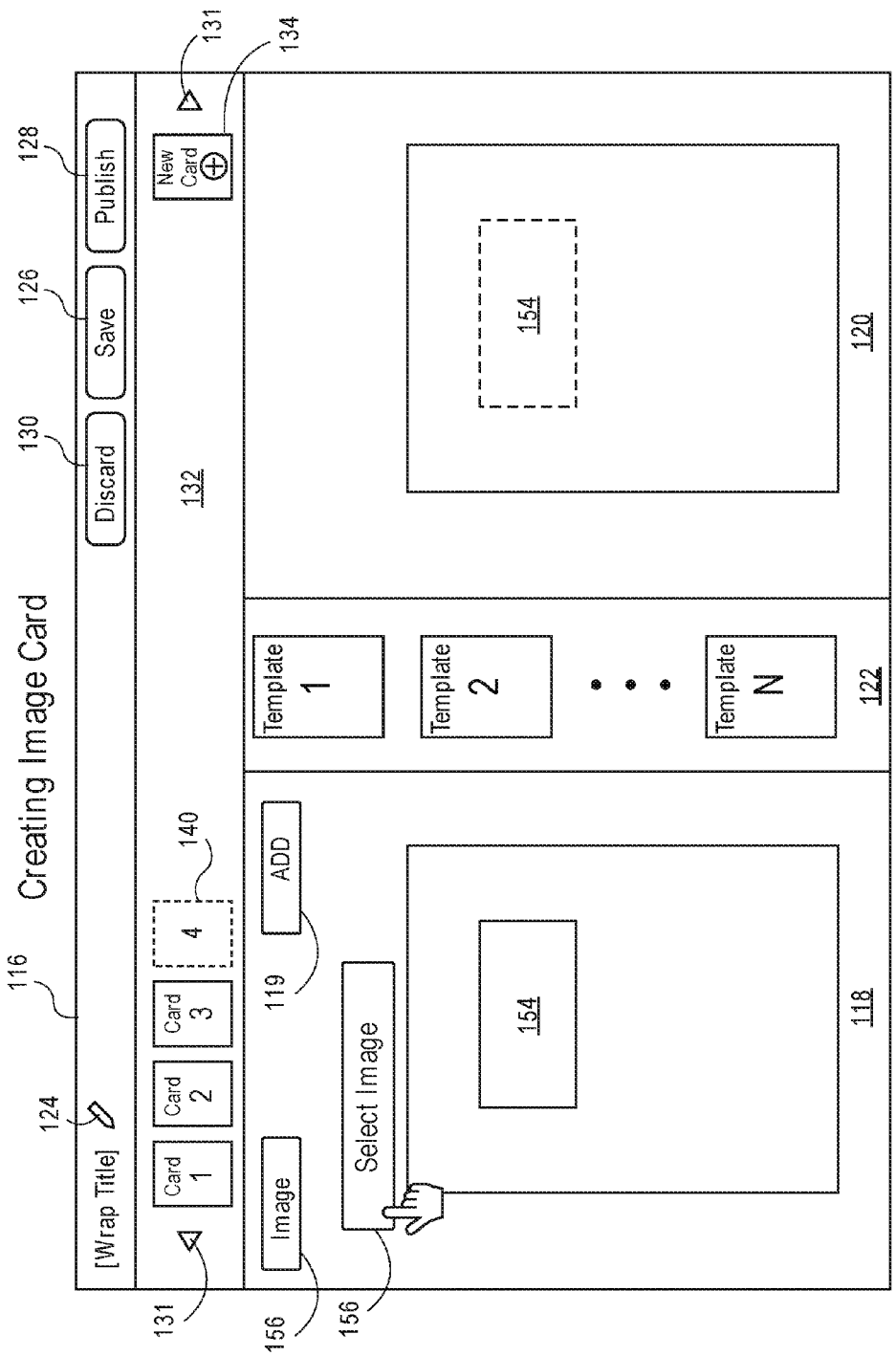
FIGS. 12A through 12C illustrate the authoring of an image card using the authoring tool of the present invention.
Figure 12B:
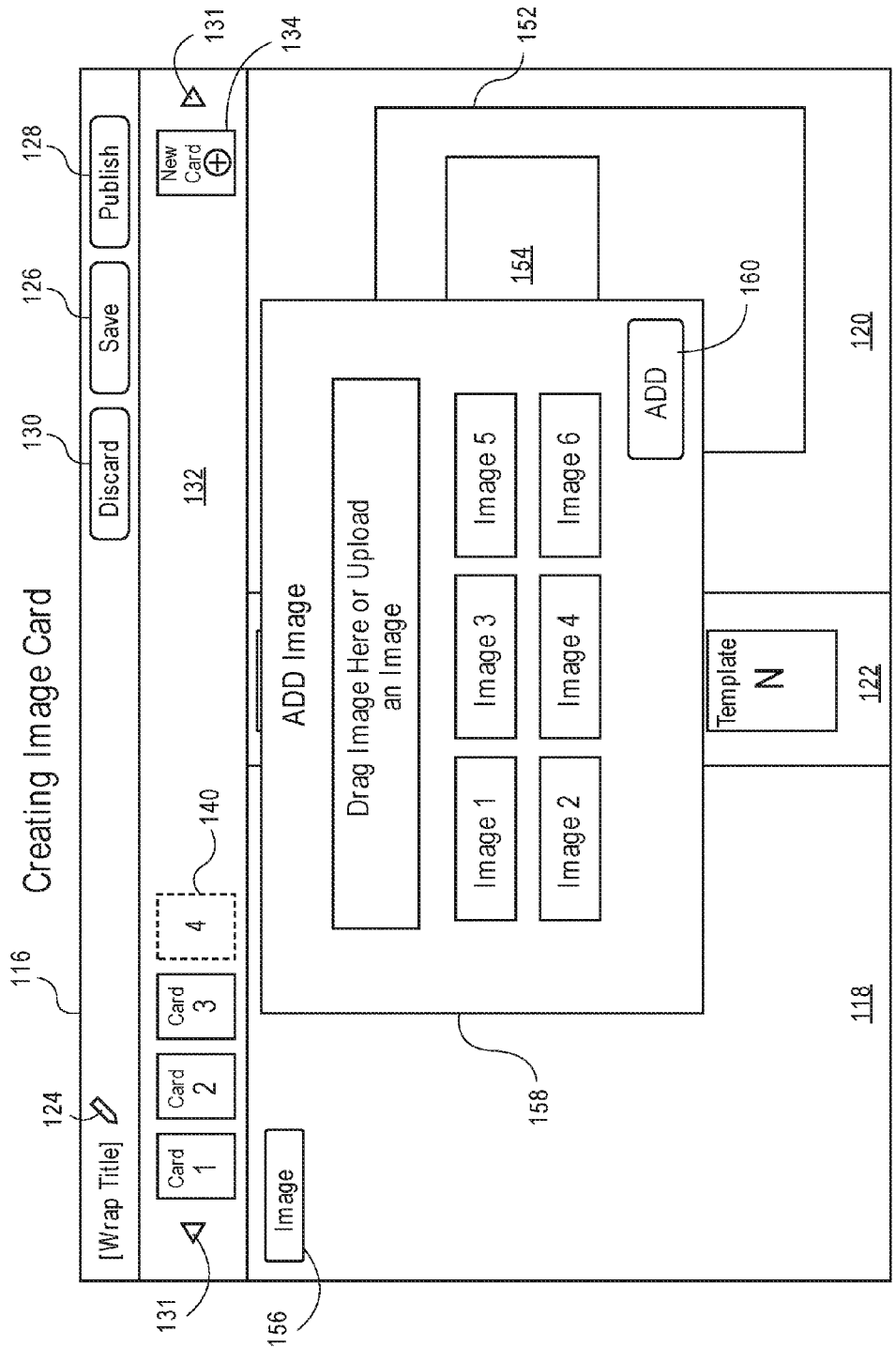
Figure 12C:
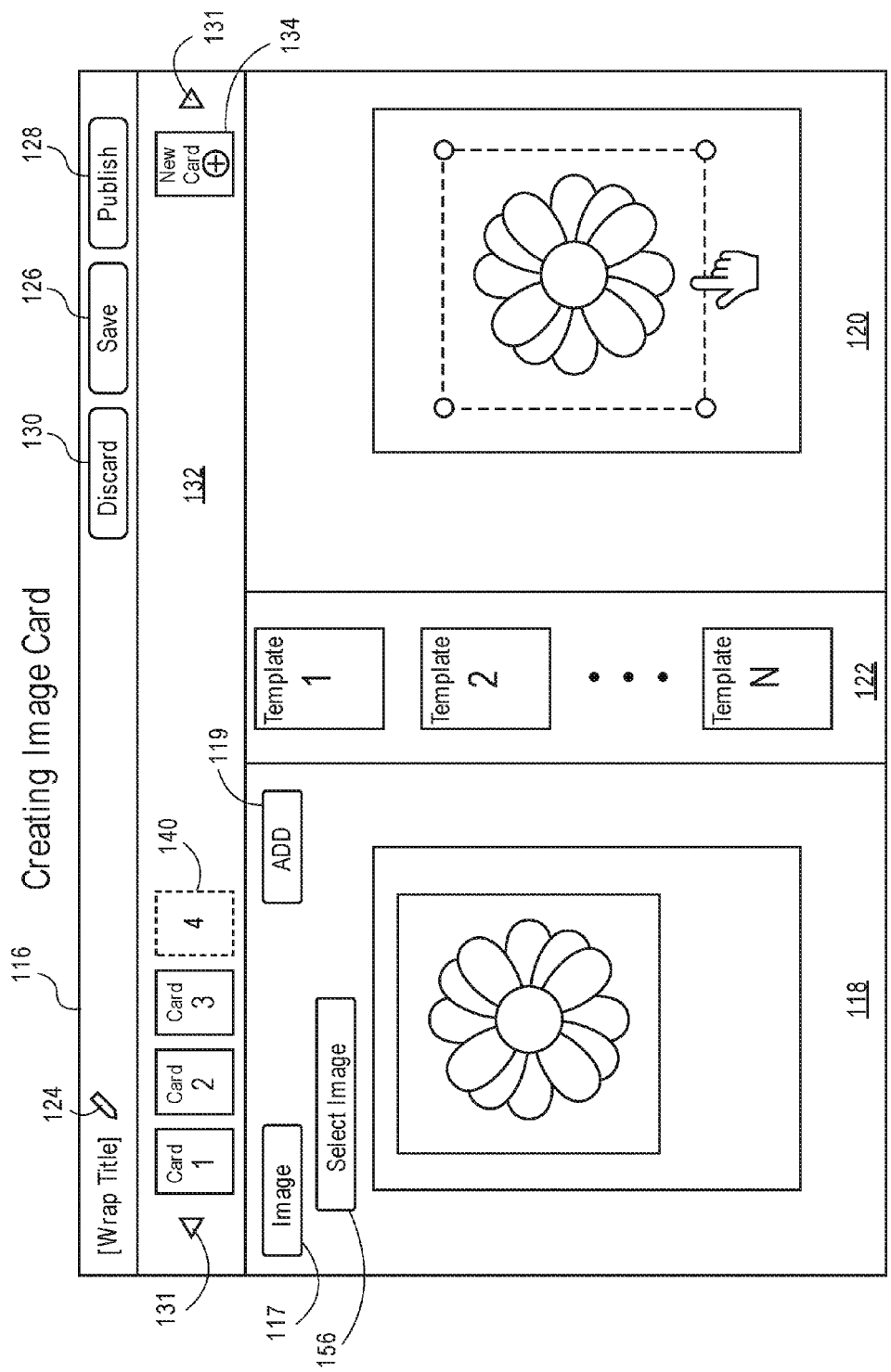

Referring to FIGS. 12A through 12C, a series of diagrams showing how the new card 140 is configured as an image card is illustrated.

As illustrated in FIG. 12A, in this particular example, the author selects a particular image template from space 122. In response, a card corresponding to the selected template with an image container 154 appears in spaces 118 and 120 respectively. To define the image to include in the image container 154, the author selects the select image icon 156.

As illustrated in FIG. 12B, an "Add Image" box 158 appears in response to the selection of the select image icon 156. Within the box 158, the author may selectively either (i) drag and drop or otherwise select an image or photo from an existing library (i.e., image 1, image 2, image 3, etc.), upload and image, or provide a URL or other identifier for accessing the image from a remote location when the card is rendered when the wrap is consumed. The defined image is then inserted into or associated with the image container when the Add icon 160 is selected.

As illustrated in FIG. 12C, the added image appears in both the card template provided in space 118 and space 120. Furthermore, within space 120, the author 34 may further stylize the image by adjusting its size and/or location within the card, as represented by author manipulating the image box containing the image.

Figure 13A:
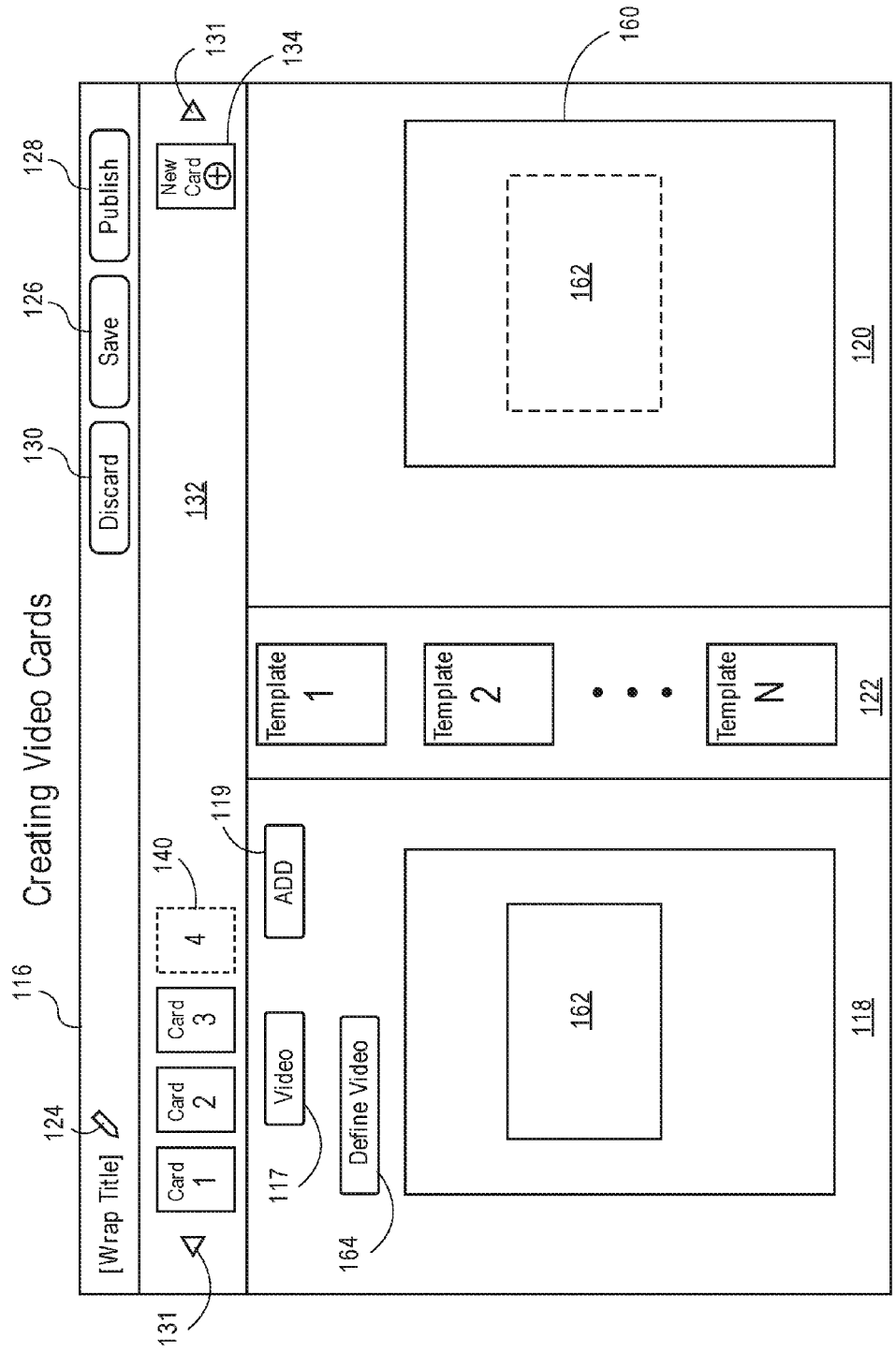
FIGS. 13A through 13B illustrate the authoring of a video card using the authoring tool of the present invention.
Figure 13B:
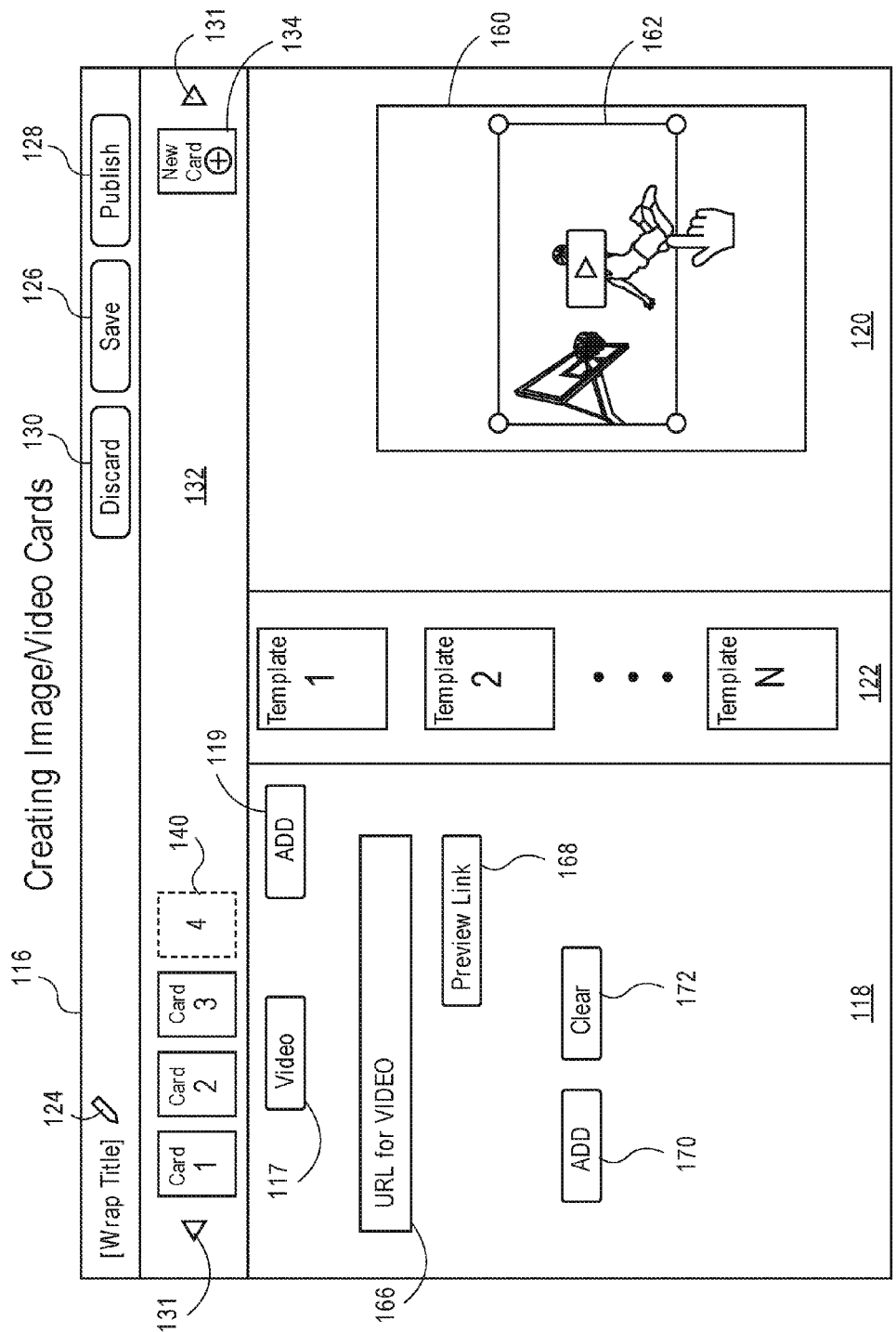

Referring to FIGS. 13A and 13B, diagrams showing how the new card 140 is configured as a video card is illustrated.

As illustrated in FIG. 13A, the author selects a particular video template from space 122. In response, a card corresponding to the selected template, including a video component container 162, appears in the preview and configure space 120. Next, the author 34 selects the icon 164 for defining the video for association with component container 162.

As illustrated in FIG. 13B, a box 166 for inserting a URL or other identifier for a chosen video appears. In addition, a preview icon 168, and add icon 170 and a clear icon 172 also appear. By selecting the preview icon 168, the selected video defined in box 166 can be previewed in the component box 162 of the video card 160 appearing in the space 120. The add icon 170 results in the video being associated with the component container 162, whereas the clear icon 172 will remove the URL. Again, the author may resize and position the video within the card in the space 120 as illustrated.

It should noted that with each of the examples provided above, an add component tool 119 appears in the space 118. The add component tool 119 allows the author to add a new component to a card that was not previously defined by whatever template was used to create the card in the first place. Thus, by using the add component tool 119, the author 34 has the option to add additional text, an image, video or other component beyond what was originally defined in the starting template, as described in more detail below.

Figure 14A:
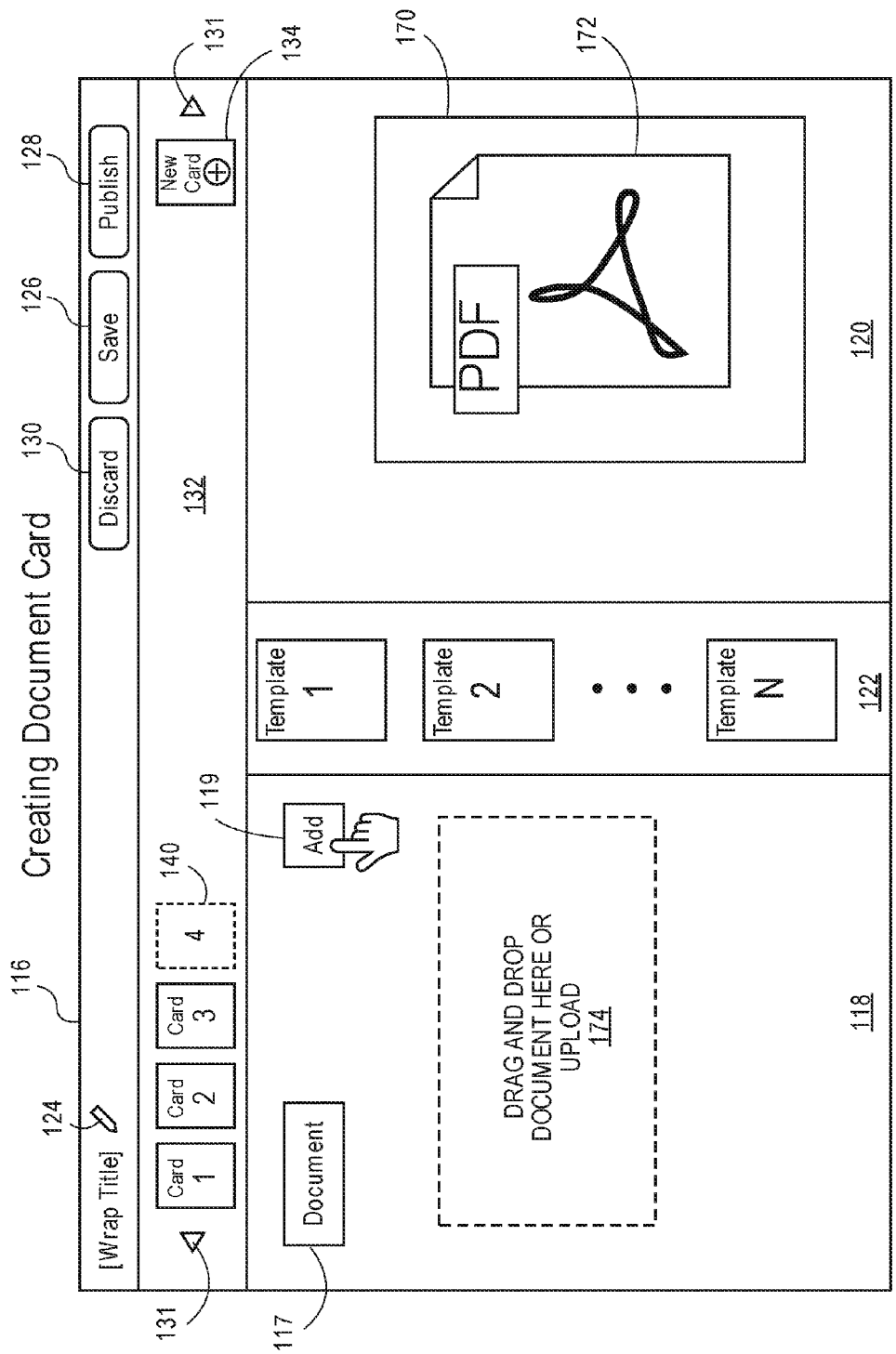
FIGS. 14A through 14C illustrate the authoring of a document card using the authoring tool of the present invention.
Figure 14B:
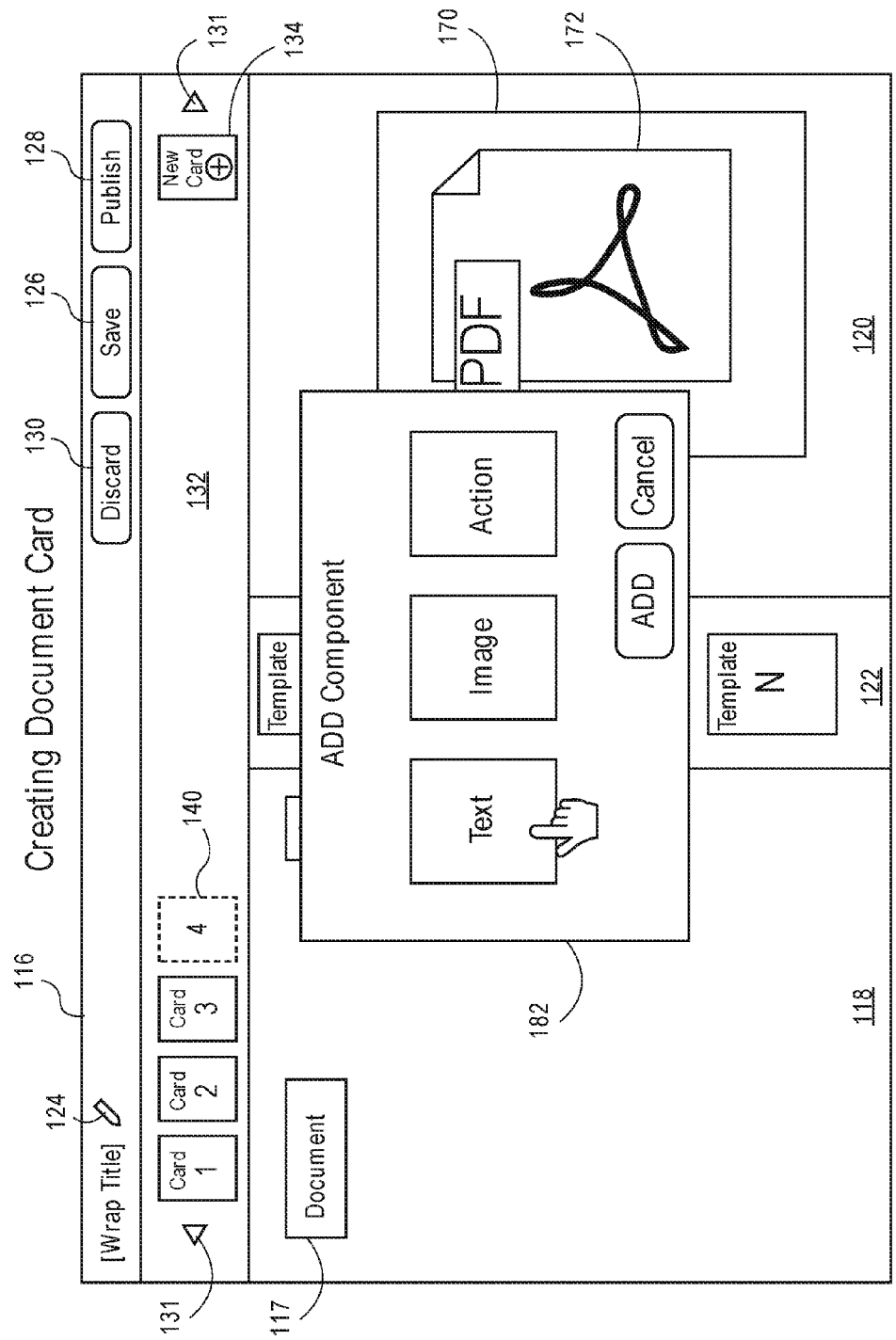
Figure 14C:
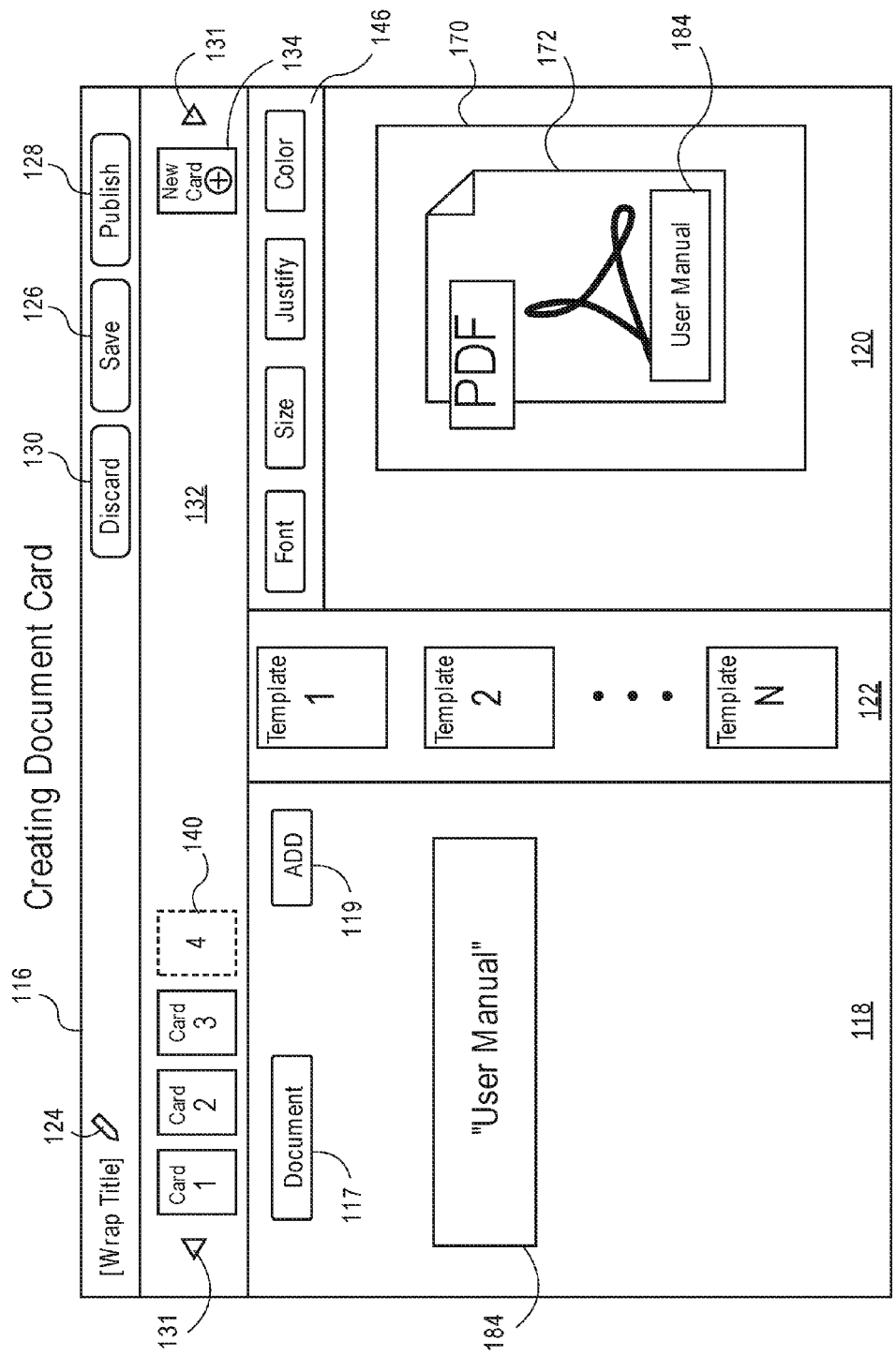

Referring to FIGS. 14A through 14C, a series of diagrams showing how the new card 140 can be configured as a document card is illustrated.

As illustrated in FIG. 14A, the author selects a particular document template from space 122. In response, a card 170 corresponding to the selected template, including a document component container 172, appears in the space 120. By selecting the document icon 174, and either dragging and dropping or uploading the document, the author can define the document for insertion into the component container 172. In the particular example shown, the author has selected a PDF document, which appears within the component box 172 of the document card 170.

The author may also elect to add an additional component to the document card 170, for example, a descriptor or title for the uploaded PDF file. To do so, the author selects the Add tool 119, as also illustrated in FIG. 14A.

As illustrated in FIG. 14B, an add component window 182 appears in response to the selection of the Add component tool 119. Within the component box 182, the author may select text, image or some other action component. In this particular example, the author selects the text component.

As illustrated in FIG. 14C, a text container 184 in the authoring space 118 and a text container 184 appearing within the card 170 in the space 120 appear in response to the selection of the text option in box 182. By typing into text box 184 (e.g., "User Manual", the corresponding text appears in the text container 184 of the card 170. Again, the author may adjust the style of the card 170 by resizing and positioning both the PDF document and/or the text container in space 120. Also, the author may change the font, size, justification and color of the text using style tools 146.

In various embodiments, behaviors or tools may also be inherently provided within document templates that enable or facilitate navigation of any inserted document within a card. For example, for PDF, Word or PowerPoint documents, scrolling bars, pointers, or a page flipping behavior may be embedded in the card templates so that a view of the wrap package can flip from page to page within the document when the card is consumed.

Figure 15A:
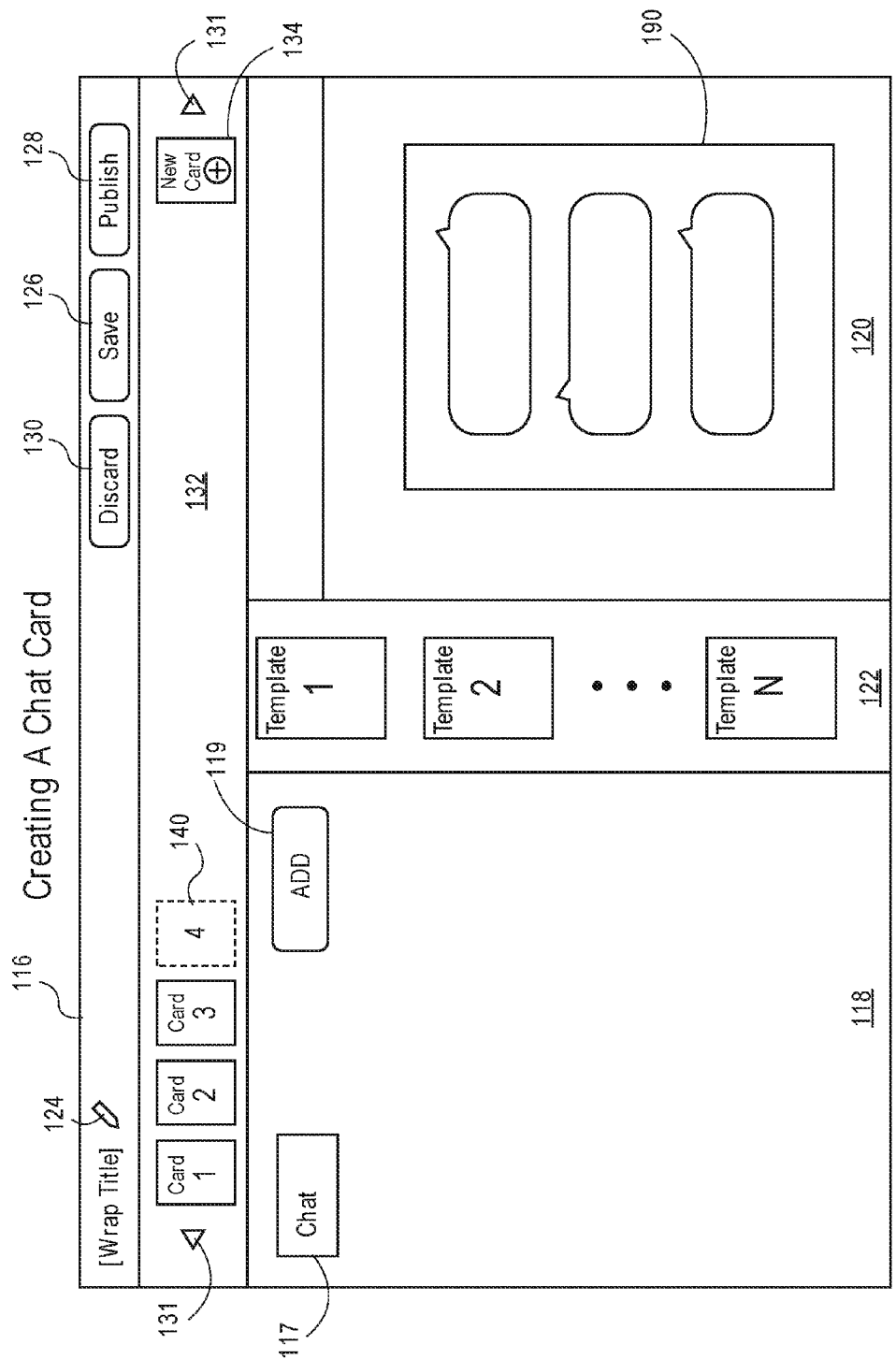
FIGS. 15A through 15C illustrate the authoring of a chat card using the authoring tool of the present invention.
Figure 15B:
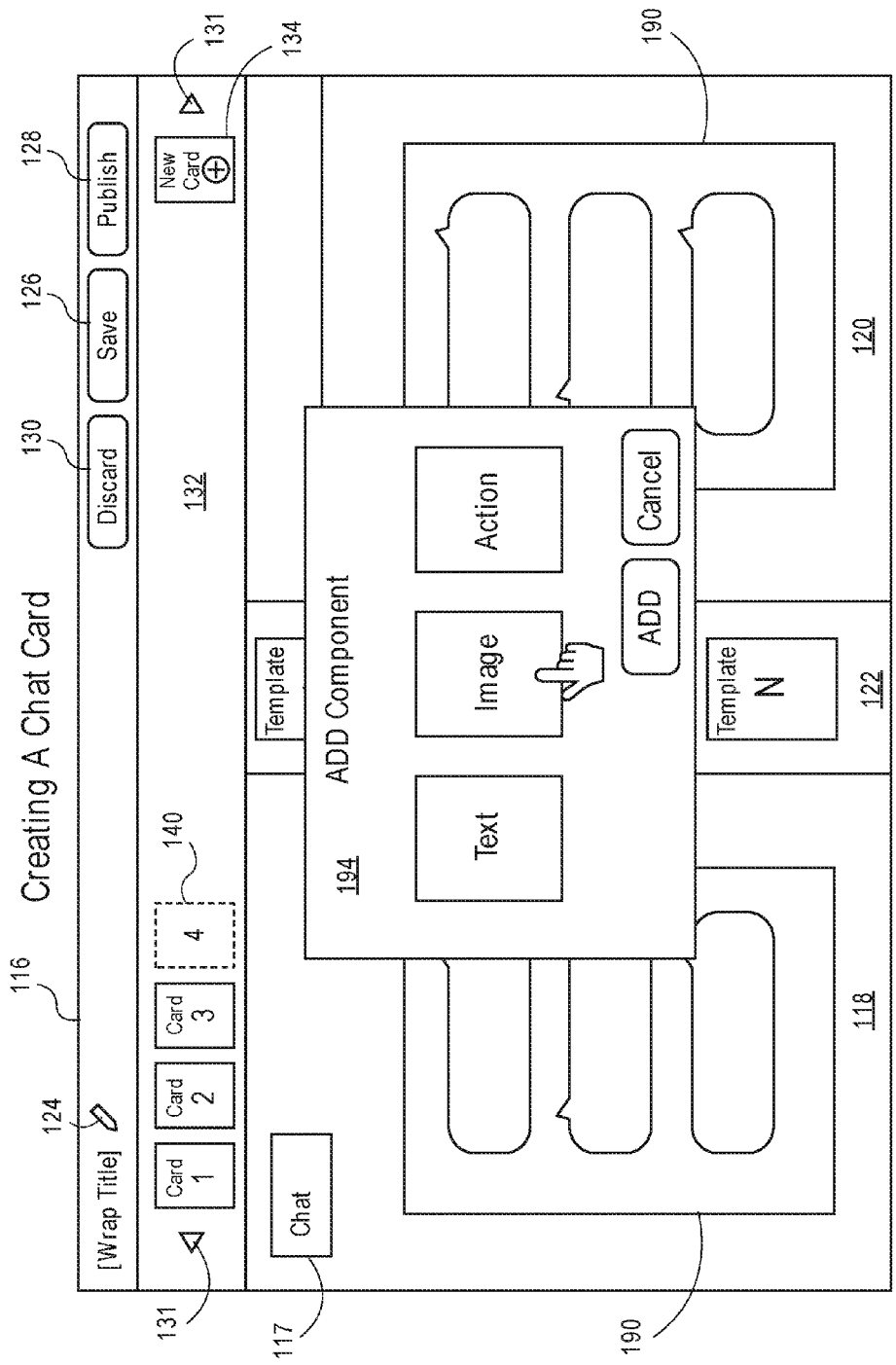
Figure 15C:
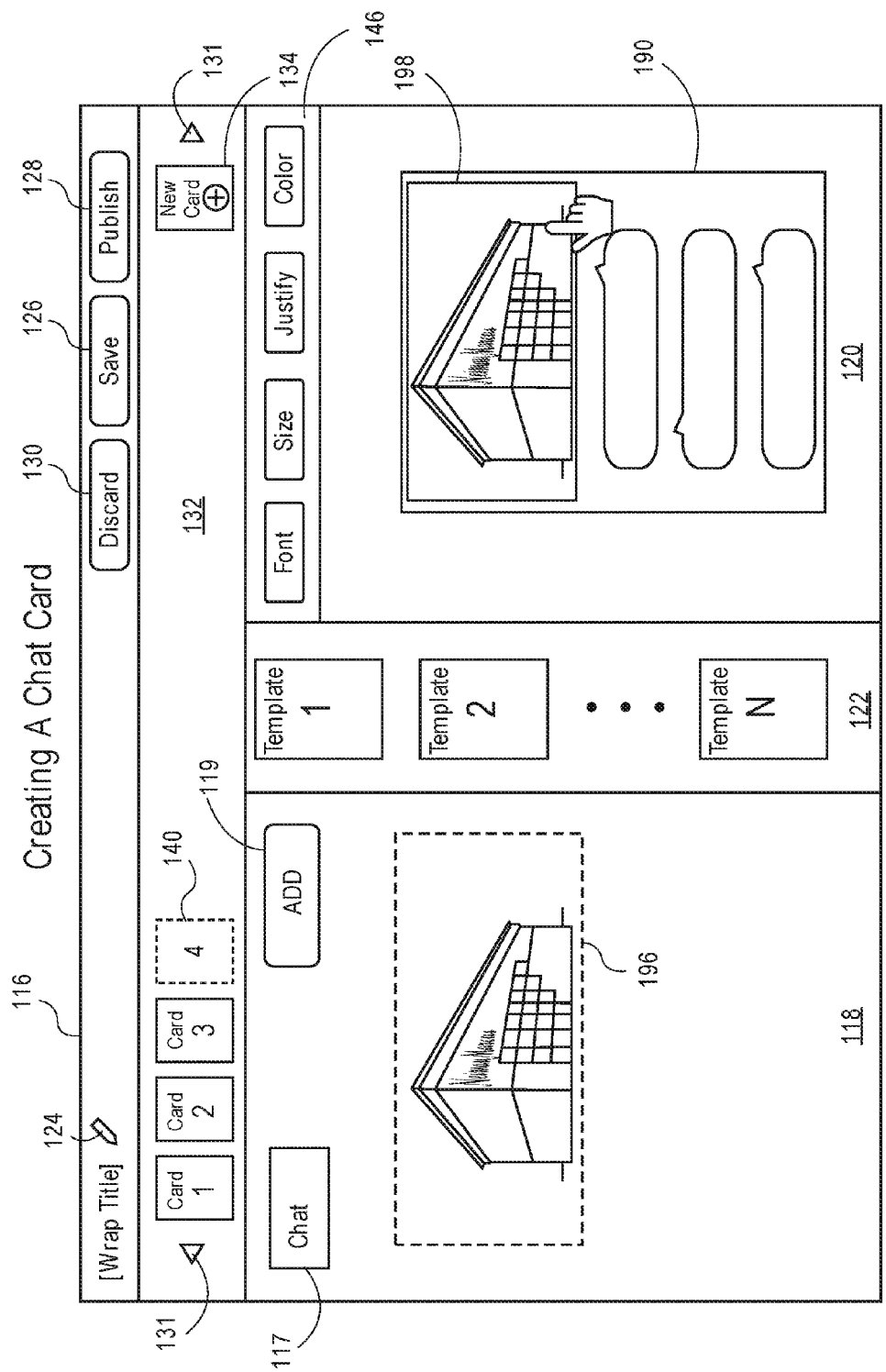

Referring to FIGS. 15A through 15C, a series of diagrams illustrating how new card 140 is configured as a chat card is illustrated.

As illustrated in FIG. 15A, the author selects a particular chat template from space 122. In response, a chat card 190, corresponding to the chat template, appears in the preview and configure space 120. The card 190 includes a chat function that enables a chat session to take place between a consumer of the wrap package and a remote person when the card 190 is rendered. The chat functionality of card 190 can be implemented in a number of different ways. For example, the chat function can be embedded as a widget that appears in an iframe within the card 190. When the viewer interacts with the widget, a chat server is accessed, and the viewer may engage in a chat session with another party via the chat server. In another embodiment, the chat may be implemented using a cul-de-sac method. In other words when the viewer is consuming card 190 and would like to engage in a chat, the viewer is taken to another web page or location to engage in the chat. When done, the viewer is returned to page 190. In yet another embodiment, the chat functionality can be built into as a component of the card 190. For example, the chat card 190 may include feed functionality as described herein. Thus, when the viewer would like to engage in a chat, a session is established between the card 190 and a chat server, enabling the chat to take place as described above.

As illustrated in FIG. 15B, the author may also elect to add an addition component to the chat card 190 by selecting the Add tool 119, which causes the add component box 194 to appear. Within the component box 194, the author may select text, image or some other action component.

As illustrated in FIG. 15C, the author in this example selects the add image component, which results in an image container 196 appearing in the authoring space 118 and a corresponding image box 198 appearing within the card 190 in the space 120. By adding an image into container 196 (e.g., a Neiman Marcus store), the corresponding image appears in the image box 198 of the card 190. Again, the author may resize and position image box 198 within the card 190. In addition, other components may be added in a similar manner. For example, the author 34 may also elect to ad a text component, such as "Chat with an online sales representative" (not illustrated), by selecting the Text option within the add component window 194, similar to that described above.

Referring to FIGS. 16A through 16F, a number of diagrams showing the new card 140 authored as an appointment card for making an appointment is illustrated.

Figure 16A:
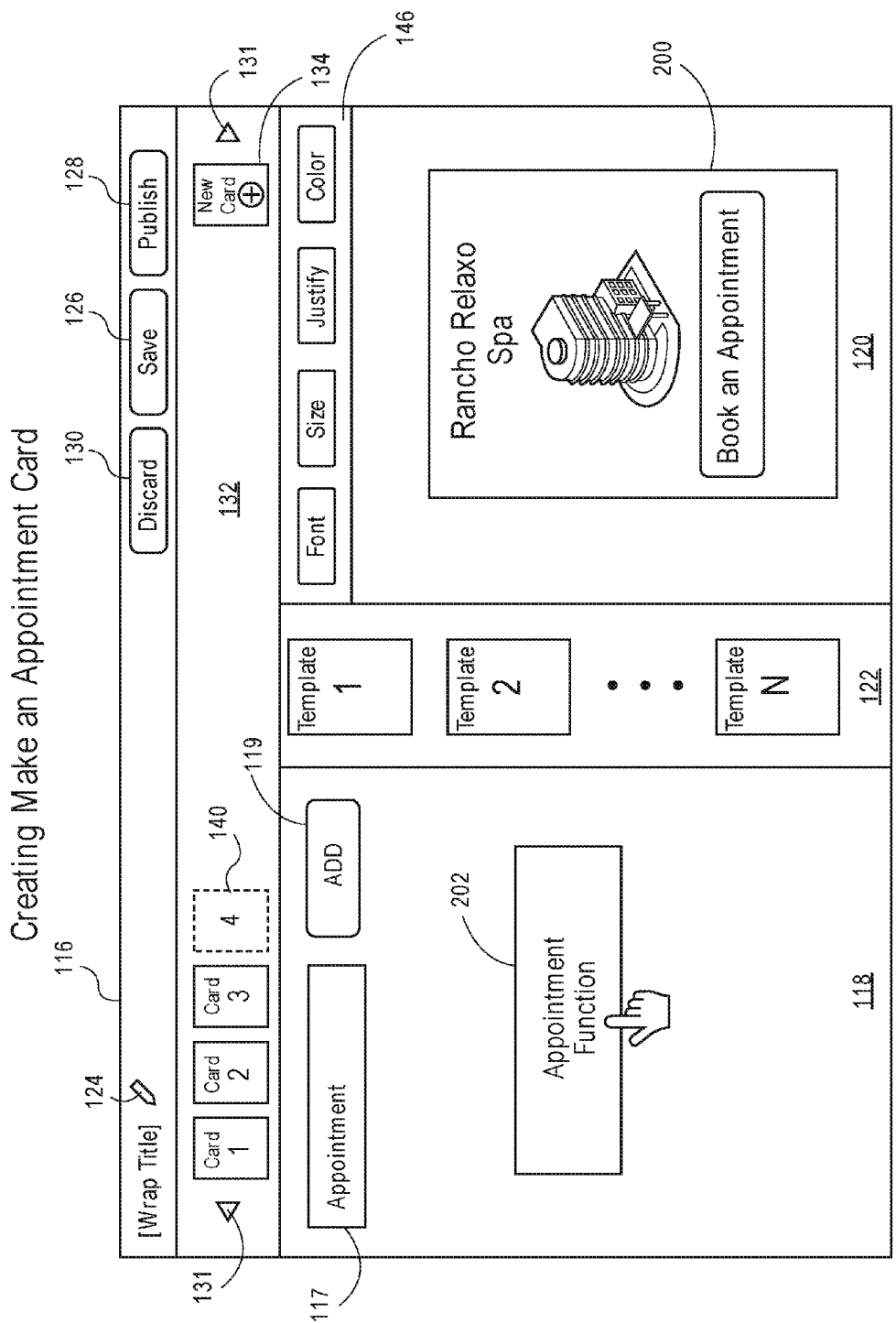
FIGS. 16A through 16F illustrate the authoring of an appointment card in accordance with multiple embodiments using the authoring tool of the present invention.

As illustrated in FIG. 16A, the author selects a particular appointment template with a built-in calendaring function from space 122. In response, an appointment card 220, corresponding to the selected appointment template, appears in the preview and configure space 120. The card 200 as shown has already been authored to include text (i.e., "Rancho Relaxo Spa"), and image, and a "Book and Appointment" button using the Add tool 119, as described above.

The card 200 may implement the appointment booking/reservation function in a number of ways. For example, the function can be implemented via a widget embedded in the card and that allows interaction with a remote reservation/booking server.

Figure 16B:
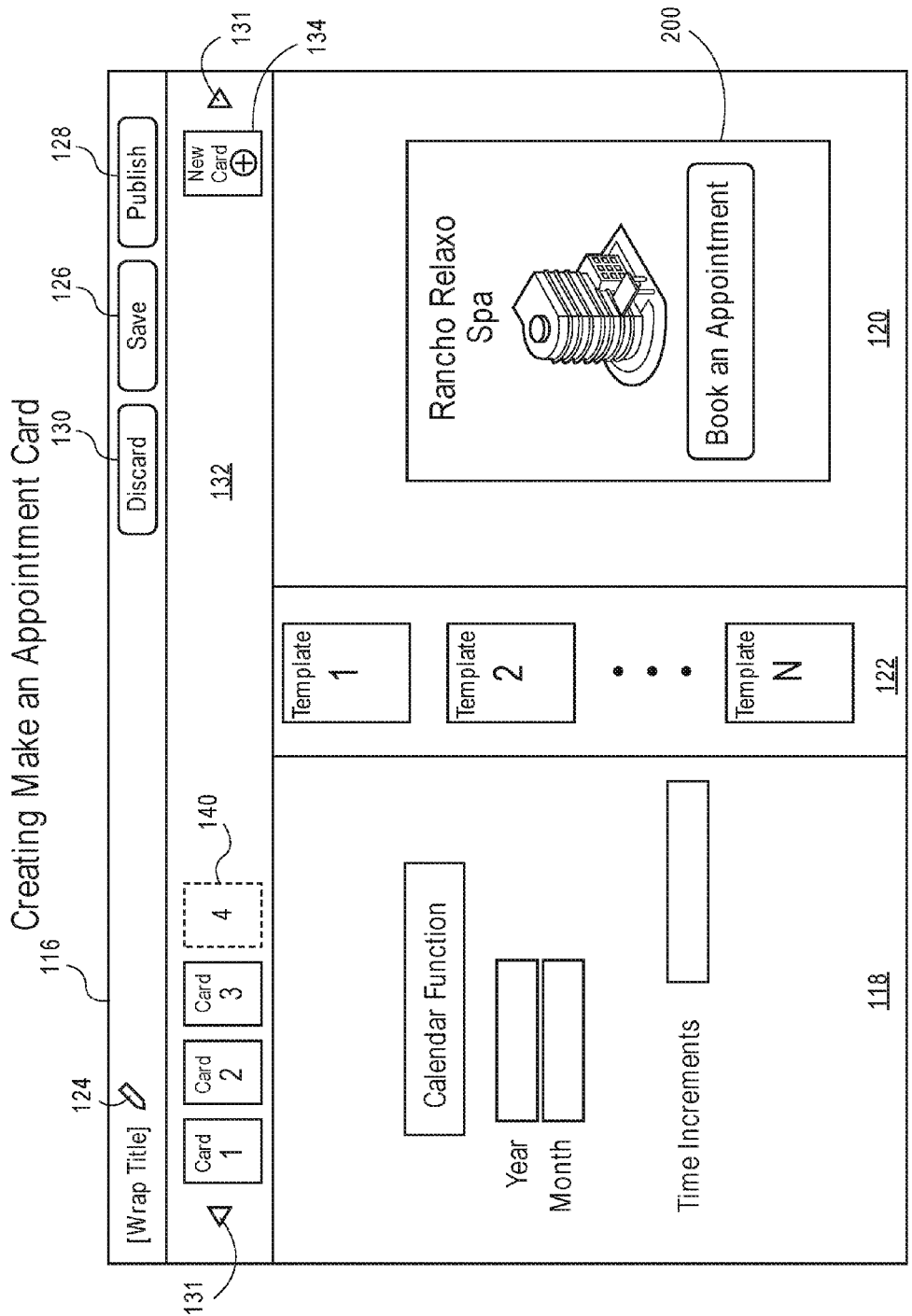

In accordance with one embodiment as illustrated in FIG. 16B, a number of calendar related icons appear in the authoring area 118 when the appointment function 202 is selected. In this example, the author can specify the year, month and time increments for receiving appointment requests from a consumer of the wrap package. In response, the selected parameters are set into the appointment function of the card 200. In this latter embodiment, a session is established between the wrap package and the remote reservation or booking database when the card 200 is being consumed. During the session, state information is exchanged, meaning the remote database provides the wrap package with appropriate feed information, such as booked and/or available time-slots for reservations. In response, the feed information is presented within the card 200, allowing the viewer of the wrap to book an available time-slot. In this embodiment, the card 200 captures the required information, such as the date and time specified by the viewer, along with optionally user information (name, contact information, credit card, etc.), and provides it to the remote database for reserving the requested time slot.

Figure 16C:
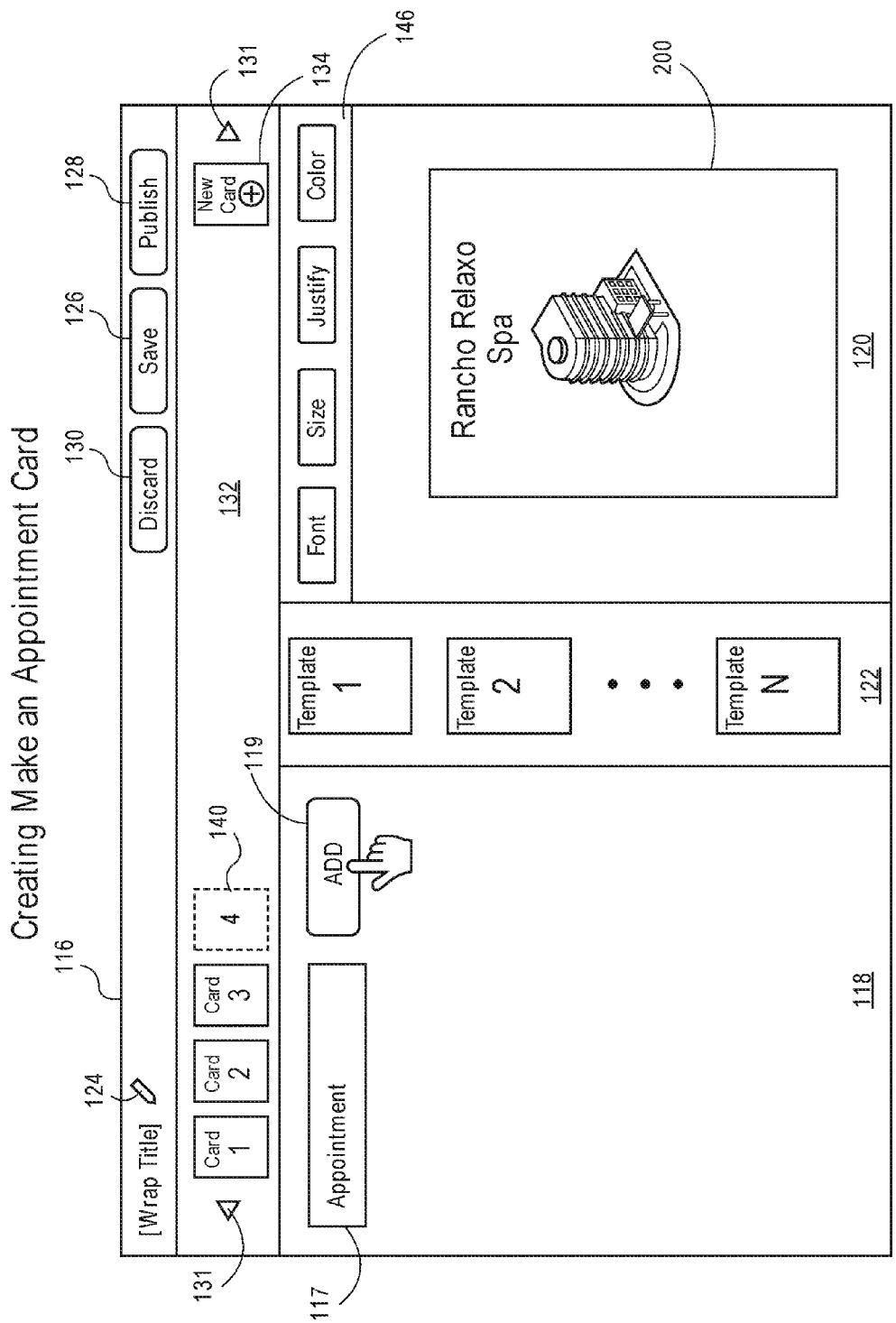
Figure 16D:
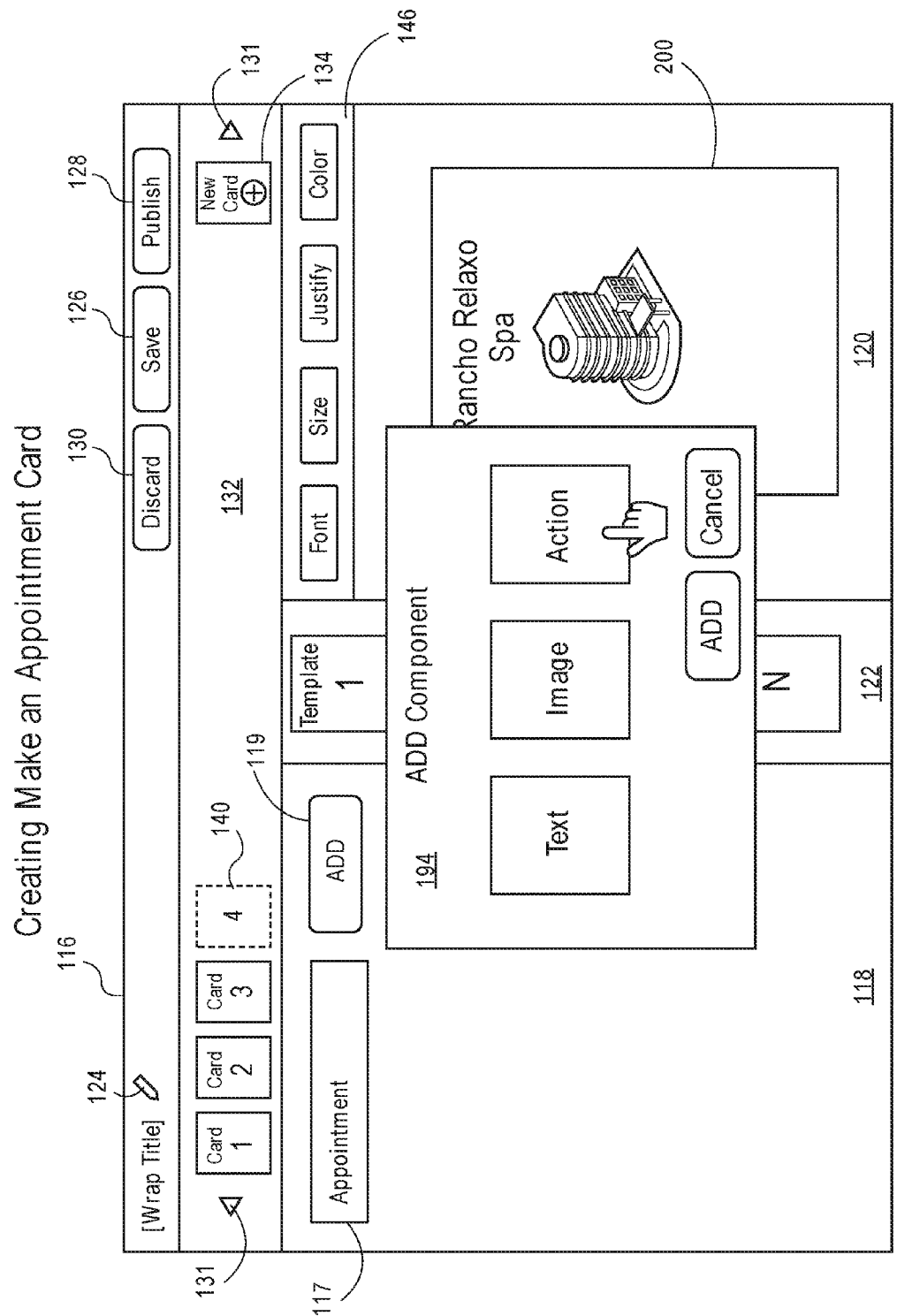
Figure 16E:
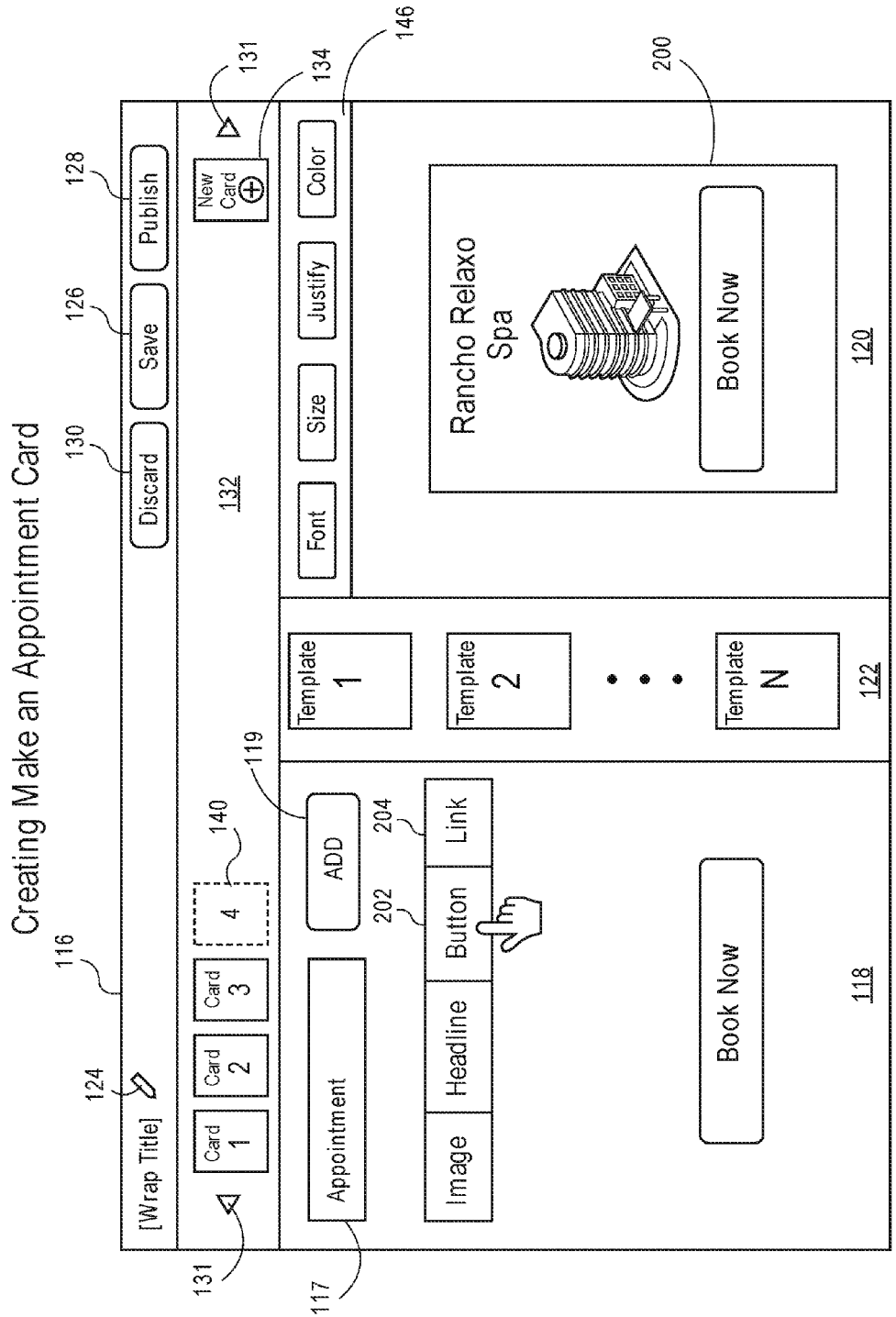
Figure 16F:
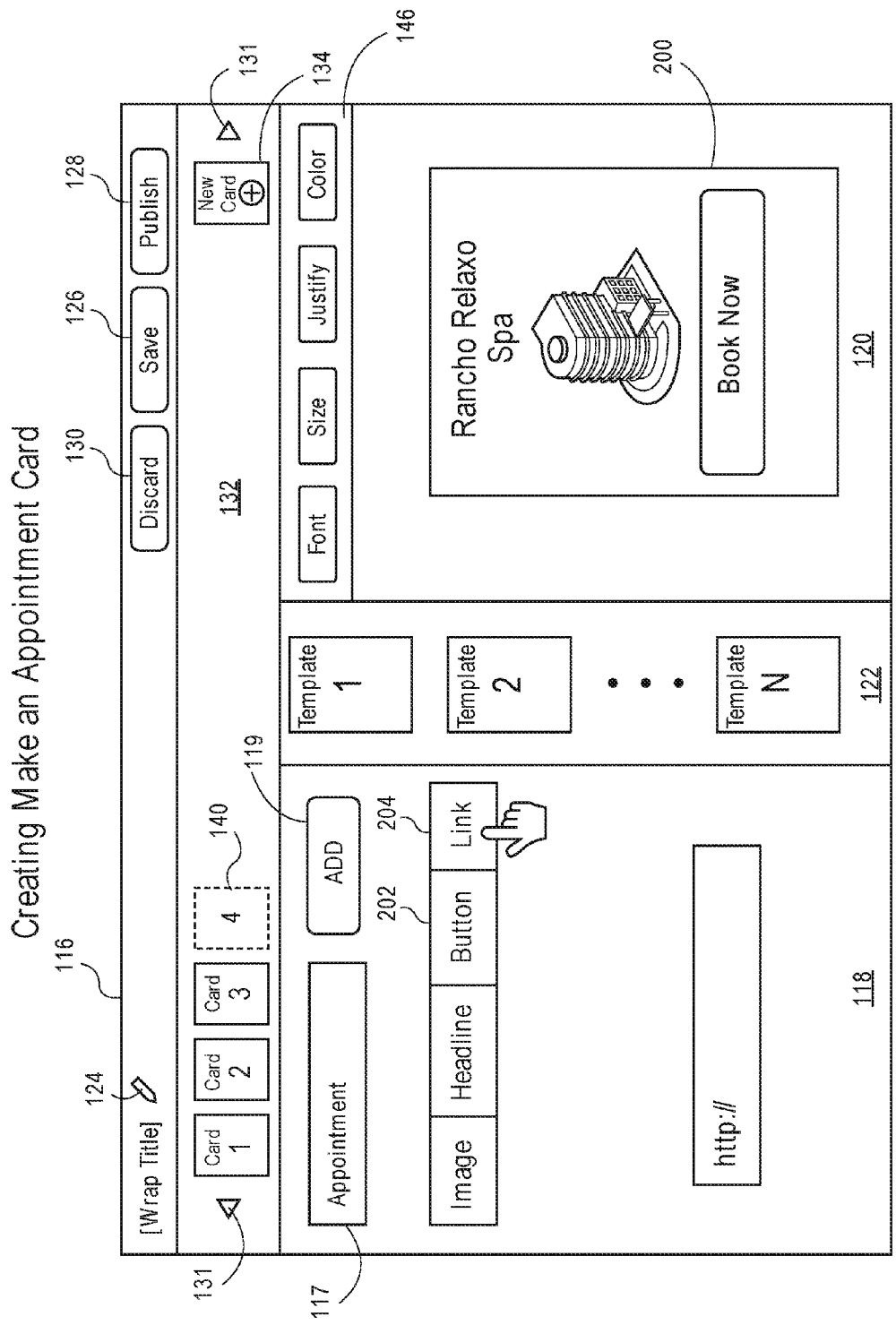

Referring to FIGS. 16C through 16F, an alternative embodiment of authoring the "cul-de-sacing" to a remote reservation-booking location is illustrated. In this example as illustrated in FIG. 16C, the author 34 selects the add component tool 119, which results in the appearance of the add component window 194, as illustrated in FIG. 16D. Next, the author 34 selects the "Action" icon, which results in the appearance of a set of tools in space 118, including a button tool 202 and a link tool 204, as illustrated in FIG. 16E. By selecting the button tool 202, the user can create a "Book Now" trigger within the card 200. By selecting the link tool 204, as illustrated in FIG. 16F, the author can define a URL of the remote reservation booking website. Thus when a viewer selects the Book Now trigger, a web page associated with the remote reservation booking system appears. Once a reservation is made, or the viewer opts to not make a reservation, the viewer is returned back to card 16F of the wrap package.

Figure 17A:
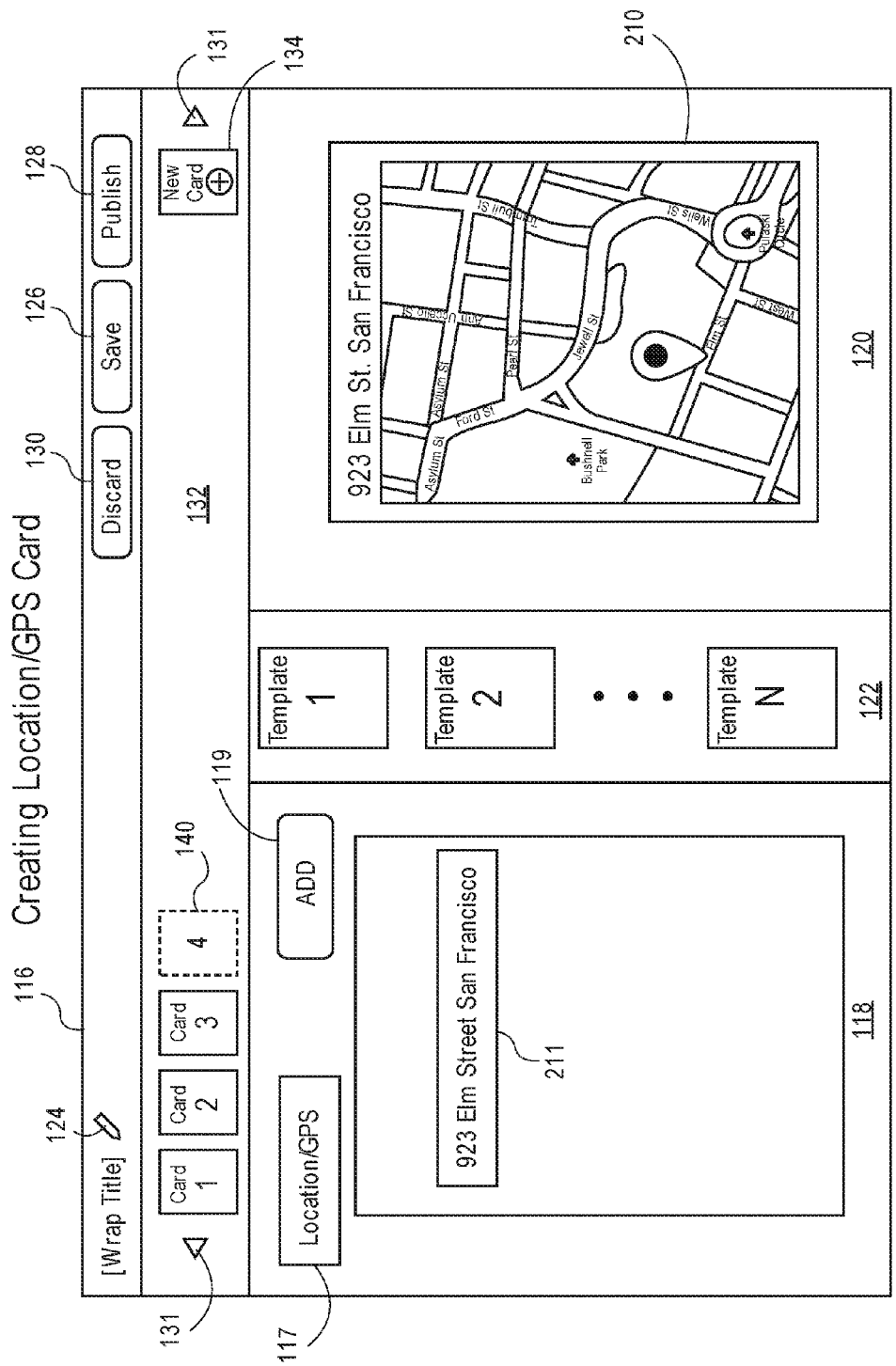
FIGS. 17A through 17F illustrate the authoring of a location/GPS card in accordance with multiple embodiments using the authoring tool of the present invention.
Figure 17B:
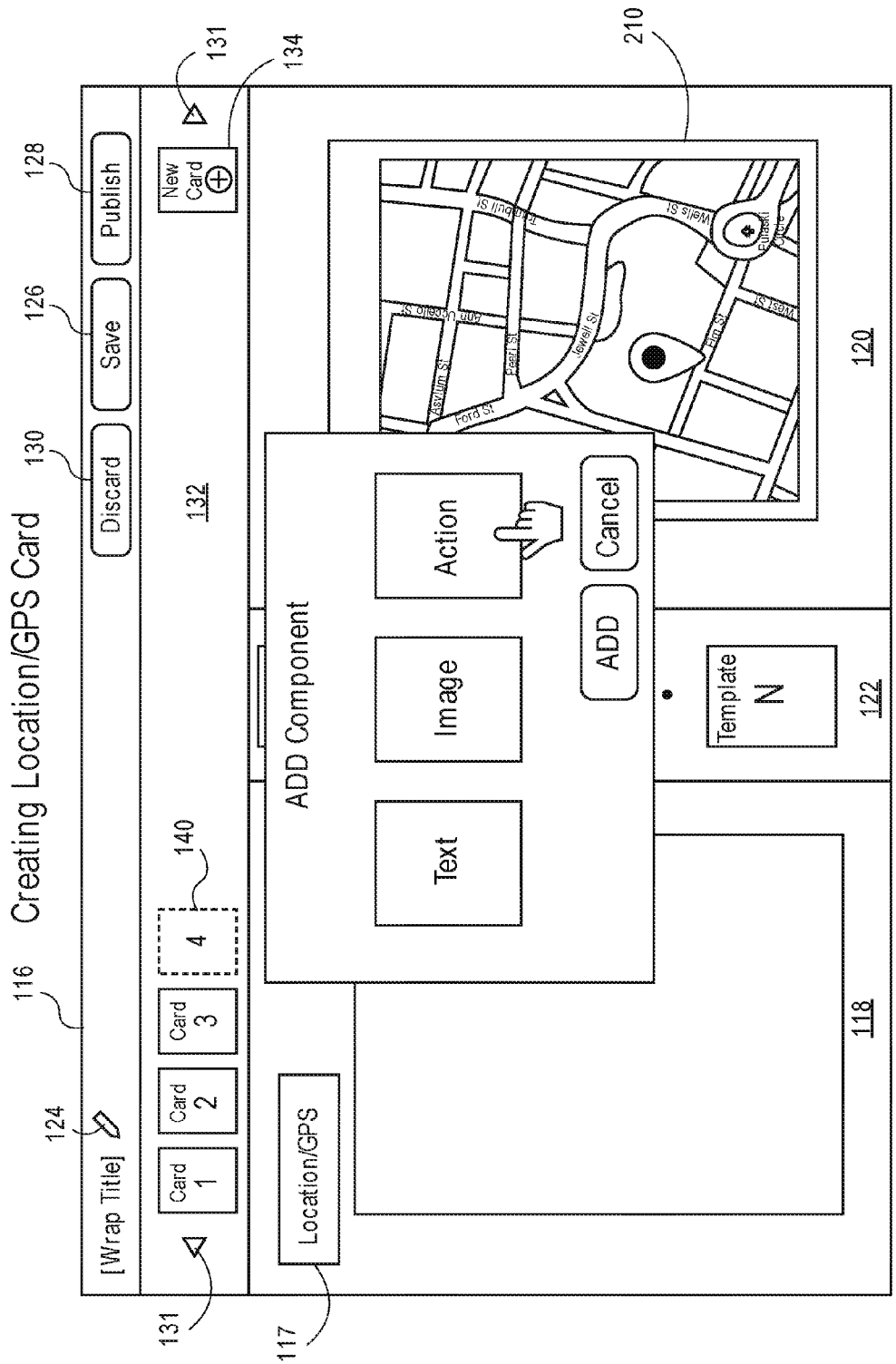
Figure 17C:
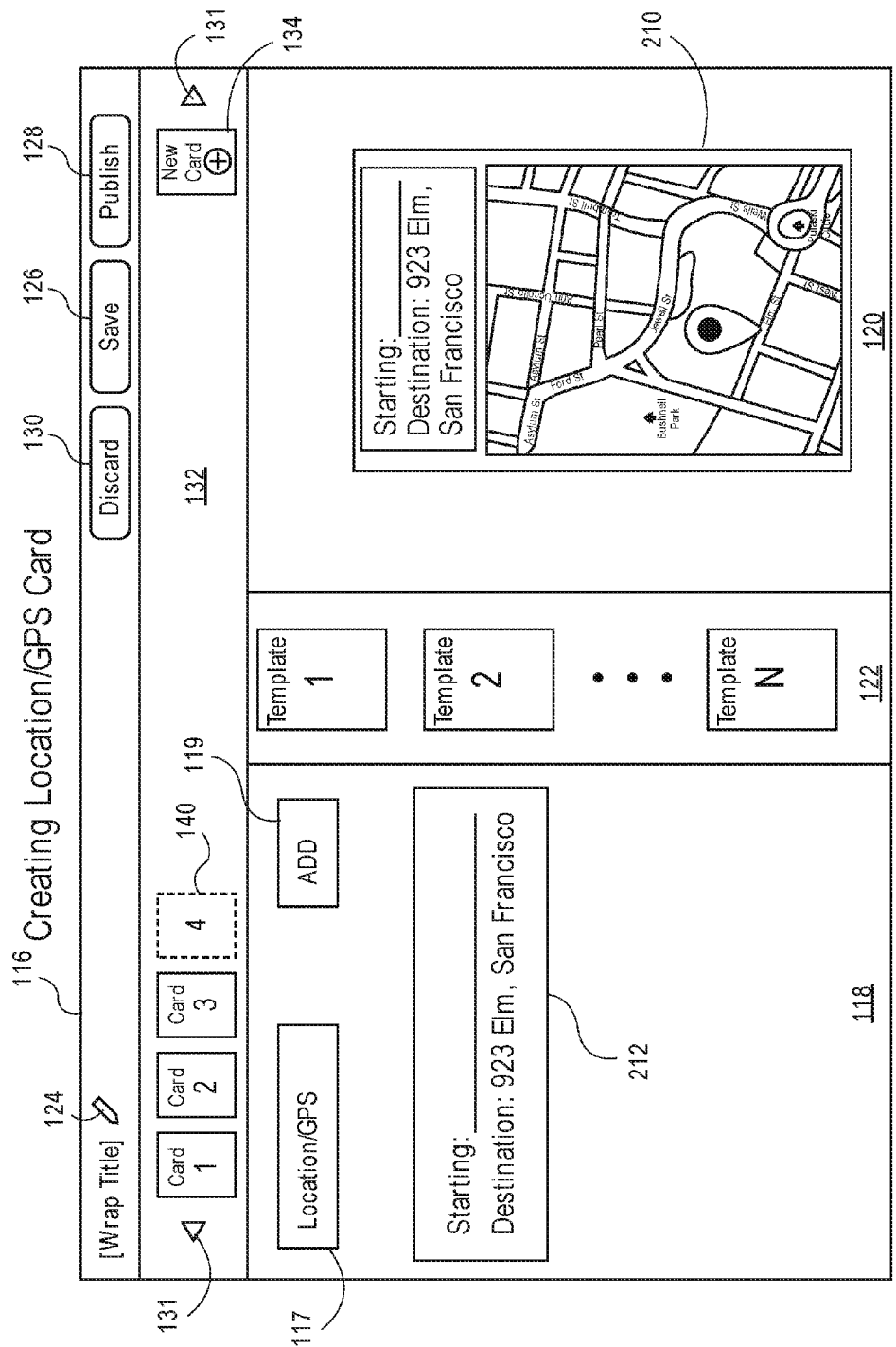

Referring to FIGS. 17A through 17C, diagrams showing new card 140 configured as a location/GPS card is illustrated.

As illustrated in FIG. 17A, the author selects a particular GPS/location template with GPS/location functionality from space 122. In response, GPS/location card 220, corresponding to the selected template, appears in the preview and configure space 120.

As illustrated in FIG. 17B, the author 34 can add additional components to the GPS/location card 210 by selecting the add component tool 119. As previously described, the author can add text and/or image component(s) as described above. In addition, the author can add a location component, as is provided in this example.

As illustrated in FIG. 17C, a component container 212 appears in the authoring space 118 and in the card 210 in the space 120. In this example, the component container 212 enables the author 34 to define GPS functionality in the card 210. For example, the wrap package may be authored on behalf of a merchant located at 923 Elm Street in San Francisco. By including an action component into the card allowing a consumer of the wrap package to enter their current address, the card 210 is configured to interact with the GPS functionality of the consuming device, such as the Google Maps application running on the device, to provide GPS related services. For example, the viewer of the wrap may enter their current location into the card 210, which would result in the card providing directions to the location of the merchant, located at 923 Elm Street in San Francisco.

Figure 17D:
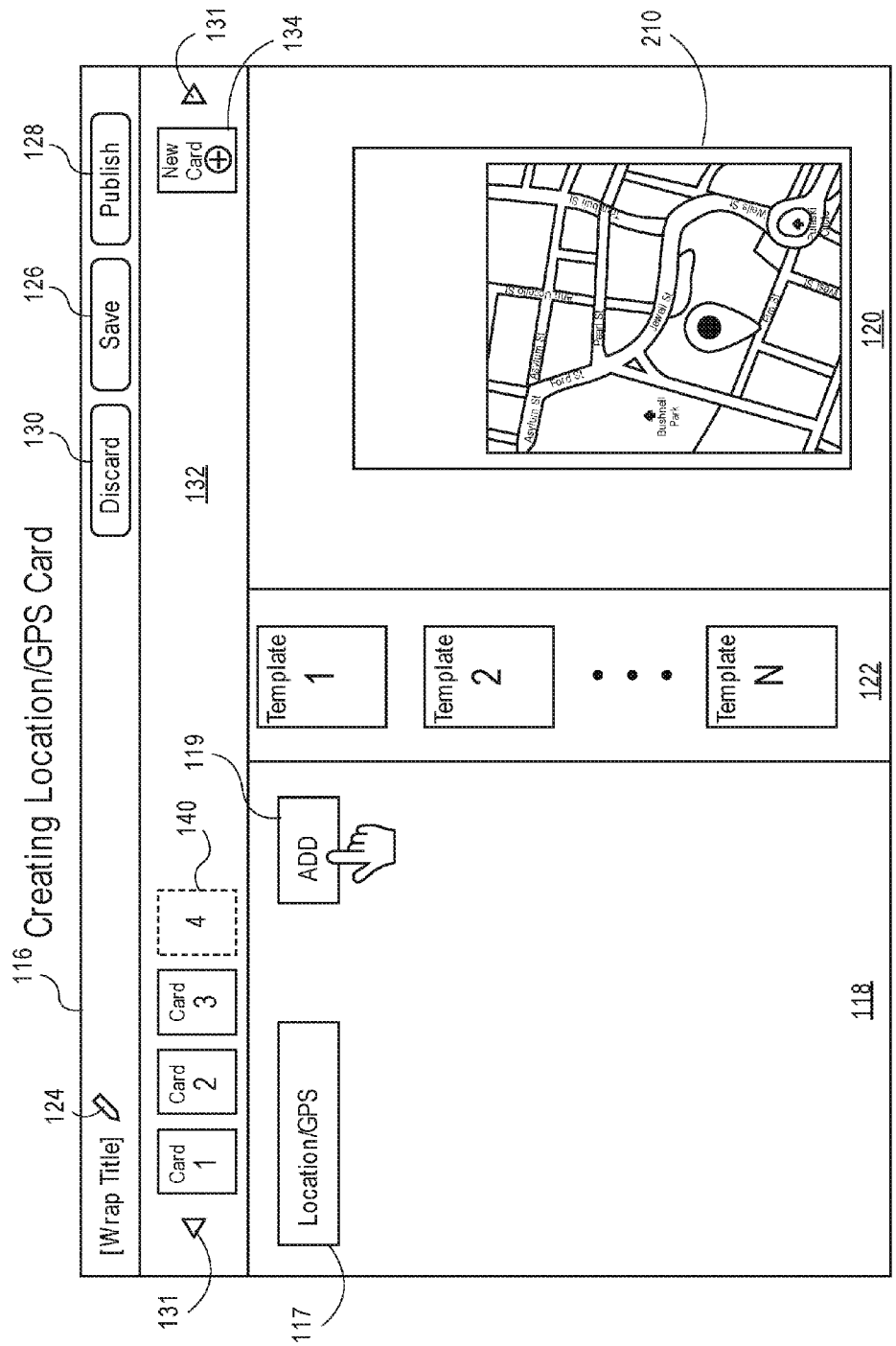
Figure 17E:
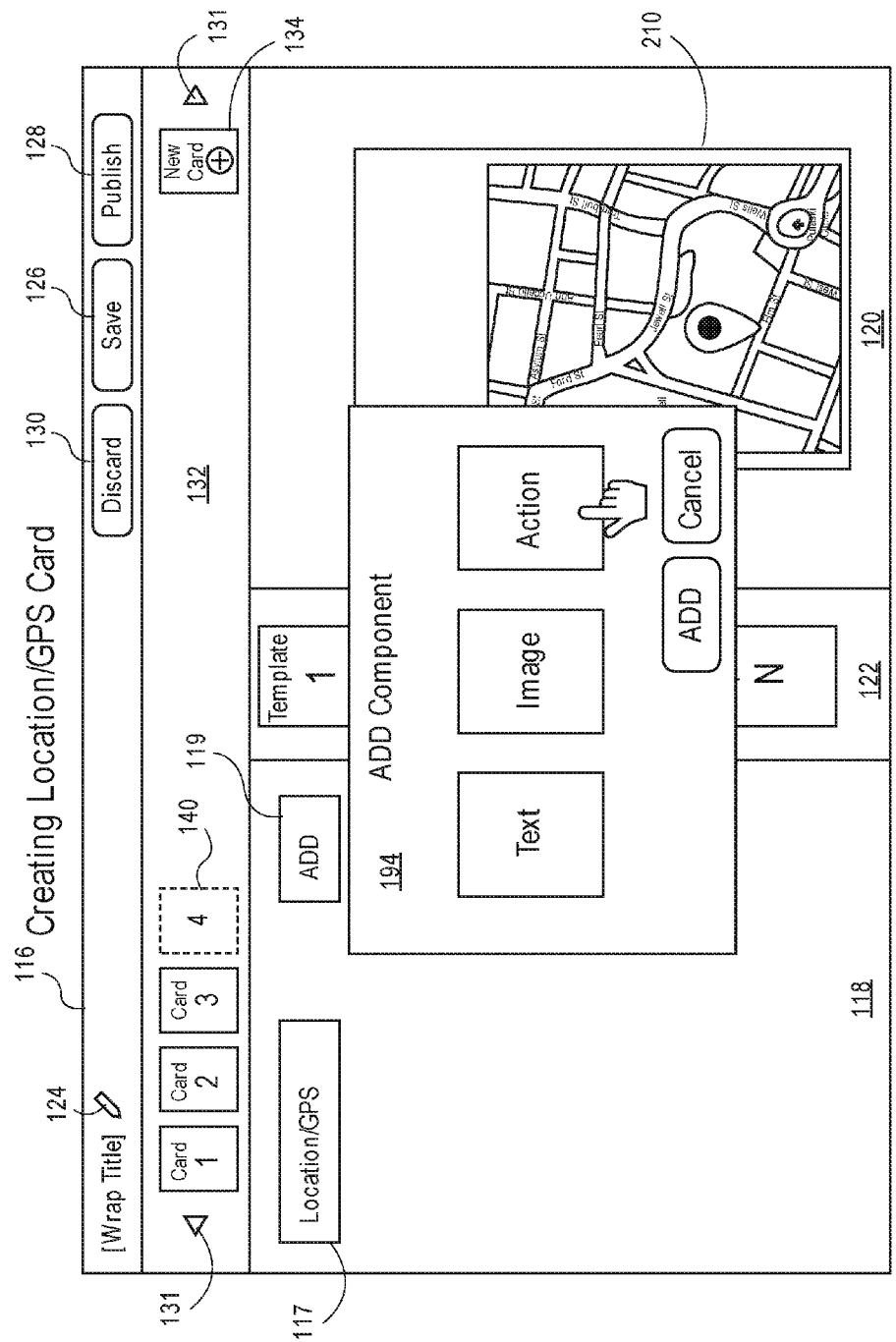
Figure 17F:
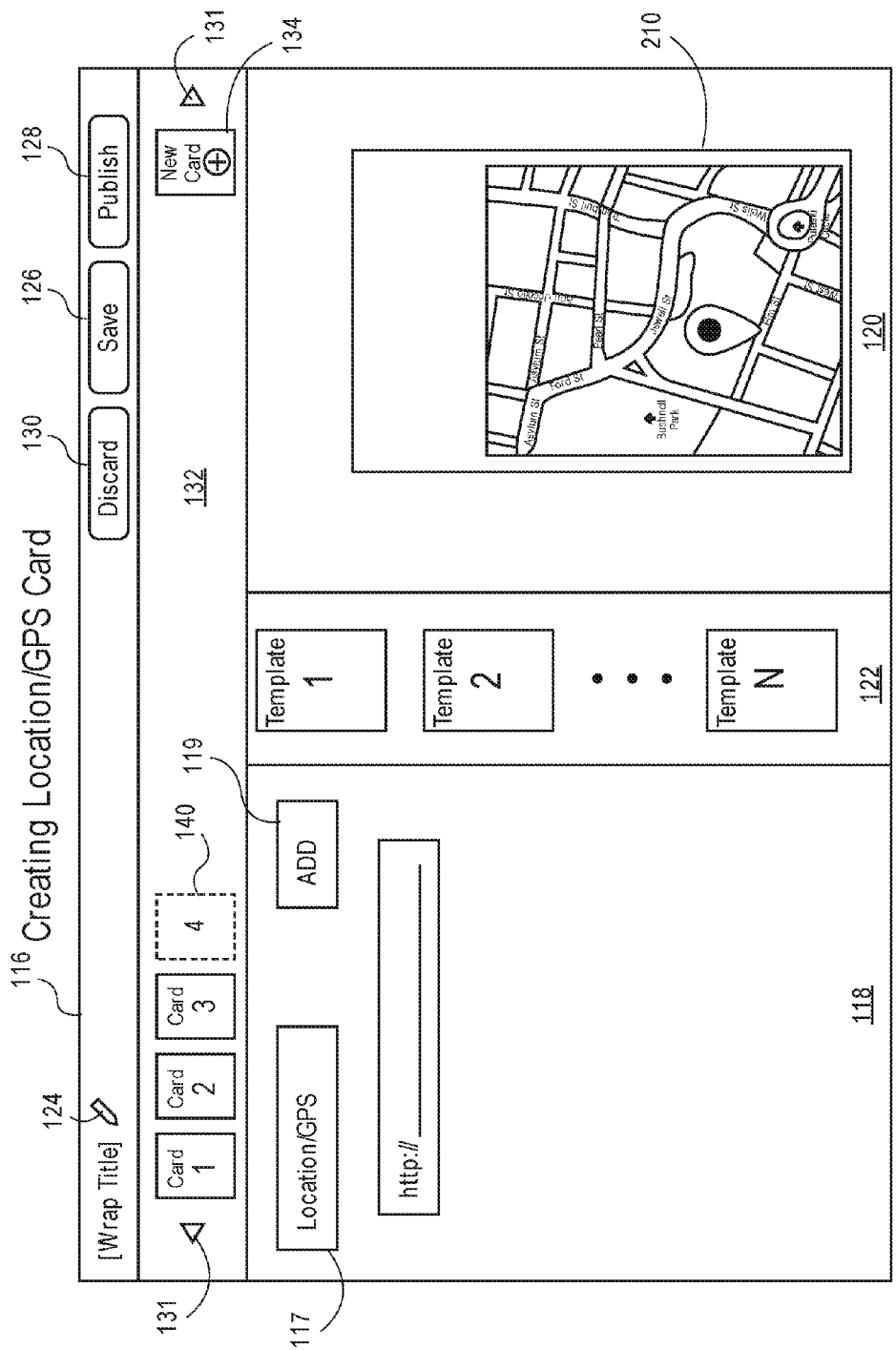

In an alternative embodiment, FIGS. 17D through 17F illustrate a sequence of diagrams for authoring a cul-de-sacing" action to a remote web site providing GPS/location functionality, such as Mapquest, Google Maps or the like. In this example as illustrated in FIG. 17D, the author 34 selects the add component tool 119, which results in the appearance of window 194, as illustrated in FIG. 17E. In response, the author selects the Action item, which enables the insertion of a URL to a remote web page providing GPS/location functionality. Again, as a cul-de-sac, the viewer is returned to the wrap package after they are done accessing the remote GPS/location web page. In yet other embodiments, the GPS/location functionality can also be implemented using a widget or by building the functionality into the card itself.

Referring to FIG. 18A through 18F, a sequence of diagrams illustrating new card 140 authored as a transact card 220 is shown.

Figure 18A:
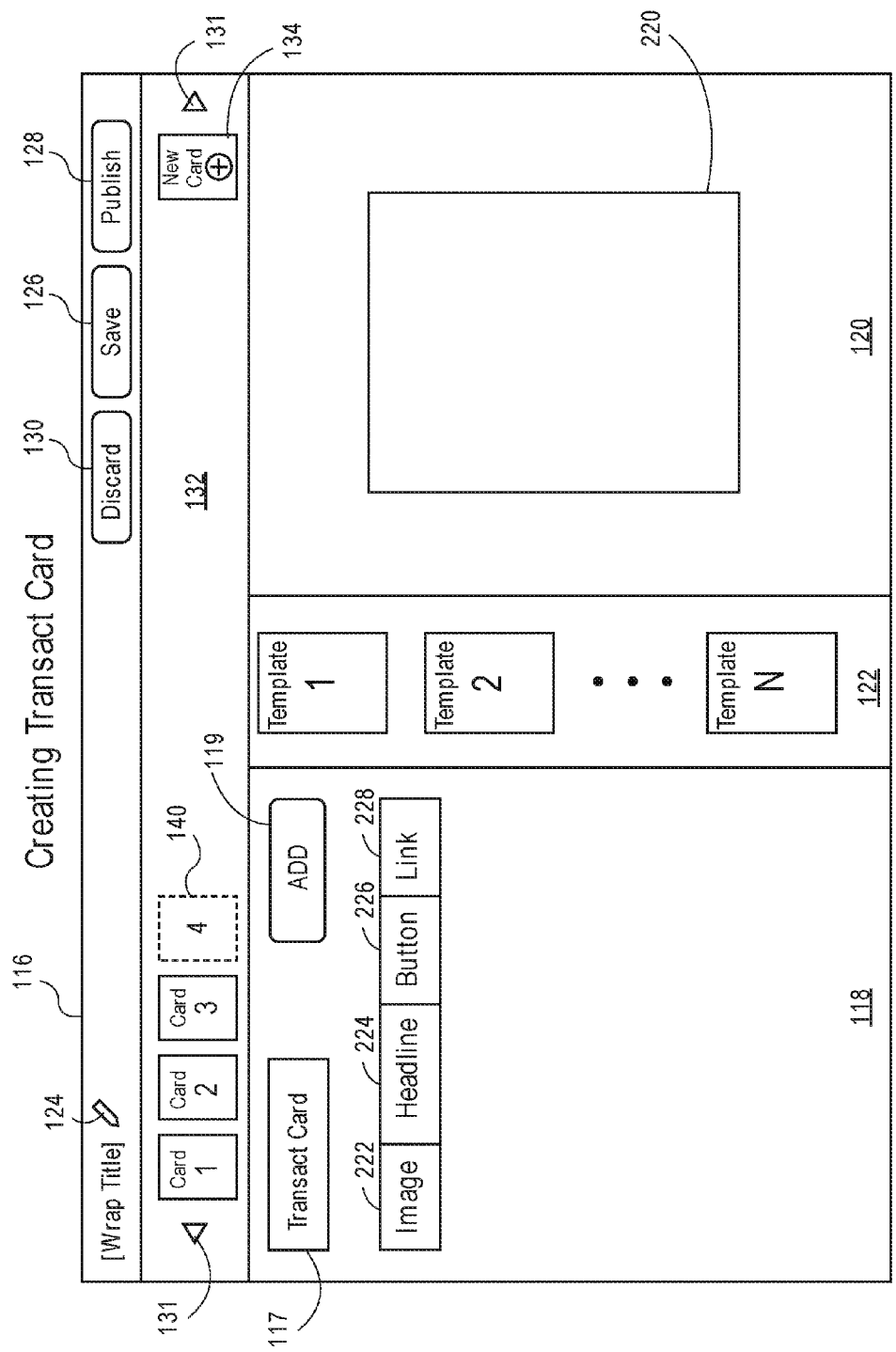
FIGS. 18A through 18F illustrate the authoring of a transact card using the authoring tool of the present invention.

As illustrated in FIG. 18A, the author selects a particular transact template from space 122. In response, a transact card 220, corresponding to the selected template, appears in the preview and configure space 120. In addition, a number of options for adding component(s) specific to transactions are provided in the authoring space 118. In this particular example, an image component 222, a headline component 224, a button component 226 and a link component 228 are provided.

Figure 18B:
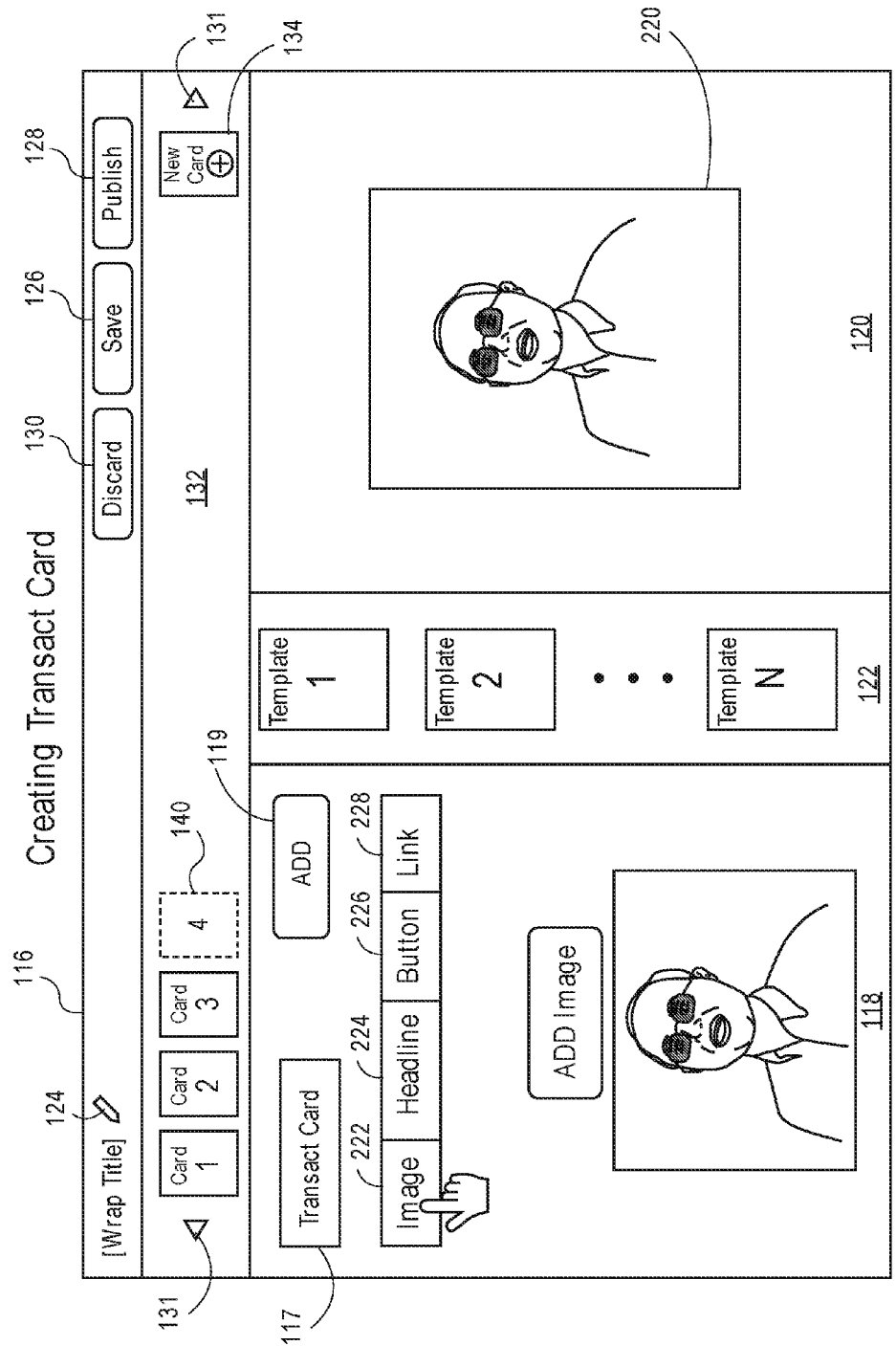

As illustrated in FIG. 18B, the image component 222 is selected. As a result, the author may add an image to the card 220, similar to that described above.

Figure 18C:
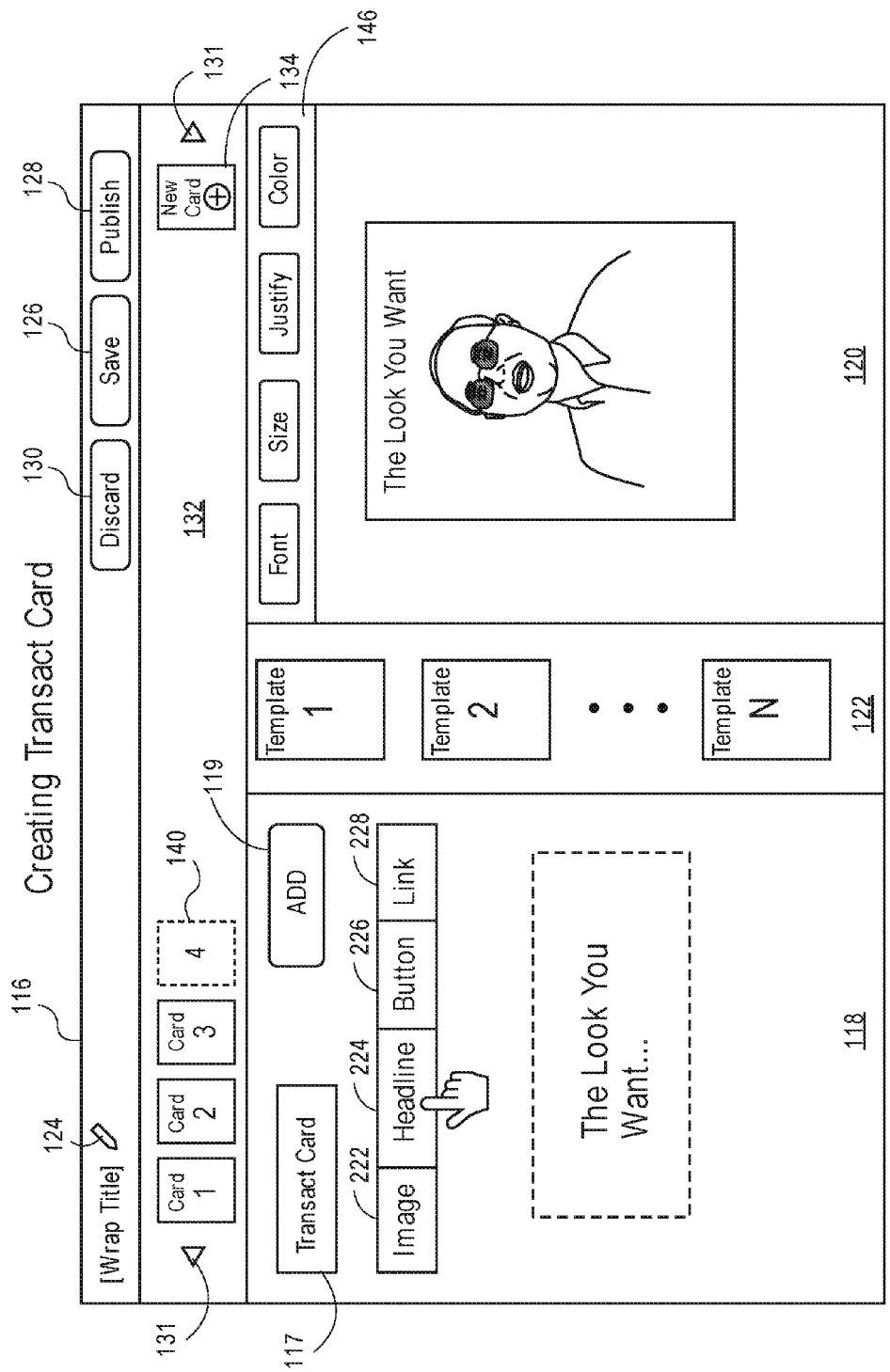

As illustrated in FIG. 18C, the headline component 224 is selected. As a result, the author may add headline to the card 220, similar to that described above.

Figure 18D:
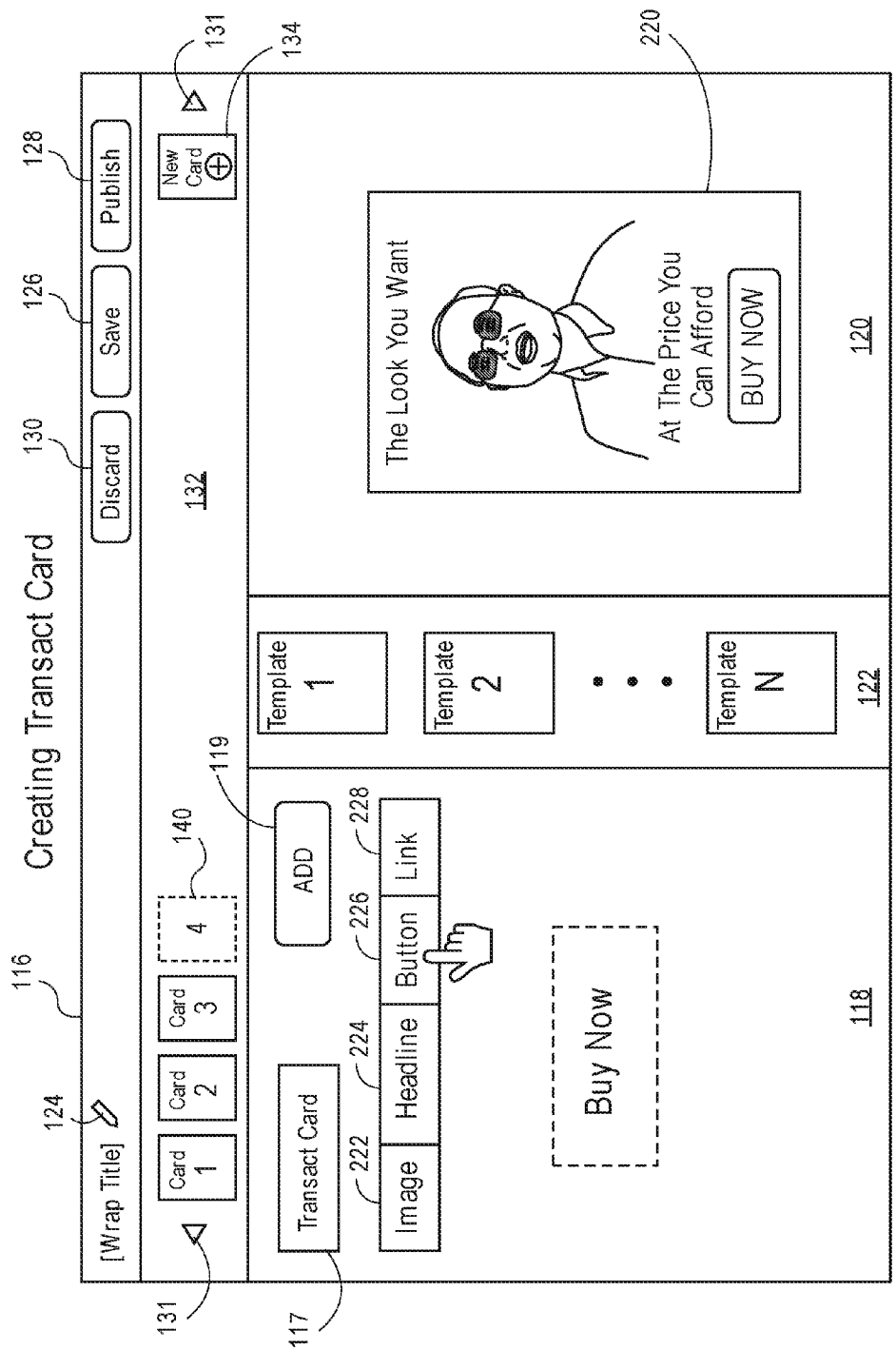

As illustrated in FIG. 18D, the button component 226 is selected. As a result, the author may add a "Buy Now" button similar to that described above.

Figure 18E:
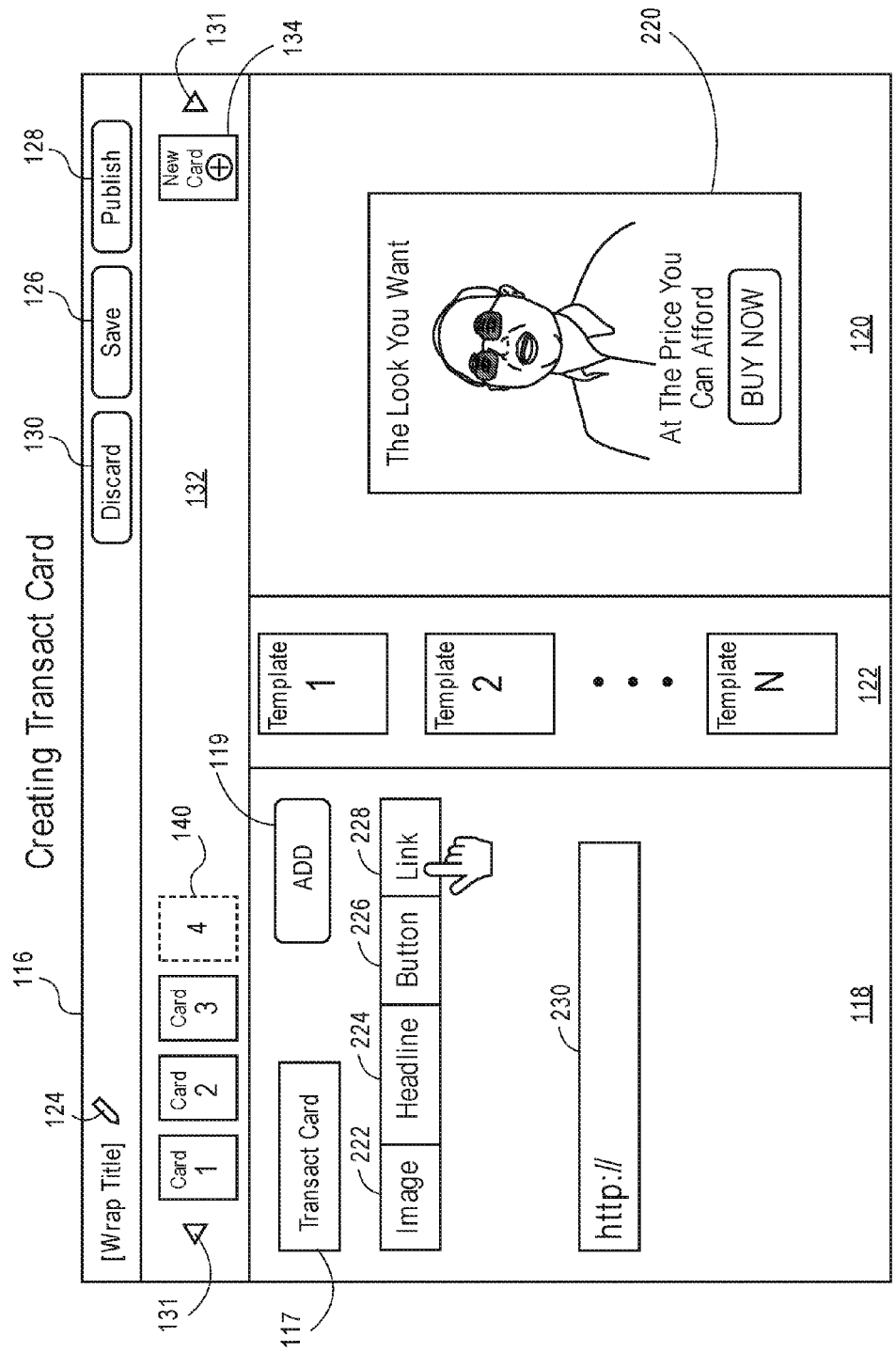

As illustrated in FIG. 18E, the link component 228 is selected. In this non-exclusive example, the author can then enter a URL into box 230, which will result in the cul-de-sacing to a remote web site location when the Buy Now icon is selected. For instance, a web page that allows the consumer of the wrap to purchase goods and/or services appears. When the transaction is complete, the viewer is returned to the wrap package.

It should be noted that transact cards are not necessarily limited to cul-de-sacing for the processing of transactions. On the contrary, transactions can also be conducted within the context of one or more transact card while the wrap is being consumed. For example, one or more transact card(s) can be configured with a bi-directional feed of data and the ability to synchronize the data during a session with a remote data processing center used for handling online transactions. For example within the context of the wrap, the viewer may peruse a number of items for purchase in one or more cards. While viewing the wrap, current data pertinent to the items, such as number in stock, size information, color choices, etc., are synchronized and presented to the viewer while consuming the wrap. The viewer may then elect to place one or more items into a shopping cart for purchase. When ready to complete the transaction, the viewer prompted to enter into one or more cards the appropriate user information, such as mailing address, billing address and credit card information, etc., to complete the transaction. Alternatively, all this information may be previously stored, in which case, the purchase can be completed with a "one-click" operation or the like.

In yet another embodiment, the processing of a transaction can be implemented using a widget as a component within a card. With such an embodiment, the widget appears inline an iframe within the card when rendered. The viewer thus has the ability to conduct a transaction with a remote data processing service via the widget when consuming the card.

Figure 18F:
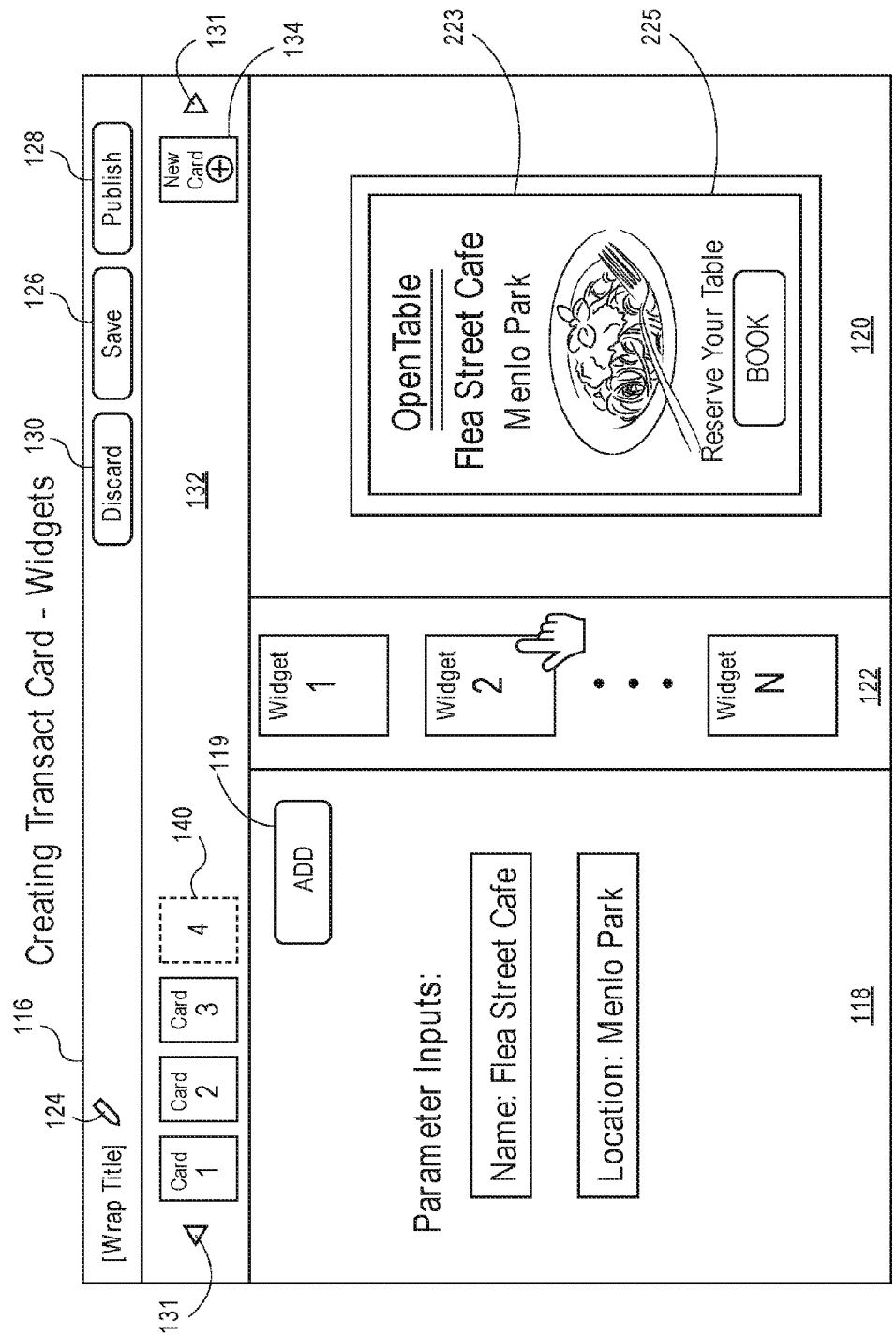

Referring to FIG. 18F, an example of the authoring of a widget into a card is illustrated. In this non-exclusive embodiment, a library of preexisting widgets is provided in the layout space area 122. As previously described, each of the widgets in the library includes a descriptor 118W, a widget component type 89W, a widget component ID 88W, an optional component name 84W, and a widget definition 120W. Further, each widget definition 120W includes a widget ID 121, a widget name 122 and a definition 124. Included in the definition 124 are a source identifier 126 that identifies the location of the server that will supply the corresponding widget content and parameter(s) 130 that represent or specify content and other data to be passed between the server and the widget when instantiated. The widget definition 120 for each widget in the library also preferably includes frame size and position related identifiers such as width 127 and height 128. As previously noted, the width 127 and height 128 identify the internal frame's intended height and width, whereas the position 129 of the iframe within the card—e.g., its X-Y coordinates, are typically determined by the author by positioning the iframe within the card.

When a widget from the library is selected, an iframe appears within a card in the authoring space 120. The above-mentioned widget related descriptors, components and identifiers defining the selected widget are then associated with the card. Thus, when the card is rendered, the runtime engine obtains the contents to populate the iframe. The content and functionality provided within the iframe is therefore dictated by the remote source, not the card descriptor for the card.

In the example illustrated in FIG. 18F, the selected widget is associated with the popular online restaurant booking service known as Open Table. When the Open Table widget is selected (e.g., widget 2), its contents appear in the specified iframe 223 of card 225 in the preview and configure space 120. By moving the iframe 223, the author can define the X-Y position 129 in relation to the card.

The Open Table widget used in this example allows the booking of a table at a specified restaurant. Thus, in the authoring space 118, the widget parameter(s) 130 necessary to identify a particular restaurant, among all the member restaurants in the Open Table network, are provided. In this instance, the author enters "Flea Street Café for the restaurant name and Menlo Park for the location. With these parameters 130 defined, the widget is customized and configured to access the reservation booking records for the Flea Street Café in the Open Table database.

When a viewer interacts with the widget during consumption of the card, a session is established between the widget and the server. During the session, the appropriate data is served and presented through the widget via one or more pages, such as content pertaining to the Flea Street Café, menu(s), hours of operation, etc., and the ability to reserve a table using a "Book Now" function. When selected, the viewer is prompted to enter through the widget a date, time and party size. In response, the server access the Flea Street reservation records in the Open Table database and presents through the widget the availability of table(s) and time-slots exactly or closely matching the viewer's query. In response, the viewer may book a table for an available time-slot via the widget.

The Open Table widget is provided as an illustrative example. It should be understood that widgets can be used to implement just about any type of functionality and/or services commonly provided in a website or application, including but not limited to electronic transactions for the sale, purchase, rental and/or reservation/booking of any good or service.

Referring to FIGS. 19A through 19D, diagrams illustrating the authoring of new card 140 as a gallery card is shown.

Unlike the above-described cards, the layout selector space 122 is modified to include a vertical frame sequencing area 123, a new frame icon 125 and a behavior declaration 250 that enables the author to define if the individual frames of the gallery card will have a "snap" action or "rolling" scroll action when swipe navigated.

When a new frame "N" is to be added to the vertical sequence of the gallery card, the icon 123 is selected. Thereafter, the author selects a template for the new frame, which could be any of the above-listed card types. In addition, the vertical sequence of the individual frames of the gallery card can be changes using a drag and drop or analogous operation, similar to that described above with regard to the horizontal sequence. Consequently, the author 34 may compose a gallery card by creating, authoring and sequencing new frames one after the other.

Figure 19A:
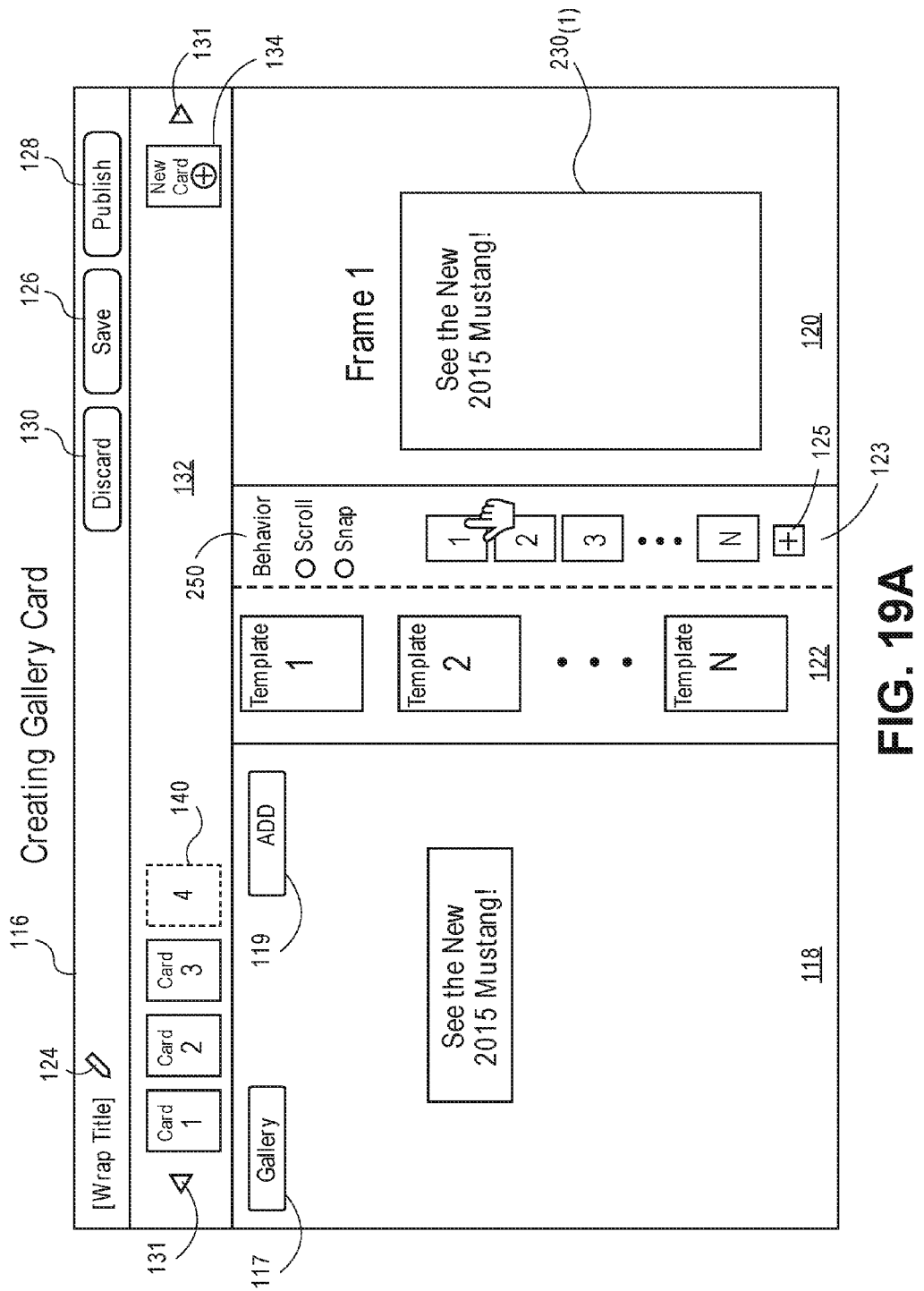

As illustrated in FIG. 19A, a first frame $230_{(1)}$ of the gallery card is illustrated. In this example, the first frame $230_{(1)}$ is selected from a text-based frame template that has been authored to include the text component "See the New 2015 Mustang".

Figure 19B:
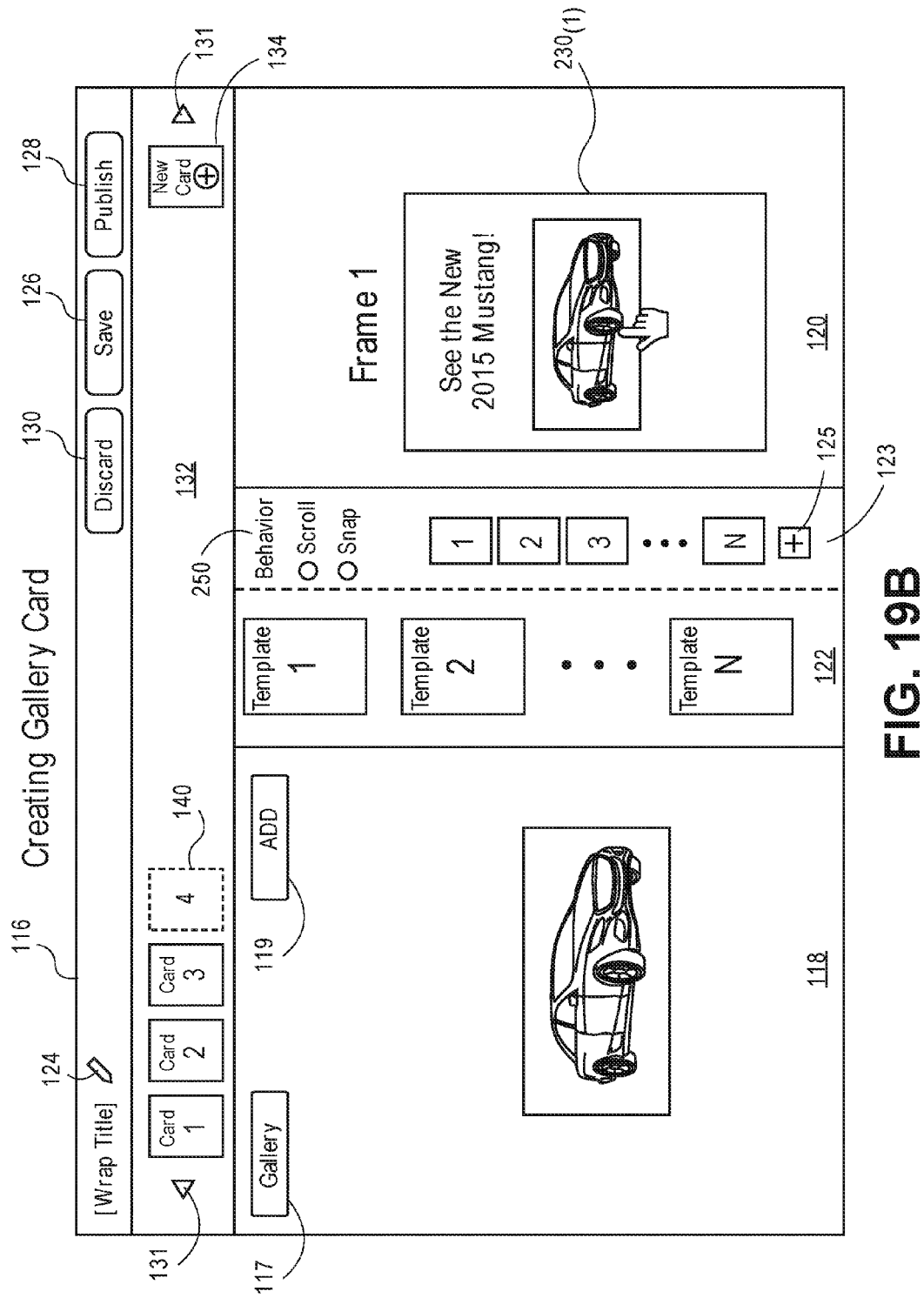

As illustrated in FIG. 19B, the same first frame $230_{(1)}$ of the gallery card is illustrated. In this example, the second frame 230(1) is selected from an image-based frame template that has been authored to include an image of the 2015 Mustang.

Figure 19C:
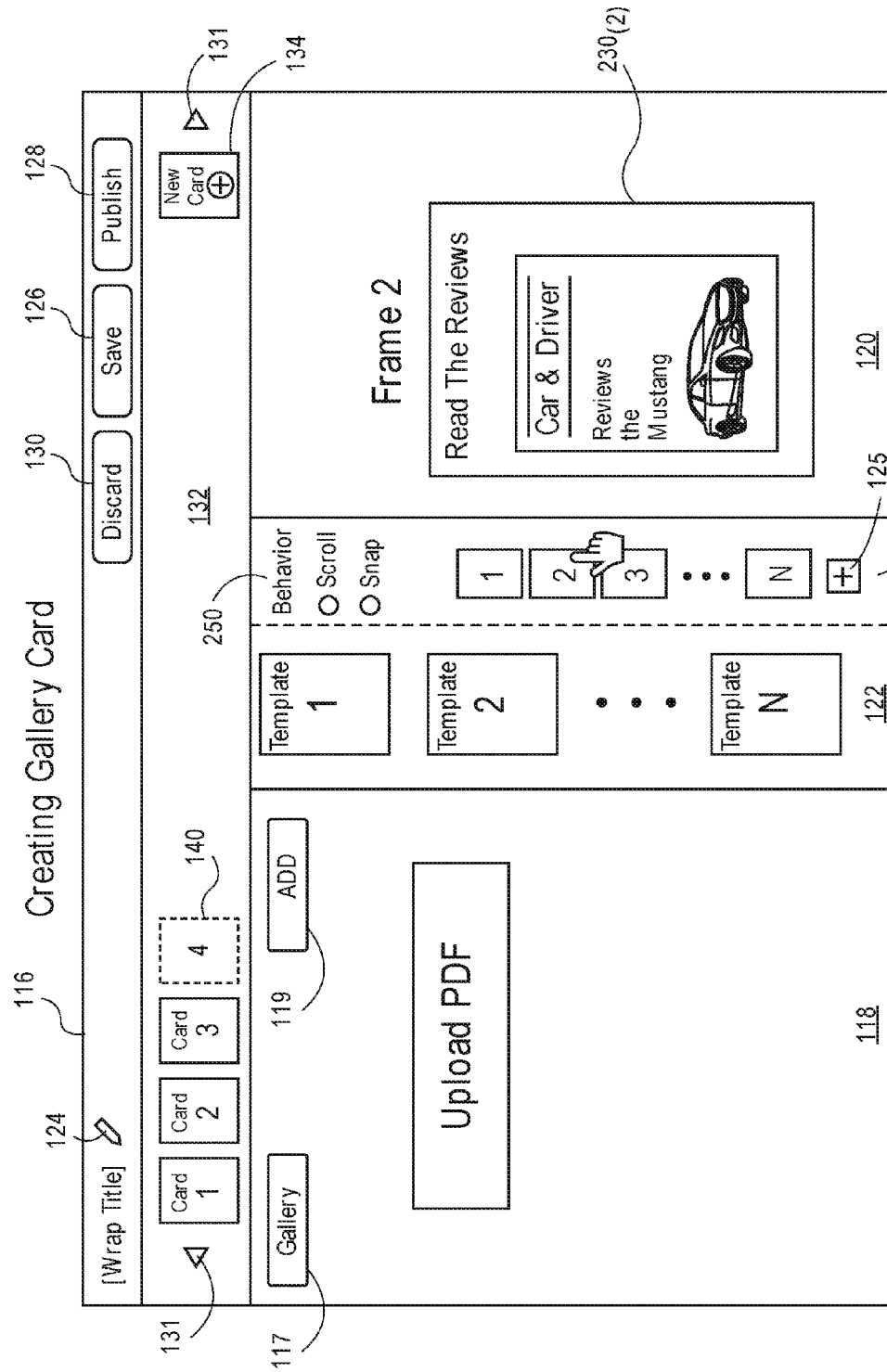
Figure 19E:
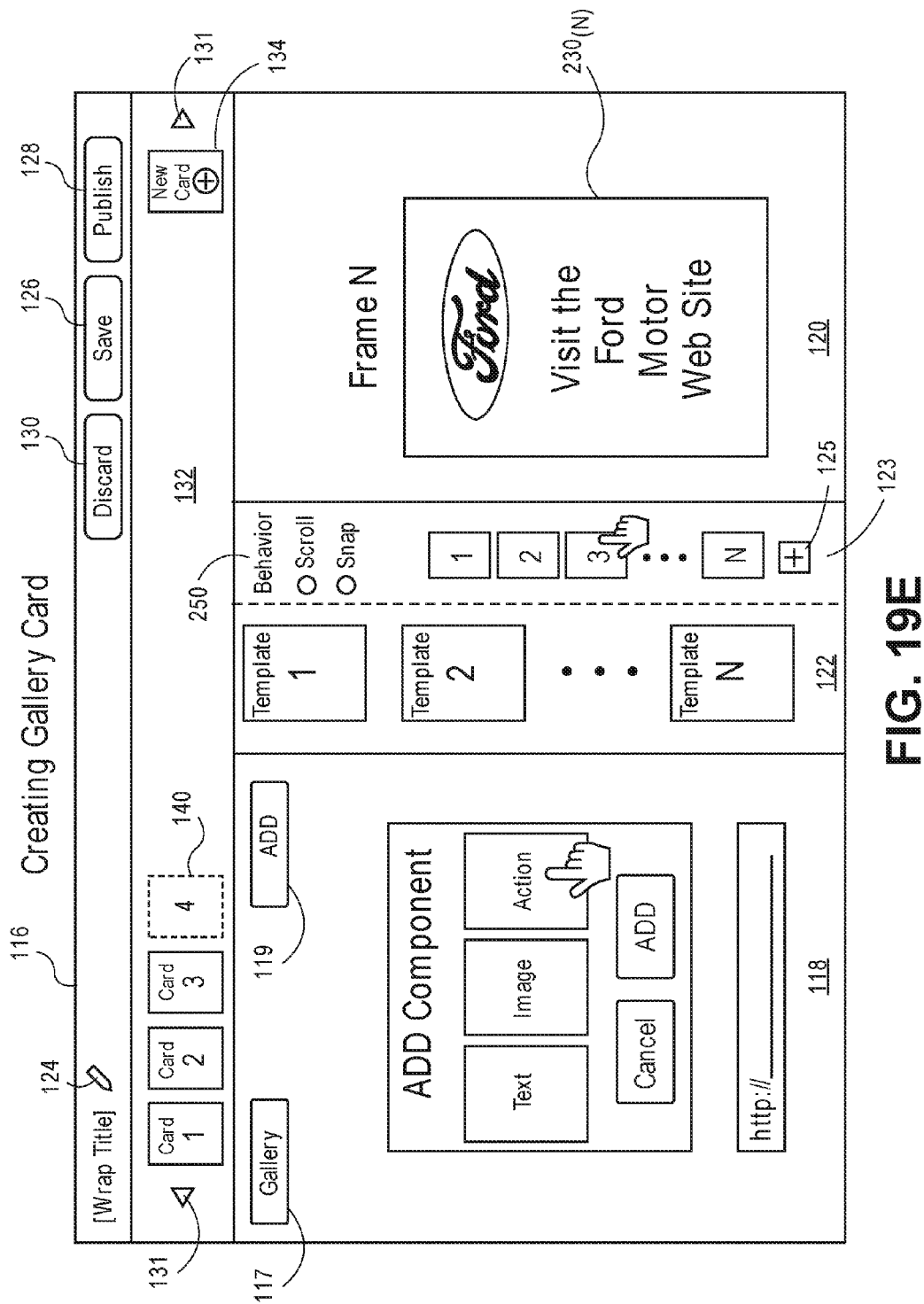

As illustrated in FIG. 19C, a second frame $230_{(2)}$ of the gallery card is illustrated. In this example, the second frame $230_{(2)}$ is selected from a document-based template that has been authored to include an PDF article about the 2015 Mustang published by the magazine Car & Driver.

As illustrated in FIG. 19D, a third frame $230_{(3)}$ of the gallery card is illustrated. In this example, the third frame $230_{(3)}$ was selected from a video based frame template that has been authored to include a video of the 2015 Mustang.

As illustrated in FIG. 19D, an "N" and final frame $230_{(N)}$ of the gallery card is illustrated. In this example, the fourth frame $230_{(N)}$ was selected from an end-of-gallery template and has been authored to include a link to the Ford Motor Company web site as well as icons for sharing the wrap package.

The frame templates used for authoring the individual frames of gallery cards are similar to card templates. As such, frame templates having the same features and functionality as described herein with respect to cards.

Figure 20A:
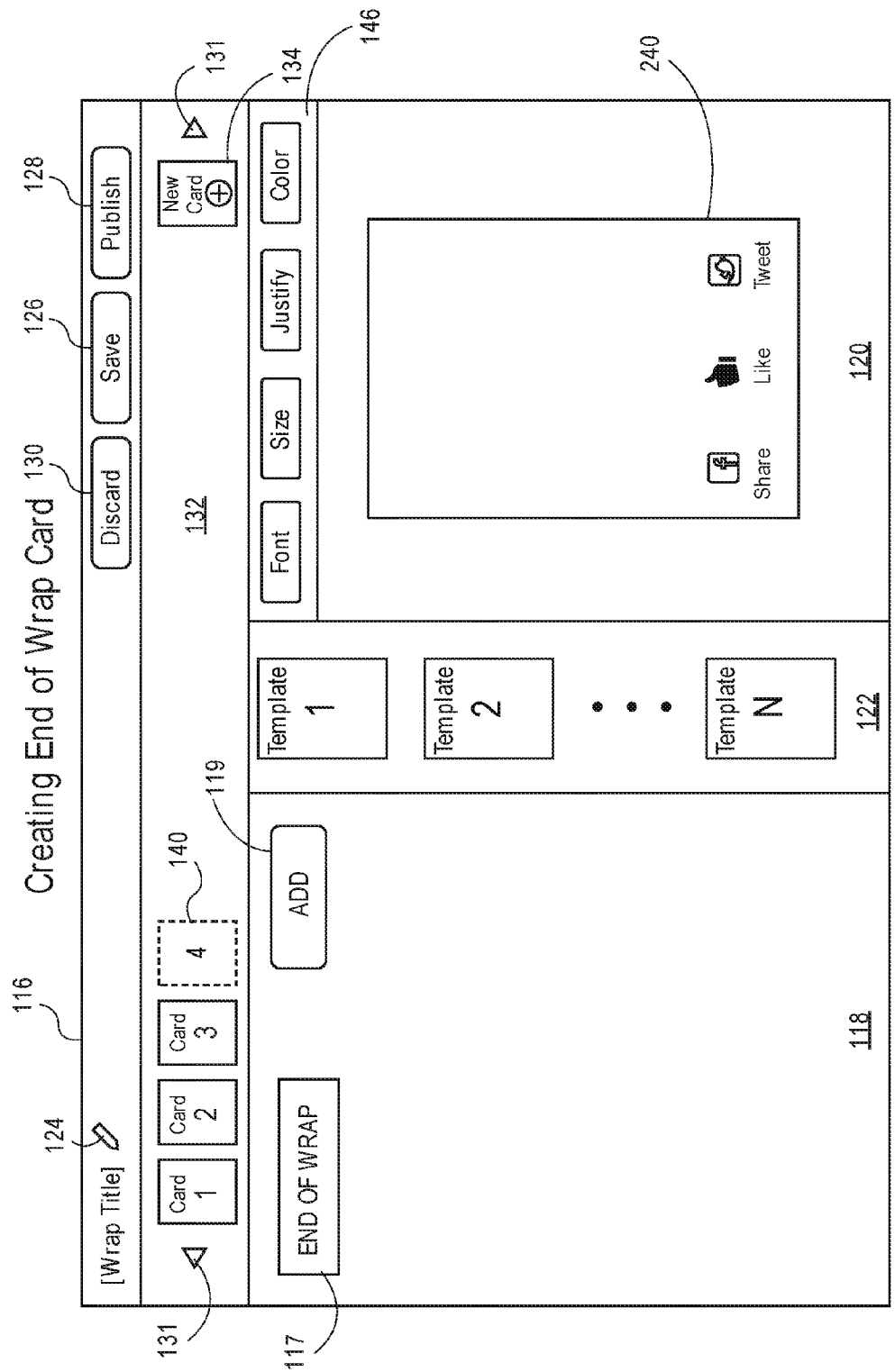
FIGS. 20A through 20B illustrate the authoring of an end of wrap card using the authoring tool of the present invention.
Figure 20B:
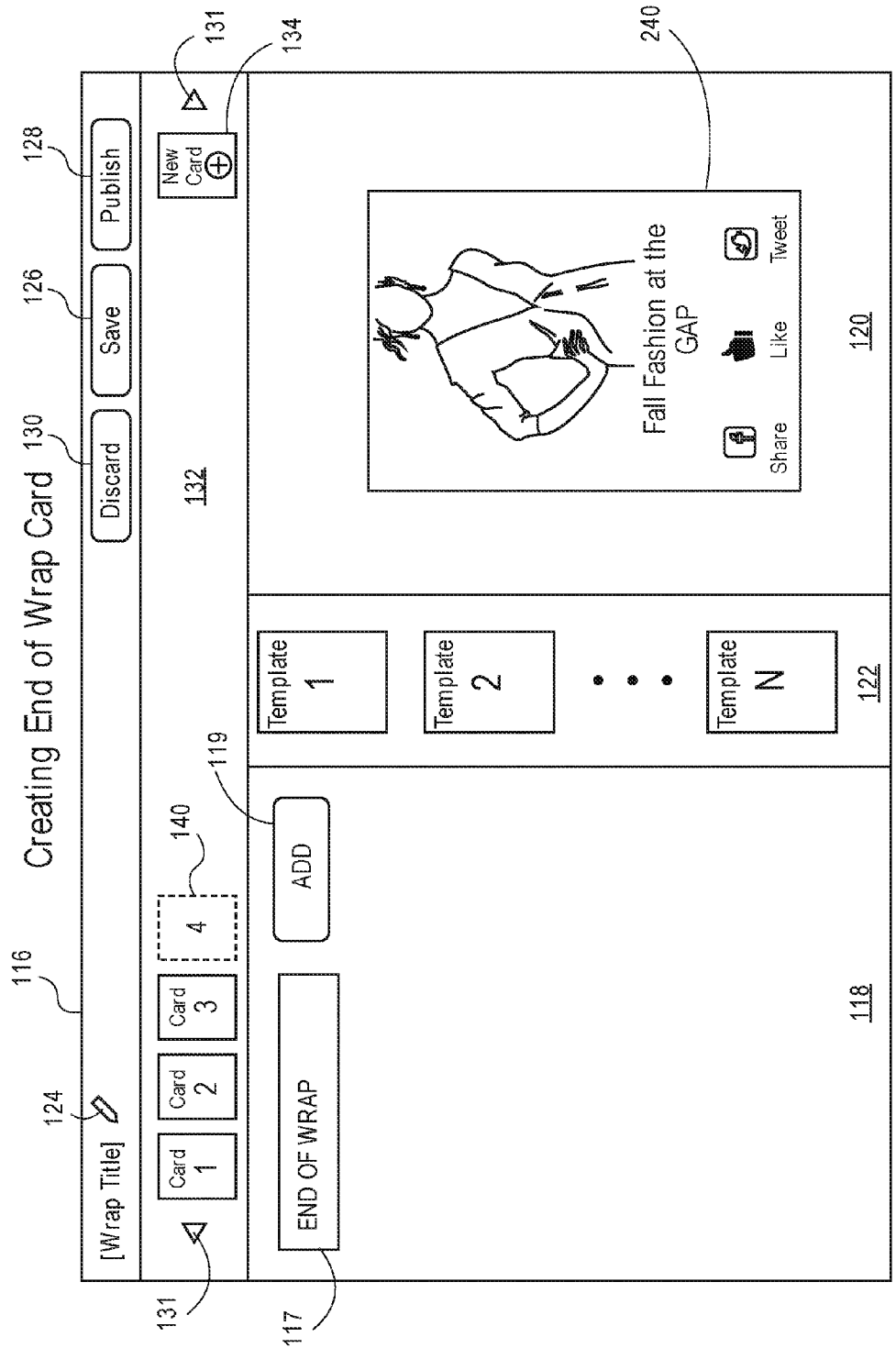

Referring to FIGS. 20A and 20B, diagrams showing the authoring of new card 140 as an end of wrap card is shown. When the end of wrap card is selected within the card type selector 136, a number of appropriate templates appear in the space 122. The author can then select one of the templates and begin the process of defining the last card 240 in the wrap package. For example, the author may select a template with "Share", "Like" and "Tweet" functionality built-in to the card, as illustrated in FIG. 20A. By selecting any of these options, the wrap package may be shared like a message, and included for example in a Facebook feed or a Twitter feed.

In addition, the author may, by selecting the add component tool 119, add image, text, video or other media, actions and/or behaviors to the card, as described above. For example as illustrated in FIG. 20B, the author has added an image of a woman in a dress and text in a sub-header that reads "Fall Fashion at the Gap". This is just one example of an almost infinite number of different card arrangements that can be authored as the last card in a wrap.

In each of the examples provided above, the new card 140 can be either saved using 126, discarded using icon 130, or published using icon 128. When saved, the card 140 is stored in its current state and can be later accessed for additional authoring. When discarded, the card 140 is removed from the sequence space 132. When published, the card 160 is included in the wrap package. At any point in time, the wrap package, or any particular card in the package, can be edited, removed, re-ordered, etc., using the above-described tools.

Up to now, the authoring of wraps 10 has been described on a card-by-card basis. That is each card, including any content, functionality, styles, triggers, attributes, behaviors, etc., is authored one at a time. Under certain circumstances, it may be convenient or beneficial to author similar component(s) into all or some subset (i.e., more than two) of the cards of a wrap at the same time. In a non-exclusive embodiment, "global" components may be globally authored into a wrap, without having to author the component into each card on a card-by-card basis.

Figure 21A:
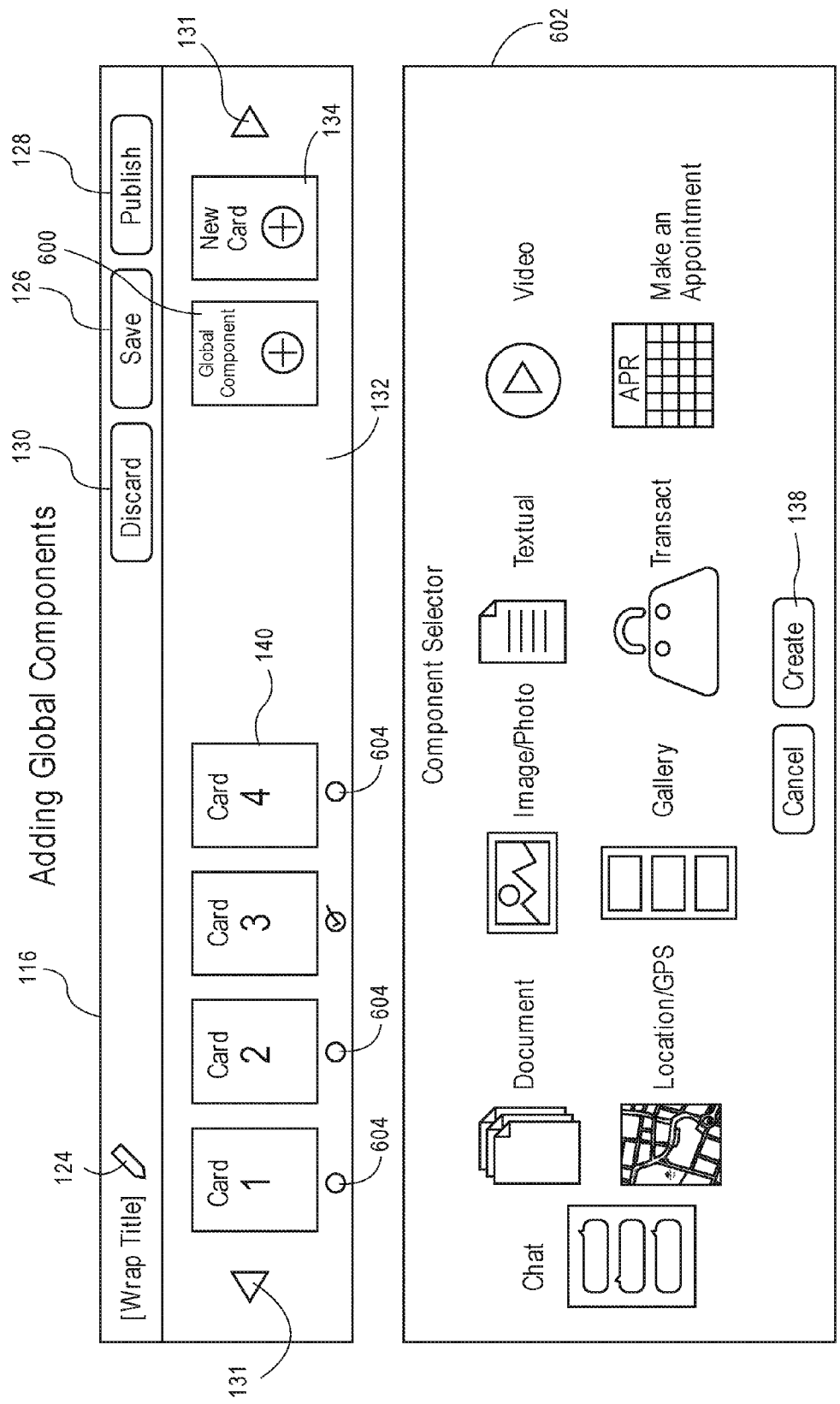
FIGS. 21A and 21B illustrate authoring a global component to all or a designated subset of the cards of a wrap package in accordance with a non-exclusive embodiment of the invention.
Figure 21B:
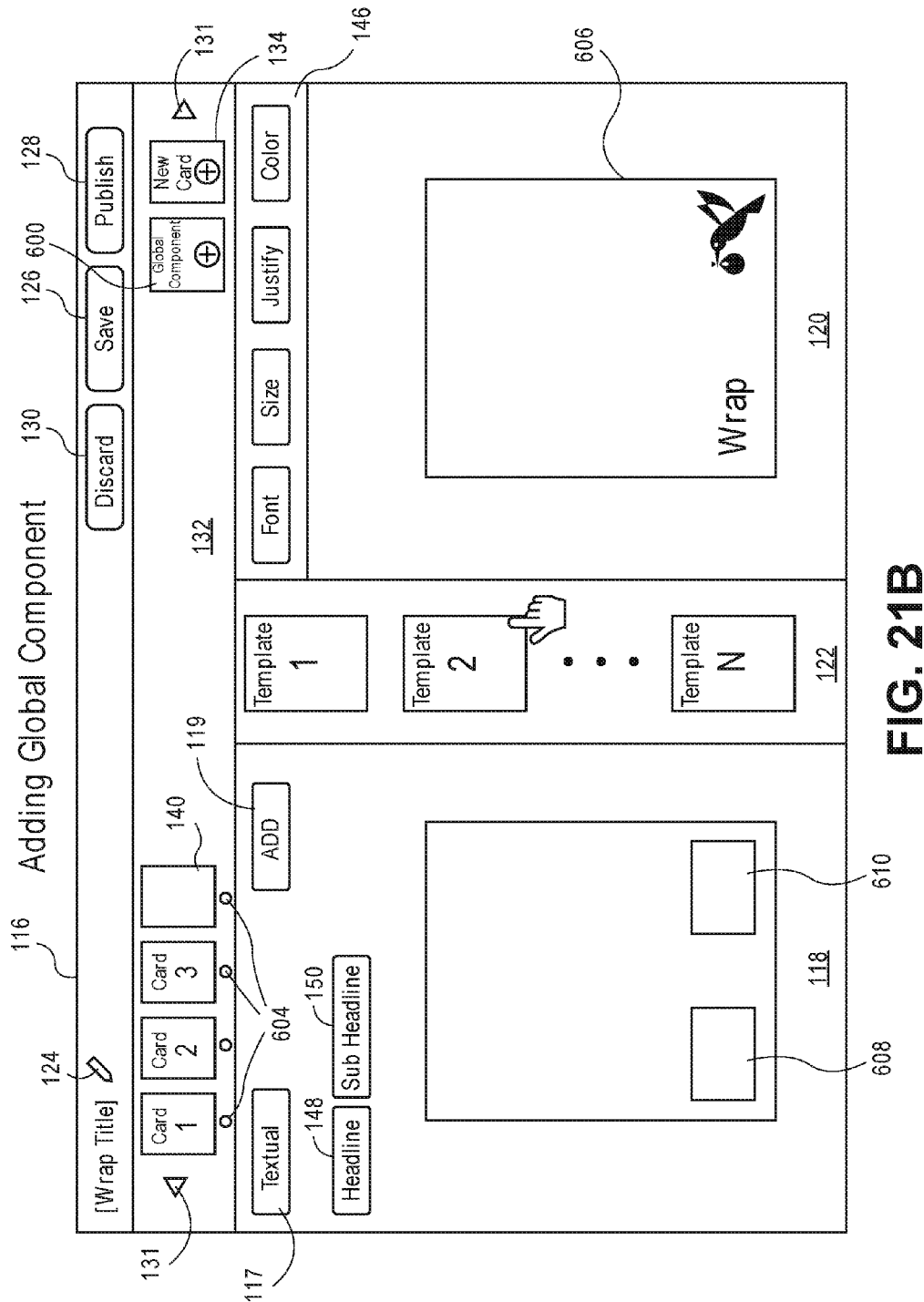

Referring to FIG. 21A and FIG. 21B, another embodiment of the authoring tool 100 is shown. With this embodiment, the tool 100 includes the ability to globally author components that are applicable to all or a subset (i.e., two or more) of the cards of a wrap is illustrated. In this non-exclusive embodiment, a global component tool 600 is provided in space 132, as illustrated in FIG. 21A. When selected, a list of components 602 appears. In the example shown, text, video, image/photo, document, chat, location/GPS, gallery, transact, and/or make an appointment components are provided. By selecting one of these components from the list 602, it can be globally applied to all the cards (or some designated subset) of cards in the wrap.

Also provided in the space 132 is a designator 604 associated with each of the card(s) in the wrap. The designator 604 is used to specify if a selected global component should be applied or not applied to the corresponding card. In various implementations, the default setting is that a global component will automatically apply to all the cards, unless a card is explicitly deselected using the corresponding designator 604. Alternatively, the compliment arrangement can be used, meaning that a global component will be applied only to those cards explicitly selected by the corresponding designator 604.

In a non-exclusive embodiment, global components are applied to multiple cards by (i) creating a card "overlay", (ii) authoring the overlay to include or associate one or more global components, and then (iii) applying the overlay to the designated cards of the wrap so that the one or more global components are applied to one or more designated cards of the wrap package. In some instances, the overlay, including the one or more components, are applied to all of the cards of the wrap respectively. In other instances, the overlay, including the one or more components, are applied to only the cards designated by the author.

Referring to FIG. 21B, an exemplary overlay 606 is shown in the preview and configure space 120. In this example, the author has defined a text component 608 and an image/photo component 610 to be authored into the overlay. In the authoring space 118, the name "Wrap" has been entered into the text component 608 and a company logo (e.g., a hummingbird) has been associated with the image/photo component 610. Once the authoring of the overly 606 is complete, its component(s) will be overlaid over each of the designated cards of the wrap. In this manner, global components can be authored across all or some designated subset of the cards of a wrap.

Again, it should be understood that text and image/photo global component examples provided herein are for illustration purposes. Any component mentioned herein that can be authored into a single card at a single card level can also be a global component by applying the component to multi-cards (i.e., two or more cards) or all the cards of a wrap on a global level.

Figure 21C:
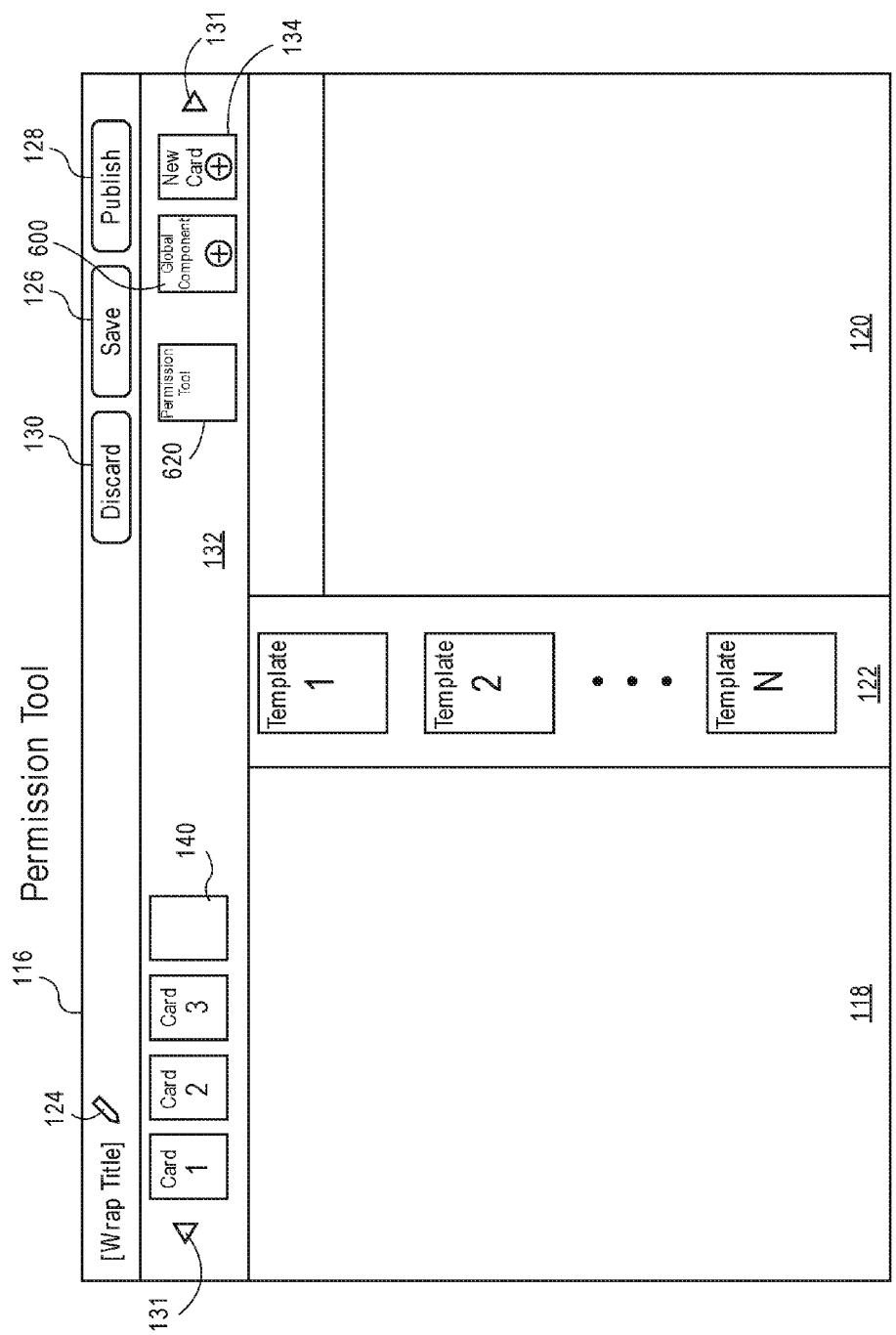

Referring to FIGS. 21C and 21D, a permission tool for setting permissions associated with an authored wrap package in accordance with an optional embodiment is shown. As illustrated in FIG. 21C, a permissions tool 620 is provided in the sequencing space 132 with this embodiment. When the permissions tool 620 is selected, a permission tool window 622 appears, as illustrated in FIG. 21D.

The permission tool window 622 includes a first section 624 that enables the author of a wrap package to set permissions to allow others to share and/or edit a wrap package on a global basis. For both share and edit options, a pair of Yes or No selections are provided respectively. By selecting either the Yes or No option, the permission to allow others to share or edit the named wrap is granted or denied respectively.

The permission tool window 622 also includes a second section 626 that enables the author to grant or deny others the permission to edit, share delete and/or mix individual cards of the named wrap package on a card-by-card basis. By selecting either the Yes or No options for each card (e.g., Card 1, Card 2, Card 3 through Card N), the permission to edit, share delete and/or mix each card can be granted or denied.

It should be understood that the card authoring examples provided above are merely exemplary and should in no way be construed as limiting. In various alternative embodiments, the authoring tool 100 may use an almost limitless number of different card templates, components, styles and attributes, functionality and card types, resulting in an almost infinite number of different cards that may be used in wrap packages.

Figure 22:
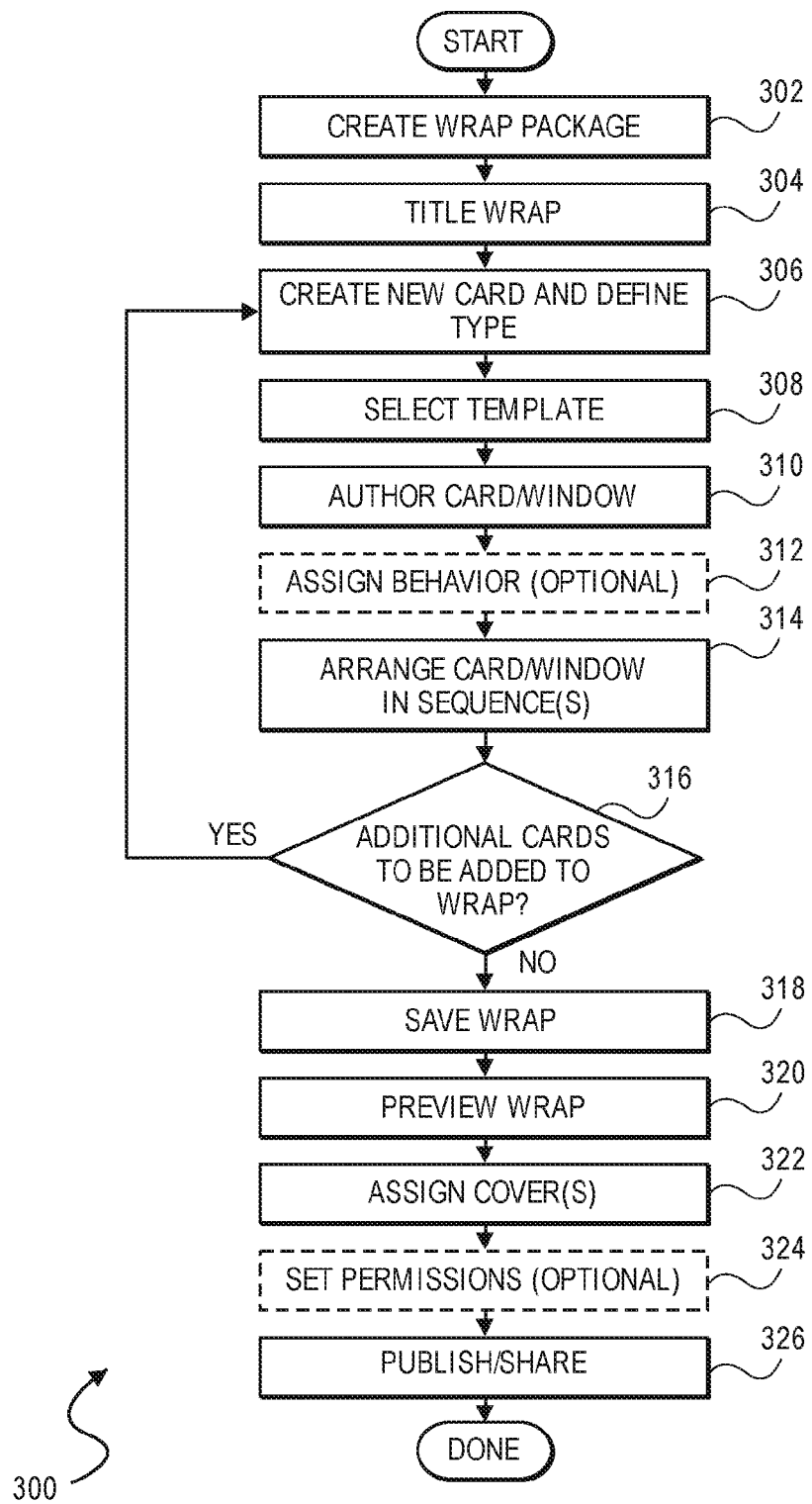
FIG. 22 is a flow chart illustrating the steps of authoring a wrap package in accordance with a non-exclusive embodiment of the present invention.

Referring to FIG. 22, a flow chart 300 illustrating the steps of authoring a wrap package from the perspective of the author is illustrated.

In the initial step 302, the author elects to create a new wrap package by selecting the new wrap tool 106 as provided in FIG. 7.

Thereafter, in step 304, the author titles the wrap in the text field 110 appearing in window 108 as illustrated in FIG. 8.

In the next step 306, the author creates a new card using the new card tool 134 and then defines the card type using the card type selector tool 136 as illustrated in FIG. 10C.

In subsequent step 308, a card template is selected.

Thereafter, the resulting card (or frame in the case of a gallery card) is authored in step 310 to selectively include, as described above, one or more text, image/photo, or action components (GPS/location, appointments, transactions, and/or triggers to cul-de-sac to a remote location, etc.).

In optional step 312, a behavior may be associated with the card. For example, a gallery card may be assigned a "snap" or "scroll" behavior to the next frame in response to an up or down swipe when the card is being consumed.

In step 314, the author may keep the current card (or frame) in its implicit order when it was created, or re-arrange the card (or frame) or other cards within the horizontal sequence of cards.

In decision 316, the author determines if a new card should be added to the wrap package or not. If yes, the process of steps 306 through 314 described above are repeated.

If not, then the author has the option to save the wrap using tool 126 (or alternatively discard the wrap using tool 130), preview the wrap in step 320, assign any covers to the wrap in step 322 and optionally set any permission(s) that define who may or may not access and view the wrap in step 324.

Finally, in step 326, the author may publish or share the wrap the publishing using tool 128, which enables the wrap to be distributed in or through any of the above-mentioned distribution channels.

Figure 23:
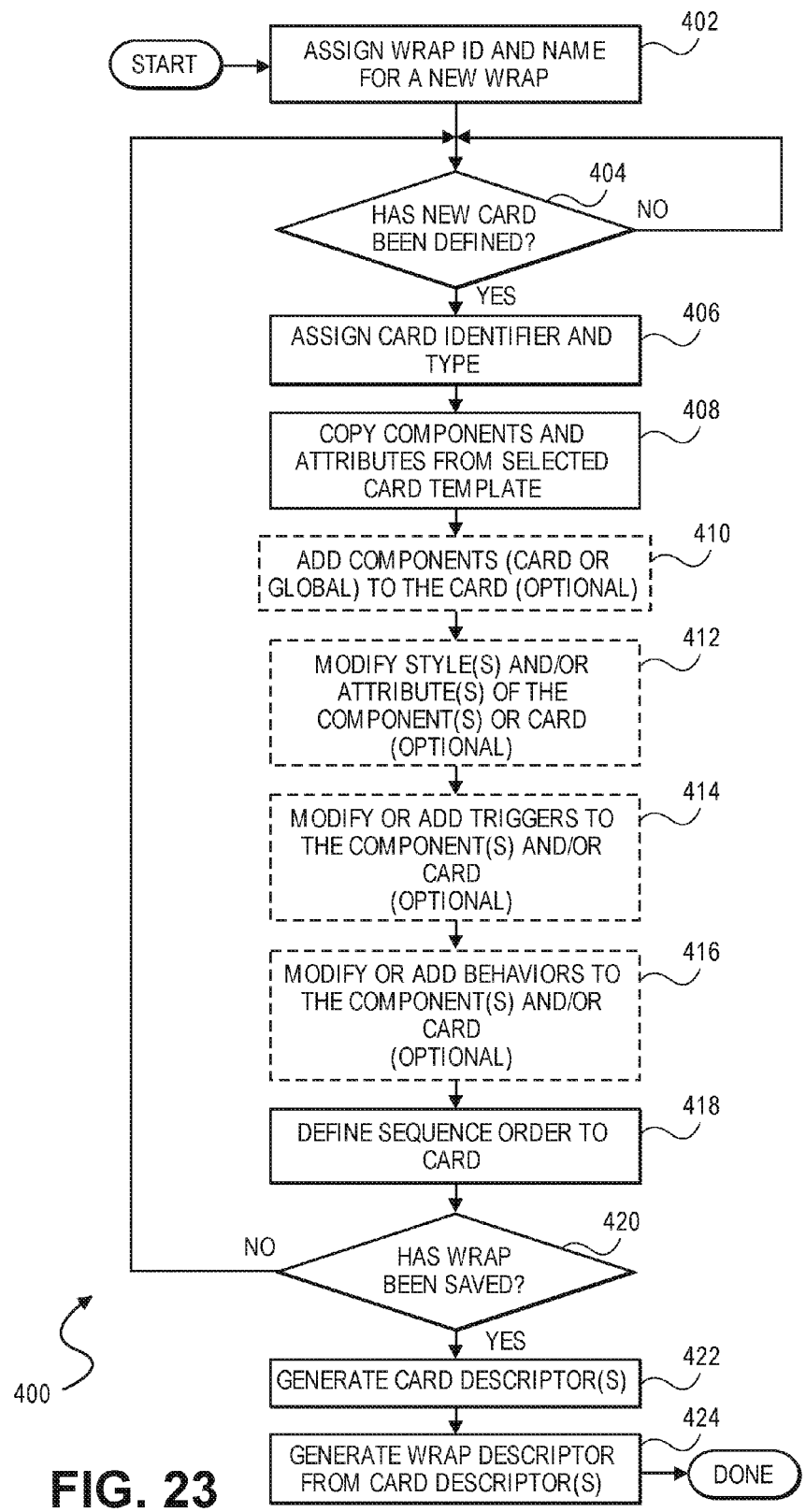
FIG. 23 is a flow chart illustrating the steps of a background process run by the authoring tool during the authoring of a wrap package in accordance with a non-exclusive embodiment of the present invention.

Referring to FIG. 23, a flow chart 400 illustrating the steps of a background process run by the authoring tool 100 during the authoring of a wrap package is shown.

In the initial step 402, a wrap identifier 42 and title 44 are defined when the author elects to create a new wrap.

In decision 404, the tool 100 waits until a new card is created using tool 134. When a new card is created and its type defined using tool 136, a card identifier 71 and card type 73 are assigned in step 406.

Next in step 408, the components and attributes from a selected card template are copied and assigned to the newly created card.

Thereafter, during the editing process, components of the card may be optionally added in step 410.

In optional step 412, the style(s) and/or attribute(s) of the components and/or card may be modified.

In optional step 414, any triggers associated with a component or the card can be added or modified.

In addition with certain cards, behaviors may optionally be assigned during the authoring process in step 416, such as with gallery cards as described above. For example, either the "snap" or "scroll" behavior will be assigned to the card, depending on the selection by the author.

In step 418, the sequence order of the card within the wrap is defined, either implicitly in the order in which the card was created, or explicitly by the author re-arranging the card order in the space 132.

In decision 420, the authoring tool 100 then determines if the wrap has been saved using tool 126, for example when an editing session is complete.

If not, then the tool 100 waits until the author defines another card in step 404, in which case, the steps 406 through 418 are repeated.

Alternatively, if saved, then the authoring tool 100 generates the card descriptor(s) for each of the defined cards in the wrap package in step 422.

Finally, in step 424, the tool 100 generates the wrap descriptor from all of the card descriptor(s).

It should be understood that with gallery cards, the authoring tool 100 essentially performs the background steps outlined above with respect to FIG. 23, except on a frame-by-frame basis (as opposed to a card-by-card basis). Accordingly, any component(s), attribute(s), style(s), trigger(s) and/or behaviors assigned to the frames of a gallery card, as well as the sequence order of the frames, are all defined during the authoring process of the gallery card.

It should be noted that the steps defined in the flow diagrams 300 and 400 as described above are merely exemplary. Do to the inherent nature of authoring a wrap, one author or multiple authors may create a wrap during one or multiple sessions. During each session, new cards can be created and existing cards can be either revised or deleted. As such, the sequence of steps illustrated in each flow chart are not intended to be rigidly construed, but rather, for illustrating the step or steps that an author or set of authors may optionally elect to use in any particular order during the authoring of a wrap.

Figure 24:
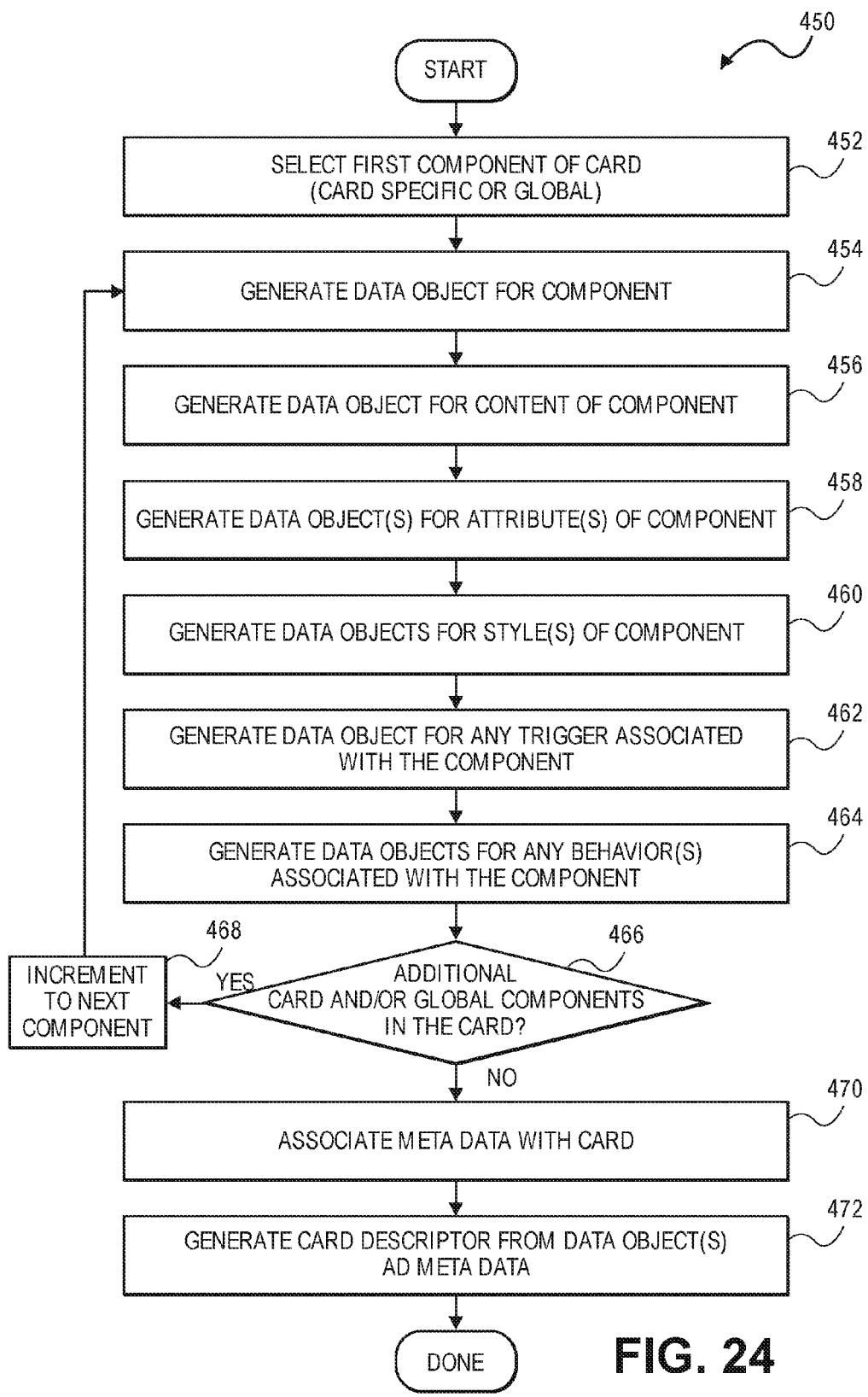
FIG. 24 is a flow chart illustrating the steps of generating a card descriptor for a card in accordance with a non-exclusive embodiment of the invention.

Referring to FIG. 24, a flow chart 450 illustrating the steps of generating a card descriptor (i.e., step 422 of FIG. 23) for a card of a wrap in accordance with a non-exclusive embodiment is shown. As previously noted, a card descriptor is a data object. Thus, generating the card descriptor generally involves generating and assembling individual data objects for every feature and content contained in the card.

For example in initial step 452, a first component of the card is selected. Thereafter, data object(s) are generated for the component itself (step 454) along with content (step 456), attribute(s) (step 458), style(s) (step 460), trigger(s) (step 462) and/or defined and/or declared behavior(s) (step 464) associated with the component. In decision step 466, it is determined if there are any additional components associated with the card. If yes, then in step 468 another component is selected and steps 454 through 466 are repeated for the selected component. The above process is repeated for all the components of the card. When there are no more components, then any meta data is associated with the card in step 470. Finally, the card descriptor is generated from all the data object(s) and meta data (step 472). The card descriptor thus contains everything needed to render the card at runtime.

Figure 25:
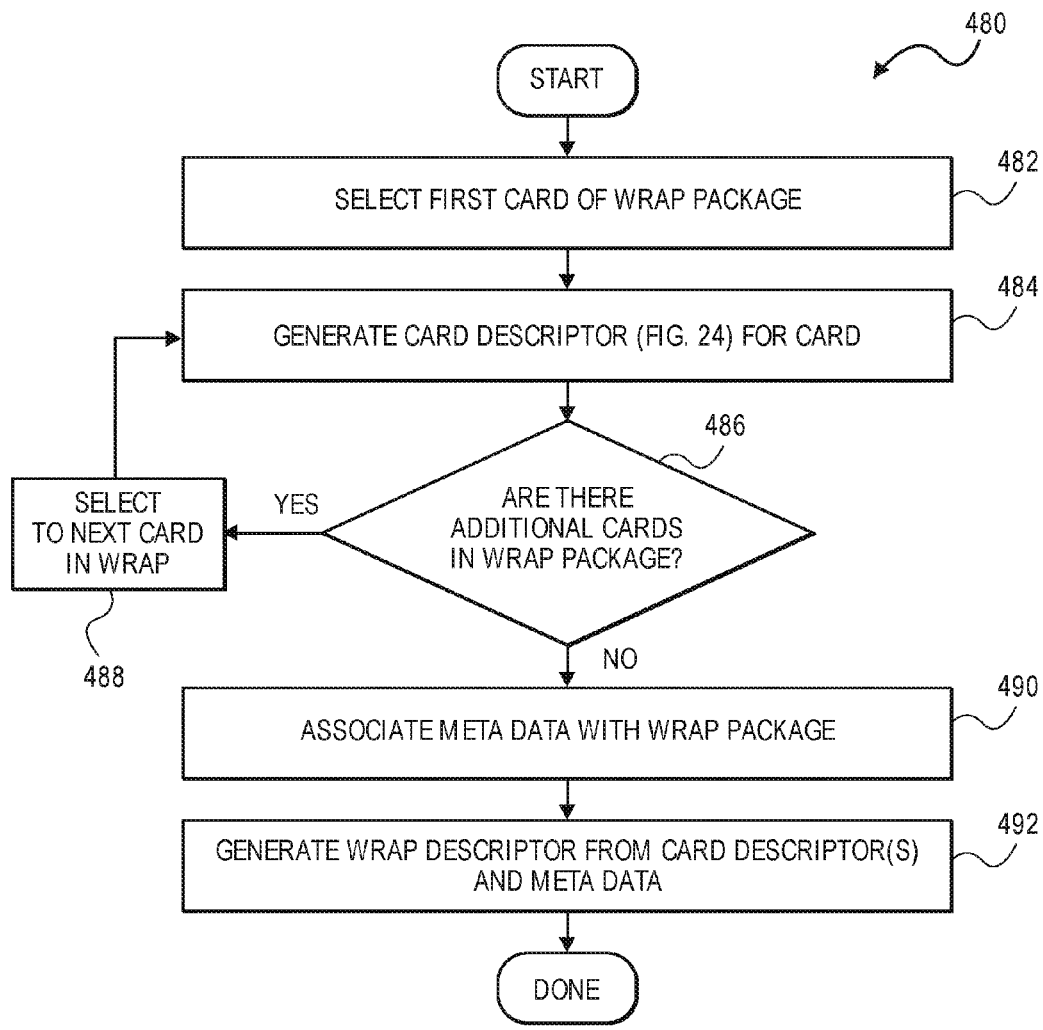
FIG. 25 is a flow diagram illustrating the steps of generating a wrap descriptor from one or more card descriptors in accordance with a non-exclusive embodiment of the invention.

Referring to FIG. 25, a flow diagram 480 illustrating the steps of generating a wrap descriptor (step 424 of FIG. 23) is illustrated. In the initial step (482), the first card of the wrap is selected and its card descriptor is generated (step 484) using, for example, the process described above with respect to FIG. 24. Thereafter, in decision 486, it is determined if there are any additional cards in the wrap package. If yes, then next card in the wrap is incremented (step 488) and the card descriptor for that card is generated in step 486. This process is repeated until a card descriptor is generated for all the cards in the wrap, as determined in decision 486. Finally, in step 492, the wrap descriptor is generated from the wrap descriptor and any media data associated with the wrap as provided in step 490. The wrap descriptor thus contains everything needed to render the wrap at runtime.

Thus, generating the wrap descriptor generally involves combining the collection of data objects for each card, along with any meta data, to generate the wrap descriptor. Again, since the since the individual card components are defined in terms of data objects, the wrap descriptor will also be defined in terms of data objects (e.g., JSON, BSON, or any other suitable data object format). Consequently, the wrap descriptor includes everything needed to render the wrap package 10 at runtime by the runtime viewer.

Again, it should be noted that the flow chart 450 described above similarly applies to gallery cards. For each frame of a gallery card, the above process is repeated for each component in the frame, resulting in essentially a "frame" descriptor, which is similar to a card descriptor. When all the components have been exhausted for a given frame, the process is repeated for the next frame, until frame descriptors have been generated for all the windows. A card descriptor is then generated for the gallery card from each of the frame descriptors and any meta data.

The wrap descriptor is thus a collection of card descriptors, each specified in terms of a collection of data objects (e.g., JSON or BSON) defining each of the cards of the wrap package respectively. As such, the wrap descriptor includes everything necessary to render the wrap upon runtime.

Wraps as Messages

The described wrap packages 10 are essentially cloud based portable data objects that can readily be distributed using a wide variety of electronic techniques including messaging, posting and inclusion as links in documents, articles or other electronic communications. The wrap package 10 thus allows authors to take applet and website functionality and make them consumable as a message, delivered in a narrative storytelling format. This allows the transformation of an app or website functionality into a portable, sharable, and savable wrap package 10, that can be distributed like electronic messages (e.g. email, SMS, text) are disseminated today. For example as illustrated in FIG. 7M, the media triggers 381 and 383 can be used to share the wrap package 310 with others via Facebook Twitter. Although in this embodiment actual triggers for sharing are provided within or embedded in the wrap itself, this is not always necessary for sharing the wrap. Alternatively for example, the cover 15 that includes a URL associated with the wrap (e.g., the wrap ID 42) can be posted on a social media site or feed, email to others, or otherwise distributed using an electronic communication protocol or platform.

Not only are the wrap packages 10 easy for publishers and others to distribute, but viewers and other recipients of a wrap may also readily share a wrap with their friends, family, coworkers, colleagues, etc. This is a powerful construct that can greatly extend or enhance the market (or other target segment) reach and penetration of a well designed wrap since a "message" from a friend or acquaintance is often more favorably received than a message from an unknown party. Neither applets nor websites are well suited for such viral distribution.

Since the set of cards 14 that make up a wrap package 10 are encapsulated as a data object and can be sent as a unit, the wrap package 10 can also readily be stored on a viewer's device if the viewer so desires. Contrast this with a conventional multi-page website which is not designed to be persistently stored on a viewer's device as a unit, even if individual pages may sometimes be cached. It also eliminates third party aggregator (e.g., the Apple App Store; Google Play, etc.) control over the delivery of a company's services/messages to its customers as occurs in the distribution of conventional apps.

Benefits and Advantages of Wrap Packages

Wrap packages 10 offer a number of benefits and attributes currently not available with conventional methods of distributing content, such as with PDFs, web sites, or stand-alone apps. Since cards 14 can be sequenced and authored to include media content, application functionality, and e-commerce related services, wrap packages 10 have the unique ability to narrate a story, in a book-like format, that captures and holds the attention of the viewer, while also offering an "app" like user experience. As such, wrap packages 10 offer a new web-based platform for storytelling, communicating ideas, and delivering highly visual and functional user experiences. Wrap packages 10 thus enable a new business paradigm for selling, advertising, publishing, increasing brand loyalty, offering services, and contacting and engaging new and old customers alike, all ideally delivered to consumers on their mobile devices, where they spend their time and consciousness. Where businesses used to have to build destinations (e.g., websites) or monolithic systems (e.g., "apps"), they can now, instead, provide consumers with wrap packages 10, that are delivered like messages, and that provide the user experiences and functionality they really want and need. As a result, wraps 10 create opportunities for business to innovate and improve products and services, leveraging the mobile web in ways not before possible, because a convenient, enabling interface and platform did not previously exist.

Wrap packages 10 are also like interactive messages that can be easily shared, delivered over the mobile web, and locally stored. With the ability to share, distribute over the mobile web and locally store, popular wrap packages can readily go viral.

Wrap packages 10 are also preferably delivered using a SaaS (Software as a Service) model, meaning wrap packages are delivered only on an as-needed basis.

Wrap packages can be authored by anyone, from an individual with little technical or design skills, to large and sophisticated enterprises.

Wrap packages 10 can be distributed narrowly to a specific or targeted person or persons or widely distributed to many, many persons.

Wrap packages 10 can be written once and can run on just about any browser enabled device. As a result, wraps are not platform, operating system, or device dependent.

Since wrap packages 10 can be easily generated and optionally dynamically updated with new content, wrap packages can be used as a digital "corollary" or "companion", accompanying the sale or rental of goods and/or services. For example, wrap packages can be created and distributed as an "Active Receipt" accompanying the sale or rental of a good or service. The merchant can thus provide through the wrap package 10 ongoing contact and support to on-board, up-sell and/or cross-sell the customer with ancillary goods and/or services, potentially for the entire life cycle of the product or service, all delivered in a digital format that never gets lost or misplaced. Accordingly, wrap packages can be used as an essential component of any product or service, delivering better customer service and creating new selling opportunities.

In summary, wrap packages 10 introduce the "narrative web", which is a storytelling mobile user interface, delivered over a cloud-based platform, ushering in a digital evolution of mobile marketing and customer relationship management. As a marketing tool, wrap packages 10 have the unique ability to increase mobile engagement, lead generation, and conversion, enabling businesses to increase sales, improve loyalty, and enhance customer relationships and loyalty. Wrap packages 10 thus offer a compelling business proposition by solving one of the biggest problems in the mobile space of today; namely the lack of connectivity between apps. With wrap packages 10, however, consumers and other users can enjoy a multi-function app-like experience, without having to be in an app, download an app, or open any apps.

Finally, while many of the benefits and attributes of wrap packages 10 are realized on mobile devices operating on the mobile web, it should be made clear that there is nothing inherent with wrap packages 10 that limit their usefulness or functionality in non-mobile environments. On the contrary, wrap packages 10 can also be used, and all the same benefits and attributes realized, on non-mobile devices, such as desktop computers and/or smart TVs for example.

The present invention is thus intended to be broadly construed to cover any system and method, such as carousel ads for example, that enables publishers and marketers to tell sequenced stories with (i) a combination of images, photos, text, video and other types of media, (ii) a swipe-able format that enables viewers to navigate the media displayed in one screen shot or frame to the next, and (iii) includes embedded app-like functionality and/or links to other locations that provide additional information or such functionality and/or services. Consequently, the present application should not be construed to just those specific embodiments as described herein.

In the primary described embodiments, all of the behaviors are declared rather than being stored in-line within the descriptor. Thus, the descriptor itself does not have any programmable logic. In many embodiments, the declared behavior are all defined within the runtime viewer such that the runtime view can readily associate the desired behavior with the wrap, card or component as appropriate in a runtime instance of the wrap. It should be appreciated that this is a particularly powerful framework for enhancing portability of the wraps. With the descriptor/runtime viewer approach, a single item (the descriptor) can be used to define all of the content and functionality of a set of cards that can be rendered on virtually any platform. The declared functionality is provided (or obtained) by the runtime viewers when the wrap is to be rendered so that the author of the wrap is not required to know or understand any of the idiosyncrasies of any particular platform. The runtime viewer may be a generic runtime viewer (e.g., a viewer executable by a conventional browser) or may be native viewer customized for a particular platform. Regardless of the underlying platform, the runtime viewer handles the tasks of associating the declared behaviors with the wrap/cards/components which frees the wrap author and/or authoring tool from having to ensure that desired behaviors are programmed correctly for all of the different platforms that the wrap may be rendered on.

In most implementations, all of the sizeable assets that serve as content of the wrap are referenced in the wrap by appropriate identifiers rather than being stored directly in the wrap. This again significantly enhances portability by keeping the size of the descriptor small while facilitating the use of rich media content.

From the foregoing it should be apparent that the described wrap packages provide businesses with a powerful tool for engaging their customers, suppliers, employees or other constituents in a format that is particularly well tailored for display on mobile devices.

Although only a few embodiments of the invention have been described in detail, it should be appreciated that the invention may be implemented in many other forms without departing from the spirit or scope of the invention. For example several specific wrap descriptor structures have been described. Although such descriptor structures work well, it should be appreciated that the actual descriptor structure may vary widely. For example, in some embodiments some special behaviors can be defined within a wrap descriptor if desired. Such in-line behavior definition might be particularly useful in association with certain behavior extensions that are not otherwise readily available. For example, JavaScript can be included within a JSON object and various other descriptor structures. Thus, when JSON descriptors are used, selected behaviors or behavior overrides can be defined in-line using JavaScript if desired. Although programmed functionality can be included in some circumstances, it should be appreciated that liberal definition of behaviors within a wrap tends to defeat some of the primary advantages of the described descriptor/runtime viewer framework.

In many implementations much of the actual content of the wrap will be referenced by the descriptor rather than being stored in-line within the descriptor. However, the balance between in-line storage and references to external assets in any particular wrap descriptor may be widely varied anywhere from 100% referenced content to (at least theoretically) 100% in-line content—although the later is less desirable for media rich content and again, begins to defeat some of the advantages of using the descriptor approach. The choice between in-line and referenced content will typically be dictated in large part by the relative size of the content. For example, text, which tends to be very compact, is generally more suitable for inclusion in-line, whereas more graphic media, images, videos and/or audio files are typically more efficiently referenced.

A few different methods of and architectures for serving wrap packages and constructing runtime instances have been described herein. Although only a few approaches have been described in detail, it should be apparent from the foregoing that a wide variety other methods and architectures can be used as well. Therefore, the present embodiments should be considered illustrative and not restrictive and the invention is not to be limited to the details given herein, but may be modified within the scope and equivalents of the appended claims.

What is claimed is:

1. An authoring tool, embedded in a non-transitory tangible computer readable medium, the authoring tool comprising tools for:
   enabling an author to create and define a presentation of a wrap package by:
   (a) selecting a card type among a plurality of card types;
   (b) selecting a card template from one or more card templates of the selected card type;
   (c) creating a new card by authoring a copy of the selected card template;
   (d) creating a plurality of cards by repeating (a) through (c); and
   (e) defining a sequence order for viewing the plurality of cards, the presentation of the wrap package defined by
      (i) the plurality of cards as created and authored and
      (ii) the defined sequence order for viewing the plurality of cards;
   the authoring tool further comprising:
   generating a plurality of JSON card descriptors, each JSON card descriptor defining content, a structure and a layout of an associated one of the plurality of cards of the wrap package respectively; and
   generating a JSON wrap descriptor including the plurality of JSON card descriptors, wherein the JSON wrap descriptor is used by a runtime viewer at a consuming device to create a runtime instance of the wrap package having the same presentation as defined by the author, the runtime instance of the wrap package including the plurality of cards arranged to be viewed in the sequence order,
   wherein the presentation of the wrap package includes a set of cards, among the plurality of cards, each characterized by:
   a same size;
   a first aspect ratio; and
      content where the relative position of the content of each card in the set remains fixed, regardless of the size and/or type of display, associated with the consuming device.

2. The authoring tool of claim 1, further comprising generating each of the card JSON descriptors from one or more data objects representative of each of the cards respectively.

3. The authoring tool of claim 1, wherein the plurality of card types is selected from the following card types:
   a chat card;
   a document card;
   an image/photo card;
   a text card;
   a video card;
   a location/GPS card;
   a gallery card;
   a transact card;
   an appointment, reservation and/or booking card;
   a widget card; or
   an end of wrap package card.

4. The authoring tool of claim 1, further comprising copying component(s) and attribute(s) of the selected card template when the new card is created.

5. The authoring tool of claim 1, further comprising a tool for enabling the author to insert into or associate an asset with a component of the new card.

6. The authoring tool of claim 1, further comprising a tool to enable the author to add a new component to the new card.

7. The authoring tool of claim 6, wherein the new component is selected from the group of:
   (f) a text component;
   (g) an image and/or photo component; or
   (h) an action component.

8. The authoring tool of claim 1, further comprising tools to enable the author to modify an existing attribute, add a new attribute to the new card or modify or add a style to a component of the new card.

9. The authoring tool of claim 1, further comprising a tool to enable the author to modify an existing trigger or add a new trigger to the new card.

10. The authoring tool of claim 1, further comprising a tool to enable the author to define a behavior associated with the new card.

11. The authoring tool of claim 1, further comprising one or more of the following:
   an image/photo tool for inserting in or associating an image and/or photo with the new card;
   a video tool for inserting in or associating a video for presentation within the new card;
   a document tool for inserting in or associating a document with the new card;
   a chat tool for associating a chat function with the new card; and
   a positioning and sizing tool for positioning and sizing a component within the new card.

12. The authoring tool of claim 1, further comprising an appointment, reservation and/or booking tool for association of an appointment, reservation and/or booking function with the new card.

13. The authoring tool of claim 1, further comprising a transaction tool for association of a transaction function with the new card.

14. An authoring tool of claim 13, wherein the transaction function is implemented by one or more of the following:
   (i) enabling buying of an item within the wrap package;
   (ii) enabling cul-de-sacing from the new card to a remote location for processing of a transaction and then returning to the wrap package;
   (iii) prompting the exchange of requisite information needed for the processing of the transaction within the wrap package; and/or
   (iv) associating a transaction widget with the new card.

15. The authoring tool of claim 1, further comprises a GPS/location tool for association of GPS/location functionality with the new card.

16. The authoring tool of claim 1, further includes one or more of the following:
   a naming tool enabling the author to name the wrap package;
   a wrap identifier tool for assigning a unique wrap identifier to the wrap package; or
   a cover tool for creating and associating a cover with the wrap package.

17. The authoring tool of claim 1, further comprising generating one or more data objects for one or more of the following contained in or associated with each of the plurality of cards of the wrap package:
   (i) component(s);
   (ii) content(s);
   (iii) attribute(s);
   (iv) style(s);
   (v) trigger(s); and/or
   (vi) behavior(s).

18. The authoring tool of claim 1, wherein the JSON wrap descriptor is a BSON (Binary JavaScript Object Notation) wrap descriptor.

19. The authoring tool of claim 1, wherein the runtime instance of the wrap package is generated by either:
   (c) creating an object graph from the wrap JSON descriptor;
   (d) generating a document object model from the object graph; and
   (e) generating a runtime instance of the plurality of cards of the wrap package from the document object model; or
   (f) a native application running on a computing device, wherein the native application generates the runtime instance from an object graph derived from the wrap descriptor.

20. The authoring tool of claim 1, further including a permission tool for granting or denying others permission to perform one or more of the following:
   (a) edit or add content or functionality to the wrap package;
   (b) edit, add or delete a card from the wrap package;
   (c) share the wrap package with others;
   (d) share a card of the wrap package with others; and/or
   (e) mix a card of the wrap package into another wrap package.

21. The authoring tool of claim 1, further comprising a gallery tool for authoring of one or more gallery card(s) among the plurality of cards of the wrap package, each gallery card selectively authored to include a plurality of gallery items that are arranged to be sequentially presented in response to navigable inputs when the gallery card is rendered in the runtime instance of the wrap package.

22. The authoring tool of claim 21, wherein the runtime instance of each of the gallery card(s) is characterized by:
   a different aspect ratio relative to the first aspect ratio of the set of cards, among the plurality of cards, of the wrap package; and
   the relative position of the content, including the plurality of the gallery items remains fixed, regardless of the size and/or type of display, associated with the consuming device.

23. The authoring tool of claim 21, wherein each of the one or more gallery cards is either:
   (1) segmented into a plurality of frames and exhibits a frame transition behavior in response to navigational inputs when rendered during the runtime instance of the wrap package; or
   (2) exhibits a continuous scrolling behavior in response to navigational inputs when rendered during the runtime instance of the wrap package.

24. The authoring tool of claim 1, wherein the authoring tool is hosted by a server and is available to an author as a software as a service.

25. The authoring tool of claim 1, wherein the JSON card descriptors are component card descriptors, each of the component card descriptors defining:
   a card component container defining a fixed aspect ratio for the associated card; and
   one or more at components for containing or associating content or functionality respectively, each of the one or more asset components having a fixed position within the fixed aspect ratio of the card component container.

26. The authoring tool of claim 1, wherein the JSON wrap descriptor does not include any markup language tags, scripts or other executable code.

27. The authoring tool of claim 1, wherein the presentation of the plurality of cards of the wrap package remains the same, including in different rendering environments associated with but not limited to mobile phones, tablet computers, laptop computers, desktop computers, smart TVs respectively.

28. The authoring tool of claim 1, wherein the plurality of cards of the wrap package are selectively authored to include media content, including text, photo(s), image(s), and/or video(s), authored to convey a book or magazine user experience, that unfolds as the plurality of cards of the wrap package are browsed in their sequence order.

29. The authoring tool of claim 1, wherein the defined sequence order for viewing the plurality of cards of the wrap package extends either:
  (i) horizontally;
  (ii) vertically; or
  (iii) both (i) and (ii).

* * * * *